US010835866B2

(12) United States Patent
Goffe

(10) Patent No.: US 10,835,866 B2
(45) Date of Patent: Nov. 17, 2020

(54) 4-WAY HYBRID BINARY CATALYSTS, METHODS AND USES THEREOF

(71) Applicant: PACCAR Inc, Bellevue, WA (US)

(72) Inventor: Randal A. Goffe, Everett, WA (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 15/612,833

(22) Filed: Jun. 2, 2017

(65) Prior Publication Data
US 2018/0345217 A1 Dec. 6, 2018

(51) Int. Cl.
| | |
|---|---|
| *B01D 53/94* | (2006.01) |
| *B01J 37/03* | (2006.01) |
| *B01J 23/00* | (2006.01) |
| *B01J 23/04* | (2006.01) |
| *B01J 23/10* | (2006.01) |
| *B01J 23/22* | (2006.01) |
| *B01J 23/78* | (2006.01) |
| *B01J 27/185* | (2006.01) |
| *B01J 29/46* | (2006.01) |
| *B01J 29/48* | (2006.01) |
| *B01J 29/76* | (2006.01) |
| *B01J 29/78* | (2006.01) |
| *B01J 29/85* | (2006.01) |
| *B01J 35/00* | (2006.01) |
| *B01J 35/10* | (2006.01) |

(52) U.S. Cl.
CPC .......... *B01D 53/945* (2013.01); *B01J 23/002* (2013.01); *B01J 23/04* (2013.01); *B01J 23/10* (2013.01); *B01J 23/22* (2013.01); *B01J 23/78* (2013.01); *B01J 27/1853* (2013.01); *B01J 29/46* (2013.01); *B01J 29/48* (2013.01); *B01J 29/763* (2013.01); *B01J 29/7615* (2013.01); *B01J 29/783* (2013.01); *B01J 29/85* (2013.01); *B01J 35/0006* (2013.01); *B01J 35/1019* (2013.01); *B01J 37/035* (2013.01); *B01D 53/9418* (2013.01); *B01D 53/9477* (2013.01); *B01D 2255/2042* (2013.01); *B01D 2255/2045* (2013.01); *B01D 2255/2065* (2013.01); *B01D 2255/20715* (2013.01); *B01D 2255/20723* (2013.01); *B01D 2255/20746* (2013.01); *B01D 2255/20761* (2013.01); *B01D 2255/50* (2013.01); *B01D 2255/502* (2013.01); *B01D 2255/504* (2013.01); *B01D 2255/707* (2013.01); *B01D 2255/915* (2013.01); *B01D 2255/9207* (2013.01); *B01J 2523/00* (2013.01)

(58) Field of Classification Search
None
See application file for complete search history.

(56) References Cited

U.S. PATENT DOCUMENTS

| | | | |
|---|---|---|---|
| 3,730,691 A | 5/1973 | Lang et al. | |
| 4,711,871 A | 12/1987 | Wachs et al. | |
| 4,929,581 A | 5/1990 | Steinwandel et al. | |
| 4,983,274 A * | 1/1991 | Chen .................... | B01J 29/7415 208/111.05 |
| 5,149,512 A | 9/1992 | Li et al. | |
| 6,407,032 B1 * | 6/2002 | Labarge ............. | B01D 53/9422 502/340 |
| 6,475,944 B1 | 11/2002 | Yang et al. | |
| 6,826,906 B2 | 12/2004 | Kakwani et al. | |
| 7,078,004 B2 | 7/2006 | Voss et al. | |
| 7,229,597 B2 | 6/2007 | Patchett et al. | |
| 7,509,799 B2 | 3/2009 | Amou et al. | |
| 7,632,775 B2 | 12/2009 | Zhou et al. | |
| 7,902,107 B2 | 3/2011 | Patchett et al. | |
| 7,998,423 B2 | 8/2011 | Boorse et al. | |
| 8,017,097 B1 | 9/2011 | Southward et al. | |
| 8,017,543 B2 | 9/2011 | Andy et al. | |
| 8,119,088 B2 | 2/2012 | Boorse et al. | |
| 8,359,832 B2 | 1/2013 | Yi et al. | |
| 8,388,920 B2 | 3/2013 | Botte | |
| 8,501,132 B2 | 8/2013 | Fu et al. | |
| 8,568,675 B2 | 10/2013 | Deeba et al. | |
| 8,589,040 B2 | 11/2013 | Nishida et al. | |
| 8,667,785 B2 | 3/2014 | Blakeman et al. | |

(Continued)

FOREIGN PATENT DOCUMENTS

| | | |
|---|---|---|
| CN | 103866343 B | 6/2014 |
| CN | 105363497 A | 3/2016 |

(Continued)

OTHER PUBLICATIONS

Bernhard, A.M., et al., "Catalytic Urea Hydrolysis in the Selective Catalytic Reduction of NOx: Catalyst Screening and Kinetics on Anatase TiO2 and ZrO2," Journal of Catalysis Science and Technology, 4(3):942, 2013.

Birkhold, F., et al., "Modeling and Simulation of the Injection of Urea-Water-Solution for Automotive SCR DeNOx-Systems," Applied Catalysis B: Environmental 70(1-4):119-127, Jan. 2007.

Calvo Zueco, S., et al., "Urea SCR Systems in Focus New Challenges in the Development of Exhaust Systems," Springer Link [Online], Sep. 2007, <https://static-content.springer.com/lookinside/art%3A10.1007%2FBF03226854/001.png> [retrieved Feb. 17, 2016], 3 pages.

Conway, R., et al., "Demonstration of SCR on a Diesel Particulate Filter System on a Heavy Duty Application," SAE Technical Paper 2015-01-1033, Apr. 14, 2015, Abstract.

(Continued)

*Primary Examiner* — Sheng H Davis
(74) *Attorney, Agent, or Firm* — Seed IP Law Group LLP

(57) ABSTRACT

The present disclosure describes hybrid binary catalysts (HBCs) that can be used as engine aftertreatment catalyst compositions, specifically 4-way catalyst compositions. The HBCs provide solutions to the challenges facing emissions control. In general, the HBCs include a porous primary catalyst and a secondary catalyst. The secondary catalyst partial coats the surfaces (e.g., the internal porous surface and/or the external surface) of the primary catalyst resulting in a hybridized composition. The synthesis of the HBCs can provide a primary catalyst whose entire surface, or portions thereof, can be coated with the secondary catalyst.

17 Claims, 10 Drawing Sheets

(56) References Cited

U.S. PATENT DOCUMENTS

| | | | |
|---|---|---|---|
| 8,679,434 B1 | 3/2014 | Li et al. | |
| 8,748,333 B2* | 6/2014 | Nemeth | B01J 29/06 |
| | | | 502/60 |
| 8,828,900 B2 | 9/2014 | Takagi et al. | |
| 8,989,637 B2 | 3/2015 | Yoshii | |
| 9,005,559 B2 | 4/2015 | Sumiya et al. | |
| 9,034,269 B2 | 5/2015 | Hilgendorff et al. | |
| 9,186,654 B2 | 11/2015 | Qi et al. | |
| 9,737,877 B2 | 8/2017 | Goffe | |
| 9,757,691 B2 | 9/2017 | Goffe | |
| 9,764,287 B2 | 9/2017 | Goffe | |
| 10,188,986 B2 | 1/2019 | Goffe | |
| 2002/0049137 A1* | 4/2002 | Morikawa | B01D 53/945 |
| | | | 502/351 |
| 2002/0054844 A1 | 5/2002 | Pfeifer et al. | |
| 2002/0132724 A1* | 9/2002 | Labarge | B01J 23/34 |
| | | | 502/64 |
| 2005/0013756 A1 | 1/2005 | Amou et al. | |
| 2006/0049063 A1 | 3/2006 | Murphy et al. | |
| 2006/0057046 A1 | 3/2006 | Punke et al. | |
| 2006/0257303 A1 | 11/2006 | Telford | |
| 2008/0314027 A1 | 12/2008 | Barber et al. | |
| 2009/0173063 A1 | 7/2009 | Boorse et al. | |
| 2009/0205324 A1 | 8/2009 | Girard et al. | |
| 2009/0214397 A1 | 8/2009 | Shirono et al. | |
| 2010/0139152 A1 | 6/2010 | Hucul et al. | |
| 2010/0146948 A1 | 6/2010 | DaCosta et al. | |
| 2010/0146950 A1 | 6/2010 | Hayashi et al. | |
| 2010/0172828 A1 | 7/2010 | Althoff et al. | |
| 2010/0180580 A1 | 7/2010 | Boorse et al. | |
| 2010/0247407 A1 | 9/2010 | Larcher et al. | |
| 2011/0030346 A1 | 2/2011 | Neubauer et al. | |
| 2011/0142737 A1 | 6/2011 | Seyler et al. | |
| 2011/0155643 A1* | 6/2011 | Tov | C10G 7/00 |
| | | | 208/119 |
| 2011/0250114 A1 | 10/2011 | Augustine et al. | |
| 2011/0293941 A1* | 12/2011 | Chaumonnot | C01B 37/00 |
| | | | 428/404 |
| 2011/0302909 A1 | 12/2011 | Botte | |
| 2012/0058034 A1 | 3/2012 | Ogunwumi et al. | |
| 2012/0121486 A1 | 5/2012 | Collier et al. | |
| 2012/0175247 A1 | 7/2012 | Darrel | |
| 2012/0230881 A1 | 9/2012 | Boger et al. | |
| 2012/0247092 A1 | 10/2012 | Boorse | |
| 2013/0102819 A1 | 4/2013 | Szesni et al. | |
| 2013/0121902 A1 | 5/2013 | Adelmann et al. | |
| 2013/0158138 A1* | 6/2013 | Jothimurugesan | B01J 29/045 |
| | | | 518/715 |
| 2013/0336865 A1* | 12/2013 | Brisley | B01D 53/9422 |
| | | | 423/213.5 |
| 2014/0041366 A1 | 2/2014 | Seyler et al. | |
| 2014/0044627 A1 | 2/2014 | Siani et al. | |
| 2014/0061099 A1* | 3/2014 | Hussain | C10G 45/64 |
| | | | 208/295 |
| 2014/0140909 A1 | 5/2014 | Qi et al. | |
| 2014/0141963 A1* | 5/2014 | Jones | C01B 39/04 |
| | | | 502/68 |
| 2014/0193746 A1 | 7/2014 | Cerri et al. | |
| 2014/0227155 A1 | 8/2014 | Phillips et al. | |
| 2014/0234190 A1* | 8/2014 | McKenna | B01D 53/9418 |
| | | | 423/213.5 |
| 2015/0000737 A1 | 1/2015 | Miyake et al. | |
| 2015/0017075 A1 | 1/2015 | Jinbo et al. | |
| 2015/0017083 A1 | 1/2015 | Maunula | |
| 2015/0037233 A1 | 2/2015 | Fedeyko et al. | |
| 2015/0060472 A1 | 3/2015 | Most et al. | |
| 2015/0114882 A1* | 4/2015 | Nagayasu | C10M 107/02 |
| | | | 208/60 |
| 2015/0209766 A1 | 7/2015 | Xavier et al. | |
| 2015/0360212 A1 | 12/2015 | Chandler et al. | |
| 2016/0040576 A1 | 2/2016 | Chandler et al. | |
| 2016/0045868 A1 | 2/2016 | Sonntag et al. | |
| 2016/0074809 A1 | 3/2016 | Goffe | |
| 2016/0074839 A1 | 3/2016 | Goffe | |
| 2016/0136617 A1 | 5/2016 | Nazarpoor et al. | |
| 2016/0214086 A1 | 7/2016 | Ano et al. | |
| 2016/0303555 A1* | 10/2016 | Park | B01J 23/75 |
| 2016/0339389 A1 | 11/2016 | Hoke et al. | |
| 2016/0346765 A1 | 12/2016 | Nazarpoor et al. | |
| 2017/0128881 A1 | 5/2017 | Goffe | |
| 2017/0128883 A1 | 5/2017 | Goffe | |
| 2017/0128884 A1 | 5/2017 | Goffe | |
| 2017/0128885 A1 | 5/2017 | Goffe | |
| 2017/0128913 A1 | 5/2017 | Goffe | |
| 2017/0320014 A1 | 11/2017 | Hanson | |

FOREIGN PATENT DOCUMENTS

| | | | |
|---|---|---|---|
| CZ | 293108 | * | 2/2004 |
| DE | 4203807 | A1 | 8/1993 |
| EP | 1945356 | B1 | 9/2012 |
| EP | 3370866 | A1 | 9/2018 |
| GB | 2504024 | A | 1/2014 |
| GB | 2504024 | B | 3/2014 |
| WO | 2004/022229 | A1 | 3/2004 |
| WO | 2008094889 | A1 | 8/2008 |
| WO | 2009050323 | A1 | 4/2009 |
| WO | 2009118195 | A1 | 10/2009 |
| WO | 2012059144 | A1 | 5/2012 |
| WO | 2013121112 | A1 | 8/2013 |
| WO | 2014027207 | A1 | 2/2014 |
| WO | 2015060472 | * | 4/2015 |
| WO | 2017/079598 | A1 | 5/2017 |
| WO | 2017085646 | A1 | 5/2017 |

OTHER PUBLICATIONS

Devarakonda, M.N., et al., "Technical Challenges in the Integration of DPF and SCR Aftertreatment—Review From a Systems and Modeling Perspective," 12th DOE Cross-Cut Workshop on Lean Exhaust Emissions Reduction Simulations [CLEERS], Apr. 28-30, 2009, Dearborn, Mich., Abstract, 1 page.

Devarakonda, M.N., et al., "Technical Challenges in the Integration of DPF and SCR Aftertreatment on a Single Substrate—Review From a Systems and Modeling Perspective," presented by Maruthi N. Devarakonda at 12th DOE Cross-Cut Workshop on Lean Exhaust Emissions Reduction Simulations [CLEERS], Apr. 28-30, 2009, Dearborn, Mich., Apr. 29, 2009, 22 pages.

Dong, H., et al., "Effect of Urea Thermal Decomposition on Diesel NOx-SCR Aftertreatment Systems," SAE Technical Paper 2008-01-1544, Abstract.

"Engine Aftertreatment Systems: Operator's Manual," No. Y53-1090C, PACCAR Inc, Bellevue, Washington, 2011, 44 pages.

European Search Report dated Jul. 11, 2016, issued in related European Application No. 15184785, filed Sep. 11, 2015, 11 pages.

Partial European Search Report dated Mar. 16, 2016, issued in related European Application No. 15184785, filed Sep. 11, 2015, 6 pages.

Geisselmann, A., "Future Aftertreatment Concepts for Heavy Duty Application," Abstract in SAE 2014 Heavy Duty Diesel Emissions Control Symposium, Event Guide, Gothenburg, Sweden, Sep. 17-18, 2014, p. 25.

Goffe. R.A., and D.M. Mason, "Electrocatalytic Oxidation of Hydrocarbons on a Stabilized-Zirconia Electrolyte Employing Gold or Platinum Electrodes," Journal of Applied Electrochemistry 11(4):447-452, Jul. 1981.

Johannessen, T., "3rd Generation SCR System Using Solid Ammonia Storage and Direct Gas Dosing: Expanding the SCR window for RDE," presented by Dr. Tue Johannessen at US DoE DEER conference, 2012, 23 pages.

Koebel, M., and E.O. Strutz, "Thermal and Hydrolytic Decomposition of Urea for Automotive Selective Catalytic Reduction Systems: Thermochemical and Practical Aspects," Journal of Industrial and Engineering Chemistry 42:2093-2100, 2003.

Kwak, J.H., et al., "Effects of Hydrothermal Aging on $NH_3$-SCR Reaction Over Cu/Zeolites," Journal of Catalysis 287(1):203-209, Mar. 2012.

(56) References Cited

OTHER PUBLICATIONS

Kwak, J.H., et al., "Excellent Activity and Selectivity of Cu-SSZ-13 in the Selective Catalytic Reduction of NO(x) and $NH_3$," Journal of Catalysis 275(2):187-190, Oct. 2010.
Krocher, O., "Aspects of Catalyst Development for Mobile Urea-SCR Systems—From Vanadia-Titania Catalysts to Metal-Exchanged Zeolites," in P. Granger and V.I. Parvulescu (ed.), Elsevier B.V., 2007, pp. 261-289.
Piazzesi, G., et al., "Isocyanic Acid Hydrolysis Over Fe-ZSM5 in Urea-SCR," Catalysis Communications 7(8):600-603, Aug. 2006.
Rappé, K.G., "Combination and Integration of DPF-SCR Aftertreatment Technologies," presented by Kenneth G. Rappé at Annual Merit Review and Peer Evaluation, May 16, 2012, 24 pages.
Rappé, K.G., and G.D. Maupin, "III.6 Integration of DPF & SCR Technologies for Combined Soot and NO(x) After-Treatment," Advanced Combustion Engine R&D, FY 2014 Annual Report, Pacific Northwest National Laboratory, Richland, Wash., pp. III-30-III-33.
Rappé, K.G., et al., "Combination & Integration of DPF-SCR Aftertreatment," presented by Kenneth G. Rappé at Directions in Engine-Efficiency and Emissions Research Conference [DEER 2011], Detroit, Mich., Oct. 5, 2011, 18 pages.
Rappé, K.G., et al., "Combination & Integration of DPF-SCR Aftertreatment," presented by Kenneth G. Rappé at Directions in Engine-Efficiency and Emissions Research Conference [DEER 2012], Dearborn, Mich., Oct. 18, 2012, 34 pages.
Rappé, K.G., et al., "Combination and Integration of DPF-SCR Aftertreatment Technologies," presented by Darrell R. Herling at the DOE Annual Merit Review and Peer Evaluation, Arlington, Va., May 11, 2011, 24 pages.
Rappé, K.G., et al., "Combination and Integration of DPF-SCR Aftertreatment Technologies," presented by Darrell R. Herling at the DOE Annual Merit Review and Peer Evaluation, Washington, D.C., Jun. 9, 2010, 16 pages.
Rappé, K G et al., "II.B.12 Combination and Integration of DPF-SCR After-Treatment," Advanced Combustion Engine R&D, FY 2011 Annual Report, Pacific Northwest National Laboratory, Richland, Washington, pp. 227-230.
Storey, J.M.E., et al., "Characterization of Urea Decomposition Products in Selective Catalytic Reduction Catalyst Systems," Abstracts of Papers of the American Chemical Society, Washington, D.C., 2011, vol. 242, 2 pages.
Final Office Action dated Oct. 11, 2016, from U.S. Appl. No. 14/486,858, filed Sep. 15, 2014, 15 pages.
Office Action dated May 31, 2016, from U.S. Appl. No. 14/486,858, filed Sep. 15, 2014, 17 pages.
Restriction Requirement dated Jan. 7, 2016, from U.S. Appl. No. 14/486,858, filed Sep. 15, 2014, 9 pages.
Office Action dated Dec. 1, 2016, from U.S. Appl. No. 14/934,955, filed Nov. 6, 2015, 27 pages.
Office Action dated Dec. 12, 2016, from U.S. Appl. No. 14/935,001, filed Nov. 6, 2015, 15 pages.
Office Action dated Jan. 23, 2017, from U.S. Appl. No. 14/935,048, filed Nov. 6, 2015, 9 pages.
International Search Report and Written Opinion dated Mar. 30, 2017, received for International Application No. PCT/US2016/060583, filed Nov. 4, 2016, 6 pages.
Ye, Q., et al., "Activity, Propene Poisoning Resistance and Hydrothermal Stability of Copper Exchanged Chabazite-Like Zeolite Catalysts for SCR of NO With Ammonia in Comparison to Cu/ZSM-5," Applied Catalysis A: General 427-428:24-34, Jun. 2012.
Yim, S.D., et al., "Decomposition of Urea into NH3 for the SCR Process," Journal of Industrial and Engineering Chemistry 43:4856, 2004.
Shoeib, M., et al., Electroless Nickel Coatings on Glass Substrate: Physical and Electrochemical Properties, <https://www.steel-grips.com/articles/2013/sg13002.pdf>, 4 pages.
Extended European Search Report, dated Oct. 15, 2018, mailed in corresponding European Application No. 18175456.5, filed Jun. 4, 2018, 9 pages.
Partial European Search Report, dated Oct. 15, 2018, mailed in corresponding European Application No. 18175406.0, filed May 31, 2018, 14 pages.
Borodianska, H., et al., "Nanoblast Synthesis and SPS of Nanostructured Oxides for SOFC," Journal of Electroceramics, 22(1-3):47-54, Dec. 2007.
Communication Pursuant to Article 94(3) EPC, issued in corresponding European Application No. 15184785.2, filed Sep. 11, 2015, 6 pages.
Extended European Search Report, dated Feb. 4, 2019, mailed in corresponding European Application No. 18175406.0, filed May 31, 2018, 12 pages.
Extended European Search Report, dated Jun. 18, 2019, mailed in corresponding EP Application No. 16863064.8, filed Nov. 4, 2016, 8 pages.
Köster, K., et al., "Regeneration of Hemofiltrate by Anodic Oxidation of Urea," Artificial Organs 7(2):163-168, May 1983.
Neylon et al., "Bifunctional Catalysts for the Selective Catalytic Reduction of NO by Hydrocarbons," Proceedings of 9th Diesel Emissions Reduction Conference, Newport, R.I., Aug. 24-28, 2003, 5 pages.
Non-Final Office Action dated Jan. 19, 2017, from U.S. Appl. No. 14/935,199, filed Nov. 6, 2015, 19 pages.
Non-Final Office Action dated Jan. 23, 2017, from U.S. Appl. No. 14/935,048, filed Nov. 6, 2015, 9 pages.
Non-Final Office Action, dated Sep. 19, 2018 in related U.S. Appl. No. 15/612,833, filed Jun. 2, 2017, 25 pages.
Office Action dated Dec. 1, 2016, from related U.S. Appl. No. 14/934,955, filed Nov. 6, 2015, 20 pages.
Office Action dated Dec. 12, 2016, from related U.S. Appl. No. 14/935,001, filed Nov. 6, 2015, 7 pages.
Office Action dated Dec. 12, 2016, from related U.S. Appl. No. 14/935,001, filed Nov. 6, 2015, 15 pages.
Office Action dated Jan. 19, 2017, from related U.S. Appl. No. 14/935,199, filed Nov. 6, 2015, 19 pages.
Office Action dated Jan. 19, 2017, from U.S. Appl. No. 14/935,199, filed Nov. 6, 2015, 8 pages.
Office Action dated Jan. 23, 2017, from related U.S. Appl. No. 14/935,048, filed Nov. 6, 2015, 16 pages.
Patzer II, J.F., et al., "Urea Oxidation Kinetics via Cyclic Voltammetry: Application to Regenerative Hemodialysis," Bioelectrochemistry and Bioenergetics 276(3):341-353, Dec. 1989.
Patzer II, J.F., et al., "Voltage Polarity Relay—Optimal Control of Electrochemical Urea Oxidation," IEEE Transactions on Biomedical Engineering 38(11):1157-1162, Nov. 1991.
Yao, S.J., et al., "Anodic Oxidation of Urea and an Electrochemical Approach to De-ureation," Nature 241(5390):471-472, Feb. 1973.
Canadian Office Action dated Aug. 8, 2019, issue from corresponding Canadian Application No. 3,004,079, filed Nov. 4, 2016, 3 pages.
Carvahlo et al., "Design of nanocomposites with cobalt encapsulated in the zeolite micropores for selective synthesis of isoparaffins in Fischer-Tropsch reaction," *Catal. Sci. Technol. 2017* (7), Sep. 2017, pp. 5019-5027. (9 pages).
Chu et al., "Isomorphous Substitution in Zeolite Frameworks. 1. Acidity of Surface Hydroxis in [B]-, [Fe]-, [Ga]-, and [Al]-ZSM-5," *J.Phys. Chem 1985* (89), Dec. 1984, pp. 1569-1571. (3 pages).
Luo et al., "Facile synthesis of zeolite-encapsulated iron oxide nanoparticles as superior catalysts for phenol oxidation," *RSC Adv. 2015* (5), Feb. 2015, pp. 29509-29512. (4 pages).
Otto et al., "Synthetic strategies for the encapsulation of nanoparticles of Ni, Co, and Fe oxides within crystalline microporous aluminosilicates," *Microporous and Mesoporous Materials 279* (2018), Apr. 2018, pp. 10-23. (14 pages).
Xu et al., "Encapsulation of Metal Nanoparticle Catalysts Within Mesoporous Zeolites and Their Enhanced Catalytic Performances: A Review," *Front Chem. 6* (550), Nov. 2018, 54 pages.
Shwan et al., "Solid-State Ion-Exchange of Copper into Zeolites Facilitated by Ammonia at Low Temperature," *ACS Catal. 5*, pp. 16-19, 2015. (4 pages).

* cited by examiner

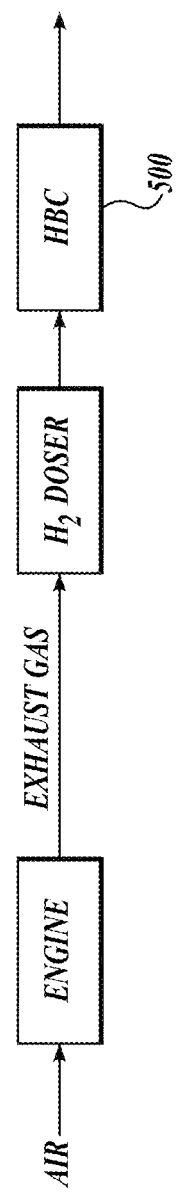

4-WAY HYBRID BINARY CATALYSTS, METHODS AND USES THEREOF

BACKGROUND

Internal combustion engine exhaust emissions, and especially diesel engine exhaust emissions, have recently come under scrutiny with the advent of stricter regulations, both in the U.S. and abroad. While diesel engines are known to be more economical to run than spark-ignited engines, diesel engines inherently suffer disadvantages in the area of emissions. For example, in a diesel engine, fuel is injected during the compression stroke, as opposed to during the intake stroke in a spark-ignited engine. As a result, a diesel engine has less time to thoroughly mix the air and fuel before ignition occurs. The consequence is that diesel engine exhaust contains incompletely burned fuel known as particulate matter, or "soot". In addition to particulate matter, internal combustion engines including diesel engines produce a number of combustion products including hydrocarbons ("HC"), carbon monoxide ("CO"), nitrogen oxides ("$NO_x$"), and sulfur oxides ("$SO_x$"). Aftertreatment systems may be utilized to reduce or eliminate emissions of these and other combustion products.

FIG. 1A shows a block diagram providing a brief overview of a vehicle powertrain. The components include an internal combustion engine 20 in flow communication with one or more selected components of an exhaust aftertreatment system 24. The exhaust aftertreatment system 24 optionally includes a catalyst system 96 upstream of a particulate filter 100. In the embodiment shown, the catalyst system 96 is a diesel oxidation catalyst (DOC) 96 coupled in flow communication to receive and treat exhaust from the engine 20. The DOC 96 is preferably a flow-through device that includes either a honeycomb-like or plate-like substrate. The substrate has a surface area that includes (e.g., is coated with) a catalyst. The catalyst can be an oxidation catalyst, which can include a precious metal catalyst, such as platinum or palladium, for rapid conversion of hydrocarbons, carbon monoxide, and nitric oxides in the engine exhaust gas into carbon dioxide, nitrogen, water, or $NO_2$.

Once the exhaust has flowed through DOC 96, the diesel particulate filter (DPF) 100 is utilized to capture unwanted diesel particulate matter from the flow of exhaust gas exiting engine 20, by flowing exhaust across the walls of DPF channels. The diesel particulate matter includes sub-micron sized solid and liquid particles found in diesel exhaust. The DPF 100 can be manufactured from a variety of materials including but not limited to cordierite, silicon carbide, and/or other high temperature oxide ceramics.

The treated exhaust gases can then proceed through a compartment containing a diesel exhaust fluid (DEF) doser 102 for the introduction of a reductant, such as ammonia or a urea solution. The exhaust gases then flow to a selective catalytic reduction (SCR) system 104, which can include a catalytic core having a selective catalytic reduction catalyst (SCR catalyst) loaded thereon.

System 24 can include one or more sensors (not illustrated) associated with components of the system 24, such as one or more temperature sensors, $NO_x$ sensor, $NH_3$ sensor, oxygen sensor, mass flow sensor, particulate sensor, and a pressure sensor.

As discussed above, the exhaust aftertreatment system 24 includes a Selective Catalytic Reduction (SCR) system 104. The SCR system 104 includes a selective catalytic reduction catalyst which interacts with $NO_x$ gases to convert the $NO_x$ gases into $N_2$ and water, in the presence of an ammonia reductant. The overall reactions of $NO_x$ reductions in SCR are shown below.

$$4NO+4NH_3+O_2 \rightarrow 4N_2+6H_2O \quad (1)$$

$$6NO_2+8NH_3 \rightarrow 7N_2+12H_2O \quad (2)$$

$$2NH_3+NO+NO_2 \rightarrow 2N_2+3H_2O \quad (3)$$

Where Equation (1) represents a standard SCR reaction and Equation (3) represents a fast SCR reaction.

The performance of the SCR catalyst is often counterbalanced by catalyst durability. This challenge is further compounded by the increasingly stringent emissions regulatory demands on the one hand, and the economic pressure surrounding fuel economy on the other. Furthermore, the performance of the SCR catalyst is influenced by the level of engine out $NO_x$ (EO $NO_x$) that has to be processed by the SCR catalyst. The current trend is in the direction of higher engine out $NO_x$ to improve fuel economy, while emission levels are simultaneously being reduced. For example, at present, EO $NO_x$ can reach as high as 7 g/kW-hr for at least a short period of time. However, it is anticipated that in the future, there will be a move towards very low tailpipe $NO_x$ (e.g., decreasing from about 0.2 to about 0.02 g/kW-hr).

High EO $NO_x$ has been shown to result in urea deposit build up in the SCR, due to the extremely high levels of diesel exhaust fluid that is introduced into the system, and insufficient residence time for complete decomposition to form $NH_3$. The formation and accumulation of urea deposits on the SCR catalyst can result in severe damage to both the chemical and physical integrity of the SCR coating. Furthermore, the high intensity of diesel exhaust fluid dosing and the relatively long duration of the dosing in urea decomposition reactor 102 can result in large quantities of water being released onto the SCR catalyst. As the SCR catalyst can be primarily composed of zeolites, which are powerful water adsorbing materials, the quantities of water can present a problem with both durability and cold start performance of the SCR catalyst.

At low EO $NO_x$ conditions, challenges are similar to those present under extended idling and cold start conditions. In other words, when SCR temperatures are too low for diesel exhaust fluid dosing and normal SCR operation (between about 250-450° C.), other strategies are required to meet emissions standards.

Without wishing to be bound by theory, it is believed that the advent of engine gas recirculation (EGR) has resulted in reduced peak in-cylinder temperatures for combustion to reduce engine out $NO_x$. The reduced peak in-cylinder temperatures are highly desirable from an emissions control perspective. However, the lower peak in-cylinder temperatures also result in undesirable lower fuel economy. The reduced engine exhaust temperatures that result from increasing use of EGR also have a negative impact on cold-start conditions for engine aftertreatment system (EAS) performance. Effective emissions control by EAS requires temperatures of at least 200° C. to be attained before DEF dosing may commence. Therefore, during the EAS heat-up period under cold-start conditions (i.e., at temperatures of less than 200° C.), there is no emissions control.

Some challenges that are encountered in emissions control include:

(1) Cold-start conditions with relatively low engine exhaust temperatures can be addressed by close coupling the SCR to the engine to achieve maximum heat-up rate, with exposure of the SCR catalyst to non-pretreated exhaust directly from the engine. However, only partial $NO_x$ reduction can be achieved in this manner. Therefore, a second downstream SCR (or a SCRF) will be required.

(2) Increased system size and complexity arise when the EAS includes a close coupled zeolite-based SCR, therefore, a DOC upstream of the SCR is required for $NO_2$-make for optimal performance, with a DEF doser and an ammonia slip catalyst (ASC), also called an ammonia oxidation catalyst (AMOX), downstream of the SCR to decrease $NH_3$ slip into the DOC. In some embodiments, while a close coupled vanadia-based SCR would not require a DOC upstream of the SCR, there exists a risk of sublimed vanadium escaping into the environment.

(3) Space limitations for close coupling requires that the EAS be made more compact, for example, by combining SCR and DPF to form a SCRF, which presents the following challenges:
  (i) Competition between the fast SCR reaction and soot oxidation reaction for the available $NO_2$ from the DOC;
  (ii) No passive soot oxidation, because platinum group metals (PGMs) cannot be used on the DPF substrate due to the presence of $NH_3$ for the SCR reaction. Oxidation of $NH_3$ with PGMs also produces $N_2O$, which is an undesirable greenhouse gas.
  (iii) Finally, the reduced ash loading capacity of the SCRF relative to a DPF and the associated higher pressure change ($\Delta P$) dictate a shorter ash cleaning interval and cost of ownership for the customer.

(4) The potential for increased poisoning and hydrothermal aging of EAS catalysts are a major concern that arises from both close coupling of the SCR and in particular, when SCR on DPF (i.e., SCRF) technologies are employed.

(5) Increasingly stringent emissions regulations are expected to be enforced by the year 2021; including tailpipe (TP) $NO_x \leq 0.02$ g/kw-hr, lower $N_2O$ emissions standards, and generally tightened greenhouse gas regulation.

Thus, there is a need for engine aftertreatment catalysts that can address the challenges facing emission control. The present disclosure seeks to fulfill these needs and provides further related advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the disclosure features a 4-way catalyst composition, including a plurality of metal oxide nanoparticles hybridized to a metal zeolite, wherein the metal oxide nanoparticle has a maximum dimension of from 0.1 to 50 nm.

In another aspect, the disclosure features a method of treating diesel engine exhaust in an engine aftertreatment system, including exposing a diesel engine exhaust to a catalyst composition of claim 1 and hydrogen gas, wherein the catalyst composition is disposed on or within a catalyst support structure in a close-coupled partial oxidation catalyst system, wherein the close-coupled partial oxidation catalyst system is located within the engine aftertreatment system.

In yet another aspect, the disclosure features an engine aftertreatment system, including a close-coupled partial oxidation catalyst upstream of a selective catalytic reduction catalyst on a diesel particulate filter with 40-60% particle retention, wherein the partial oxidation system includes a 4-way catalyst of claim 1.

Embodiments can include one or more of the following features.

In some embodiments, the 4-way catalyst is simultaneously a diesel oxidation catalyst, a diesel particulate filter catalyst, a selective catalytic reduction catalyst, a urea hydrolysis catalyst, and an ammonia oxidation catalyst.

In any of the above-described 4-way catalyst compositions, the metal oxide can be hybridized to atoms located on a portion of an exterior surface of the metal zeolite. The metal oxide nanoparticle can have has a maximum dimension of from 0.1 to 30 nm.

In any of the above-described 4-way catalyst compositions, the engine aftertreatment catalyst composition can have from 0.5 to 30 wt % of a plurality of metal oxide nanoparticles. The metal oxide nanoparticle can be selected from cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, iridium oxide, nickel oxide, barium oxide, yttrium oxide, scandium oxide, calcium oxide, barium oxide, manganese oxide, lanthanum oxide, strontium oxide, cobalt oxide, and any combination thereof. In some embodiments, the metal oxide nanoparticle is selected from the group consisting of zirconium oxide, vanadium oxide, cerium oxide, manganese oxide, chromium oxide, cobalt oxide, titanium oxide, tungsten oxide, barium oxide, and any combination thereof.

In any of the above-described 4-way catalyst compositions, the metal oxide nanoparticle can further include a cationic dopant. The cationic dopant can be an oxide including $Mg^{2+}$, $Cu^{2+}Cu^{+}$, $Ni^{2+}$, $Ti^{4+}$, $V^{4+}$, $Nb^{4+}Ta^{5+}$, $Cr^{3+}$, $Zr^{4+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, $Nb^{5+}$, $Sr^{2+}$, $Pt^{2+}$, $Pd^{2+}$, $Rh^{2+}$, and any combination thereof. For example, the cationic dopant can be an oxide including $Pt^{2+}$, $Pd^{2+}$, and $Rh^{2+}$.

In any of the above-described 4-way catalyst compositions, the metal oxide nanoparticle can be selected from $CeO_2:ZrO_2$, $Y_2O_3:CeO_2$, $BaZrO_3$, $Zr_{0.8}Sr_{0.2}CoO_3$, $Zr_{0.9}Ca_{0.1}O_x$ where x is an amount that counterbalances Zr and Ca, $Zr_{0.5}Ba_{0.5}Mn_3O_4$, $Ba_{0.3}Zr_{0.7}O_x$ where x is an amount of O that counterbalances Ba and Zr, $Zr_{0.5}Ba_{0.5}CrO_3$, $Zr_{0.5}Ba_{0.5}CoO_x$ where x is an amount of O that counterbalances Zr, Ba, and Co, $TiO_2:CeO_2$, $ZrO_2$, $Y_2O_3:ZrO_2$, $ZrV_2O_7$, $Zr_{0.3}Ba_{0.1}V_{0.6}O_x$ where x is an amount of O that counterbalances Zr, Ba, and V, $TiO_2:ZrV_2O_7$, each optionally comprising a cationic dopant comprising an oxide of $Ba^{2+}$, $Pt^{2+}$, $Pd^{2+}$, $Rh^{2+}$, $Ru^{2+}$, $Cu^{2+}$, $Ni^{2+}$, $Fe^{3+}$, and any combination thereof. For example, the metal oxide nanoparticle can be selected from $ZrO_2$, $Y_2O_3:ZrO_2$, $ZrV_2O_7$, $TiO_2:ZrV_2O_7$, $Ba_{0.3}Zr_{0.7}O_x$ where x is an amount of O that counterbalances Ba and Zr, $Zr_{0.5}Ba_{0.5}CoO_x$ where x is an amount of O that counterbalances Ba, Zr, and Co, and $CeO_2:ZrO_2$. In some embodiments, the metal oxide nanoparticle further includes phosphorous.

In any of the above-described 4-way catalyst compositions, the 4-way catalyst composition has from 70 wt % to 99.5 wt % of a plurality of the metal zeolite. The metal zeolite can be selected from aluminosilicate zeolites and silico-alumino-phosphate zeolites. The metal zeolite can further include a cation selected from $Pt^{2+}$, $Pd^{2+}$, $Rh^{2+}$, $Cu^{2+}$, $Ni^{2+}$, and $Fe^{3+}$, and wherein the metal zeolite optionally comprises an alkali metal ion selected from $Na^+$ and $K^+$. In some embodiments, the metal zeolite is selected from Fe-doped aluminosilicate zeolites, Cu-doped aluminosilicate zeolites, Fe- and Cu-doped aluminosilicate zeolites, Fe-doped silico-alumino-phosphate zeolites, Cu-doped silico-alumino-phosphate zeolites, and Fe and Cu-doped silico-alumino-phosphate zeolites. For example, the metal zeolite can be selected from Fe-doped aluminosilicate chabazite, Cu-doped aluminosilicate chabazite, and Fe and Cu-doped aluminosilicate chabazite. As another example, the metal zeolite can be Fe and/or Cu-doped silico-alumino-phosphate zeolite, and Fe- and/or Cu-doped aluminosilicate zeolite, in combination. In some embodiments, the metal zeolite is selected from ZSM-5 and β-zeolite.

In some embodiments, the 4-way catalyst includes copper-doped chabazite containing zirconium vanadate and doped with $Pt^{2+}$ and $Pd^{2+}$; copper-doped β-ZSM-5 containing barium vanadate and doped with $Co^{2+}$, $Pd^{2+}$, and $Rh^{2+}$; copper-doped β-ZSM-5 barium zirconate and doped with $Co^{2+}$, $Pd^{2+}$, and $Ru^{2+}$, copper-doped chabazite containing ceria zirconia and doped with $Pt^{2+}$ and $Pd^{2+}$; and/or copper-doped chabazite containing zirconium barium phosphate and doped with $Ni^{2+}$.

In any of the above-described 4-way catalyst compositions, the catalyst composition can have a thermal resistance of up to 600° C., and/or the catalyst composition has a BET surface area of at least 200 m²/g.

In the above-described method of treating diesel engine exhaust in an engine aftertreatment system, the hydrogen gas can be a byproduct of fuel combustion in an engine, and/or is generated using an onboard hydrogen generating electrolytic device. In some embodiments, the catalyst support structure is selected from a ceramic monolith and a metallic substrate with between 40-60% particle retention. The catalyst composition can decompose urea and urea byproducts and/or increase NOx reduction under cold start conditions.

In any of the above-described methods of treating diesel engine exhaust in an engine aftertreatment system, the selective catalytic reduction catalyst on the diesel particulate filter further comprises a 4-way catalyst described above.

In some embodiments, in the above-described engine aftertreatment system, the close-coupled partial oxidation catalyst system is coupled to a first diesel exhaust fluid doser, wherein the first diesel engine fluid doser is upstream of the partial oxidation catalyst system. The selective catalytic reduction catalyst on a diesel particulate filter can be further immediately downstream of a second diesel exhaust fluid doser.

In any of the above-described engine after treatment systems, the 4-way catalyst can be selected from copper-doped chabazite containing zirconium vanadate and doped with $Pt^{2+}$ and $Pd^{2+}$; copper-doped β-zeolite containing barium vanadate and doped with $Co^{2+}$, $Pd^{2+}$, and $Rh^{2+}$; copper-doped ZSM-5 barium zirconate and doped with $Co^{2+}$, $Pd^{2+}$, and $Ru^2$; copper-doped chabazite containing ceria zirconia and doped with $Pt^{2+}$ and $Pd^{2+}$; and copper-doped chabazite containing zirconium barium phosphate and doped with $Ni^{2+}$. For example, the 4-way catalyst can selected from copper-doped chabazite containing zirconium vanadate and doped with $Pt^{2+}$ and $Pd^{2+}$; copper-doped β-zeolite containing barium vanadate and doped with $Co^{2+}$, $Pd^{2+}$, and $Rh^{2+}$; copper-doped ZSM-5 barium zirconate and doped with $Co^{2+}$, $Pd^{2+}$, and $Ru^{2+}$, copper-doped chabazite containing ceria zirconia and doped with $Pt^{2+}$ and $Pd^{2+}$; and copper-doped chabazite containing zirconium barium phosphate and doped with $Ni^{2+}$.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 5 is a block diagram of an example of an aftertreatment system coupled to an internal combustion engine.

DETAILED DESCRIPTION

Figure 1A:
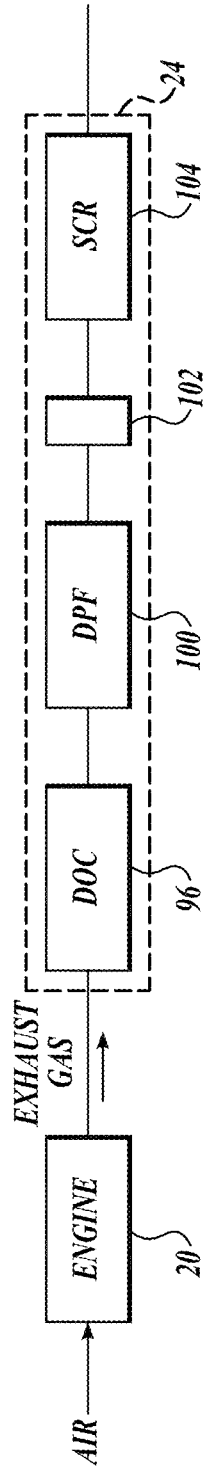
FIG. 1A is a block diagram of an example of an aftertreatment system coupled to an internal combustion engine.

The present disclosure describes hybrid binary catalysts (HBCs) that can be used as 4-way catalyst compositions in engine aftertreatment systems. The HBC-based 4-way catalyst composition can serve the roles of a DOC, DPF catalyst, SCR catalyst, urea hydrolysis catalyst, and AMOX catalyst, concurrently, in an engine aftertreatment system. The HBC-based 4-way catalysts provide solutions to the challenges facing emissions control. In general, the HBC-based 4-way catalysts include a primary catalyst that can be a highly porous particle and a secondary catalyst. The secondary catalyst coats the surfaces (e.g., the internal porous surface and/or the external surface) of the primary catalyst. The syntheses described herein of the HBC-based 4-way catalysts provide a primary catalyst whose entire surface, or portions thereof, are coated with discrete and identifiable crystals of the secondary catalyst. The crystals can have a maximum dimension of from 1 to 5 nm.

The HBC-based 4-way catalysts of the present disclosure can include specific chemical elements that possess the desired electronegativities for the various chemical reactions that occur in an engine aftertreatment system. Table 1 shows a list of suitable elements with desirable electronegativity values that can be used in the HBC-based 4-way catalysts, as well as the oxidation states of these elements that can be present in the HBC-based 4-way catalysts. In some embodiments, the HBC-based 4-way catalysts include Ba (barium), Co (cobalt), Zr (zirconium), and/or P (phosphorus).

TABLE 1

Electronegativity and oxidation states of selected elements from the periodic table.

| Period | Group | Element | Electronegativity (Paulings) | Oxidation State |
|---|---|---|---|---|
| 4 | Alkaline earth | Ca | 1 | $1^+, 2^+$ |
| 5 | Alkaline earth | Sr | 0.95 | $2^+$ |
| 6 | Alkaline earth | Ba | 0.89 | $1^+, 2^+$ |
| 3 | 3A | Al | 1.61 | $1^+, 2^+, 3^+, [1^-, 2^-, 3^-]$ |
|   | 4A | Si | 1.90 | $1^+, 2^+, 3^+, 4^+, [1^-, 2^-, 3^-, 4^-]$ |
| 4 | Transition metal | Sc | 1.36 | $1^+, 2^+, 3^+$ |
|   | Transition metal | Ti | 1.54 | $2^+, 3^+, 4^+ [1^-, 2^-]$ |
|   | Transition metal | V | 1.63 | $2^+, 3^+, 4^+, 5^+ [3^-]$ |
|   | Transition metal | Cr | 1.66 | $1^+, 2^+, 3^+, 4^+, 5^+, 6^+ [1^-, 2^-, 4^-]$ |
|   | Transition metal | Mn | 1.56 | $2^+, 3^+, 4^+, 5^+, 6^+, 7^+ [1^-, 2^-, 3^-]$ |
|   | Transition metal | Fe | 1.83 | $2^+, 3^+, 4^+, 5^+, 6^+ [1^-, 2^-, 4^-]$ |
|   | Transition metal | Co | 1.88 | $2^+, 3^+, 4^+, 5^+ [3^-]$ |
|   | Transition metal | Ni | 1.91 | $2^+, 3^+, 4^+ [1^-, 2^+]$ |
|   | Transition metal | Cu | 1.9 | $1^+, 2^+, 3^+, 4^+ [2^-]$ |
|   | Transition metal | Zn | 1.65 | $1^+, 2^+ [0, 2^-]$ |
| 5 | Transition metal | Y | 1.22 | $1^+, 2^+, 3^+$ |
|   | Transition metal | Zr | 1.33 | $1^+, 2^+, 3^+, 4^+ [2^-]$ |
|   | Transition metal | Nb | 1.6 | $1^+, 2^+, 3^+, 4^+, 5^+ [1^-, 3^-]$ |
|   | Transition metal | Mo | 2.16 | $1^+, 2^+, 3^+, 4^+, 5^+, 6^+ [0, 1^-, 2^-, 4^-]$ |
|   | Transition metal | W | 1.7 | $1^+, 2^+, 3^+, 4^+, 5^+, 6^+ [0, 1^-, 2^-, 4^-]$ |
| 6 | Lanthanide | Ce | 1.12 | $1^+, 2^+, 3^+, 4^+$ |
| 3 | 5A | P | 2.19 | $1^+, 2^+, 3^+, 4, 5^+ [1^-, 2^-, 3^-]$ |

The catalysts of the present disclosure provide one or more of the following benefits:

(1) The catalysts include a refractory metal oxide that is abundant and relatively low cost, durable and with relatively low oxidative power (e.g., $ZrO_2$).

(2) The catalysts use dopants to create oxygen vacancies in the crystal lattice and at the surfaces of metal oxide (e.g., zirconium dioxide). The dopants (e.g., $Ba^{2+}$, $Ca^{2+}$, or $SF^{2+}$) are relatively low in cost and have reductive power that can counterbalance the oxidative power of the metal oxide, while positively impacting $NO_x$ storage on the surface.

(3) The catalysts incorporate selected high oxidative power species (e.g., Ti, Co, Cr, Mn, Nb, V, Mo, and/or W-containing oxides) into a mixed metal oxide structure, to tailor the final oxidative power according to a specific application. The high oxidative power species can be employed in different oxidation states as needed. For example, a species having high oxidative power (1.5-2.2 Paulings) is useful for DOC applications, while a species having relatively moderate (1 to <1.5 Paulings) to low oxidative power (<1.0 Paulings) is useful for high durability SCR applications. One major exception is cerium (a lanthanide element), with electronegativity that falls in the moderate range but is also very effective for DOC application.

Some considerations for the oxidative properties of the HBC-based 4-way catalyst include:

(i) without wishing to be bound by theory, it is believed that the oxidative power of the final (zirconia doped) mixed oxide is important, therefore elements with high Pauling values can be used in SCR applications at relatively low doping levels. At higher doping levels, the same element can be highly effective in DOC applications.

(ii) without wishing to be bound by theory, it is believed that the valency of the element plays an important role in the observed oxidative power. Therefore, selection of a element having a low valence state (e.g., 2+, such as $Co^{2+}$) as a dopant in $ZrO_2$ can be useful in SCR application, while an element having high valence (≥3+) can be more preferred in DOC applications.

The catalysts incorporate acidic (i.e., anionic) groups, such as $PO_4^{2-}$ in zirconium phosphate, $VO_4^{3-}$ in zirconium vanadate, $ZrO_3^{2-}$ in barium zirconate, and/or $Mo_7^{6-}$ in zirconium molybdate, which facilitate high binding capacity for cations that provide catalytic activity in emissions control. For example, $Cu^{2+}$ and/or $Fe^{2+}$ can be used for $NO_x$ reduction; and $Pt^{2+}/Pt^0$, other platinum-group metals (PGMs) and certain base metals (e.g., $Ni^{2+}$ and $Fe^{3+}$) can facilitate oxidative reactions required for DOC and AMOX catalysts.

The use of phosphorous in the metal oxide composition of the catalysts can modulate oxidative power while imparting a degree of phosphate tolerance to the catalyst.

Definitions

As used herein, "hybridization," "hybridizing," or "hybridized" refers to the chemical reaction between precursor molecules with specific elements on the surface of the zeolite, resulting in formation of bonds (e.g., covalent bonds, and/or ionic bonds) between the precursors and elements in the zeolite in the metal oxide nanoparticles. The hybridization can be verified using scanning transmission electron microscopy with elemental analysis and electron energy loss spectroscopy (EELS) microstructural analysis techniques. For example, elemental mapping of metal oxide and any cationic dopants can show an aggregate of metal oxide nanoparticle, and Si and/or Al in the zeolite can be present in the metal oxide phase, with no zeolite crystal present in the background. Furthermore, STEM studies can indicate that the metal oxide phase is crystalline. Therefore, it is reasonable to assume that the incorporation of Si and Al into the metal oxide phase is by way of covalent and/or ionic bonds in the $ZrO_2$ crystal lattice. Without wishing to be bound by theory, it is believed that a metal oxide precursor first forms a coordination bond with the surface atoms of a zeolite (i.e., Si, Al, and/or P), which is facilitated by the use of a chelating agent, such as urea, in the reaction mixture. The formation of this coordination complex causes disruptions in the crystal structure near the surface. Therefore, a certain degree of deconstruction of the zeolite surface layer(s) occurs to release Si, Al, and/or P for incorporation into the metal oxide phase as it forms.

As used herein, "oxidative power" is defined as the temperature at which 50% of the CO is oxidized to $CO_2$ when a simulated exhaust stream including nitric oxide (600 ppm), ethylene (75 ppm $C_2H_4$), CO (300 ppm), oxygen (10%), carbon dioxide (5.6%), water (6%), and nitrogen (the balance of simulated exhaust stream), is exposed to a catalyst (e.g., a metal oxide catalyst) at a space velocity of 60,000 $hr^{-1}$ in a reverse light off study (starting at 600° C., to a temperature of 160° C.). As an example, a metal oxide with a relatively low oxidative power has a ($T_{50}CO$) of >600° C. (e.g., $ZrO_2$), while a metal oxide with relatively high oxidative power has a ($T_{50}CO$) of <500° C.

As used herein, "reductive power" refers to the ability to enhance the $NO_x$ storage property to enhance $NO_x$ conversion.

As used herein, "microporous" refers to material having pores of a maximum pore dimension of up to 2 nm, "mesoporous" refers to a material having pores of a maximum pore dimension of from 2 to 50 nm, and "macroporous" refers to a material having pores of a maximum pore dimension of greater than 50 nm.

As used herein, "significantly" or "substantially" refers to greater than 90% (e.g., greater than 95%, or greater than 98%).

As used herein, "about" refers to ±5% (e.g., ±3%) of a given value.

As used herein, a selective catalytic oxidation (SCO) catalyst is a catalyst that facilitates:
(i) Formation of $NO_2$ species in situ by the reaction of $NO + \frac{1}{2} O_2 \rightarrow NO_2$, to serve as reactive intermediates from nitrogen oxides in the exhaust stream, without significantly oxidizing $NH_3$ into $N_2O$. For embodiments of the catalysts of the present disclosure, even if $NH_3$ oxidation occurs, in some instances the primary product is $N_2$, which is a desirable outcome.
(ii) Hydrocarbon oxidation at considerably lower temperatures, for example, the oxidation of longer chain unsaturated hydrocarbons such as propylene.

As used herein, a selective catalytic reduction (SCR) catalyst is a catalyst that catalyzes the reduction of $NO_x$ to nitrogen and water.

As used herein, a urea hydrolysis catalyst is a catalyst that hydrolyzes urea and isocyanic acid (HNCO) with minimal or zero formation of high molecular weight aromatic (HMAr) compounds such as cyanuric acid, ammilide, ammeline, and/or melamine.

As used herein, a DPF catalyst is a catalyst that captures soot particles and contains PGM for $NO_2$-make to facilitate soot lightoff at relatively low temperatures (e.g., <350° C.) for passive soot oxidation. The DPF can also serve as an ash storage device.

As used herein, a DOC is a catalyst that oxidizes gases and other volatile particulates from the engine exhaust, including hydrocarbons, CO and NO (which is oxidized to make $NO_2$, made possible by the relatively high PGM loading.

As used herein, an ammonia oxidation (AMOX) catalyst is a catalyst that includes a layer of PGM (such as a DOC), covered by a SCR catalyst layer, which is located after a SCR to carry out dual functions of (1) reducing $NO_x$, and (2) scavenge excess $NH_3$ and selectively oxidize $NH_3$ to $N_2$, thus avoiding $NH_3$ slip.

As used herein, a 4-way catalyst is a catalyst that can serve the roles of a DOC, DPF catalyst, SCR catalyst, urea hydrolysis catalyst, and AMOX catalyst concurrently.

HBC-Based 4-Way Catalyst Structure

Figure 2:
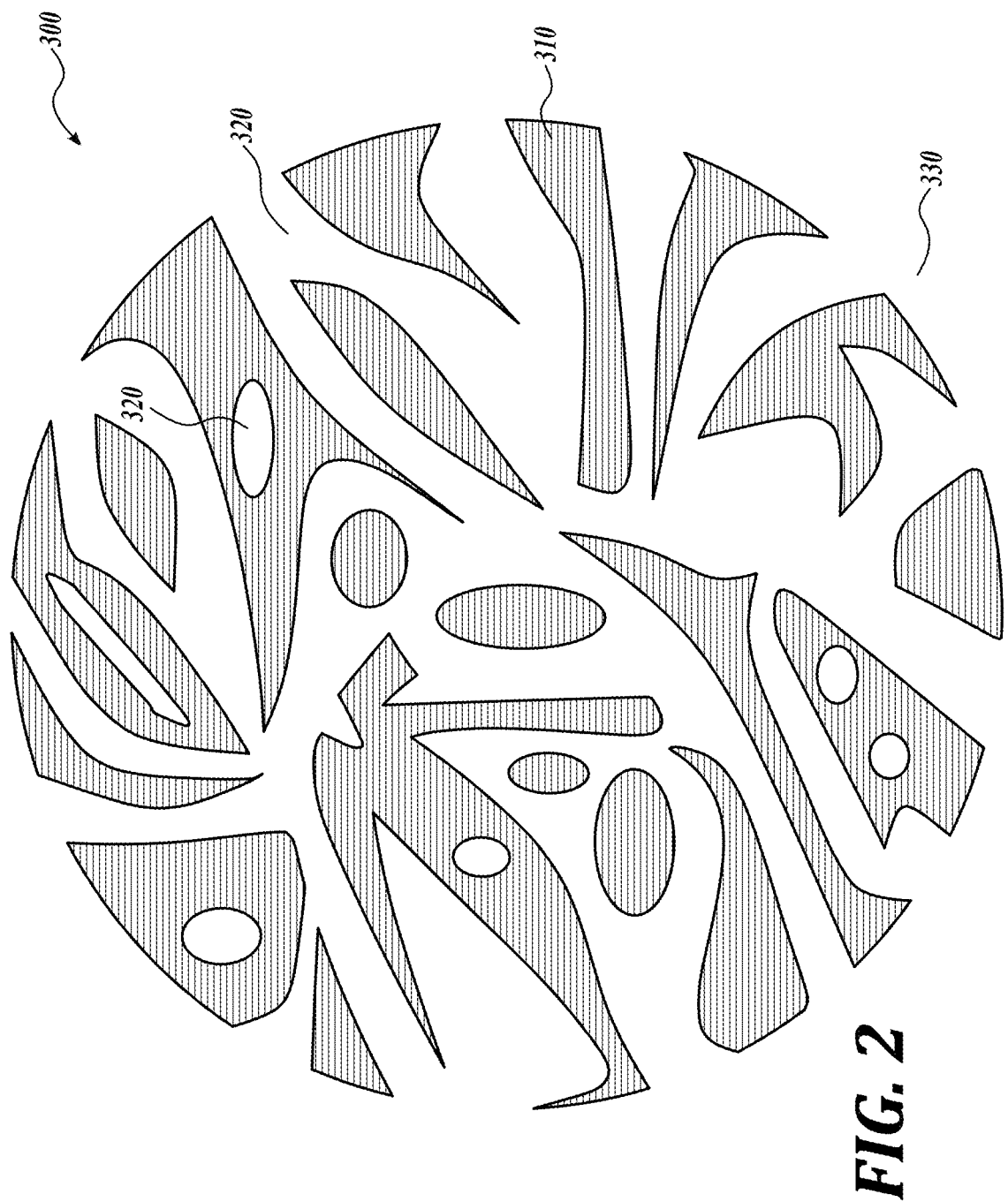
FIG. 2 is graphical representation of an embodiment of a particle of a primary catalyst, showing mesopores and catalytic surfaces within the particle.

As discussed above, in general, the HBC-based 4-way catalysts include a primary catalyst that can be a highly porous particle and a secondary catalyst. The secondary catalyst is hybridized to the surfaces (e.g., the internal porous surface and/or the external surface) of the primary catalyst. In some embodiments, referring to FIG. 2, the primary catalyst 300 is a metal zeolite. The metal zeolite has a plurality of metal oxide secondary catalyst nanoparticles, which is a mixed crystal structure containing elements (e.g., Si and/or Al, or Si and Al) from the primary catalyst on the metal zeolite's inner and/or outer surface. The metal zeolite can have a large surface area provided by a variety of pores, such as micropores 310, mesopores 320, and macropores 330. The micropores have a maximum pore dimension of up to 2 nm. The mesopores have a maximum pore dimension of from 2 to 50 nm. The macropores have a maximum pore dimension of greater than 50 nm. In some embodiments, the macropores are the spaces between particles of primary catalyst 300.

Without wishing to be bound by theory, it is believed that the pores provide access for penetration of a secondary catalyst precursor into the primary catalyst, such that the secondary catalyst can form by incorporating structural elements at the surface of the primary catalyst and thereby crystallize in well-dispersed discrete locations within the primary catalyst. The higher surface area afforded by pores allows for decreased diffusion resistance and lower pressure difference for an exhaust gas that is to be treated by the HBC-based 4-way catalyst; resulting in greater fuel economy. A further advantage of secondary catalyst-containing primary catalyst is the sustained activity that can be afforded by the HBC-based 4-way catalyst under conditions where soot/ash covers the outer surfaces of a catalyst particle, which would otherwise poison the catalyst; however, with the HBC-based 4-way catalysts of the present disclosure, the likelihood of poisoning is decreased because the soot/ash cannot access the inner surface of the primary catalyst, which is covered by a dispersion of a secondary catalyst. Thus, the combination of a well-dispersed secondary catalyst on a primary catalyst can be resistant to formation of soot and ash. The well-dispersed secondary catalyst also provides highly reactive catalytic sites that can operate in a synergistic manner with the primary catalyst. For example, the secondary catalyst (e.g., a metal oxide) can adsorb NO and rapidly convert the NO to $NO_2$, which reacts in the presence of $NH_3$ on an adjoining primary catalyst site (e.g., a metal zeolite) to produce $N_2$. Because the secondary catalyst is well dispersed, a large surface area of catalytically active sites can be provided, with enhanced catalytic activity.

Without wishing to be bound by theory, it is believed that the HBCs of the present disclosure have cation loading by the metal oxide phase of HBC is dependent on both the amount of metal oxide phase present, as well as the composition of the metal oxide phase. The cation loading capacity can play an important role in platinum group metal (PGM) binding to obtain highly distributed, high activity catalytic centers, which can translate into lower PGM loadings, reduced tendency for deactivation by sintering, and reduced overall cost.

Figure 3:
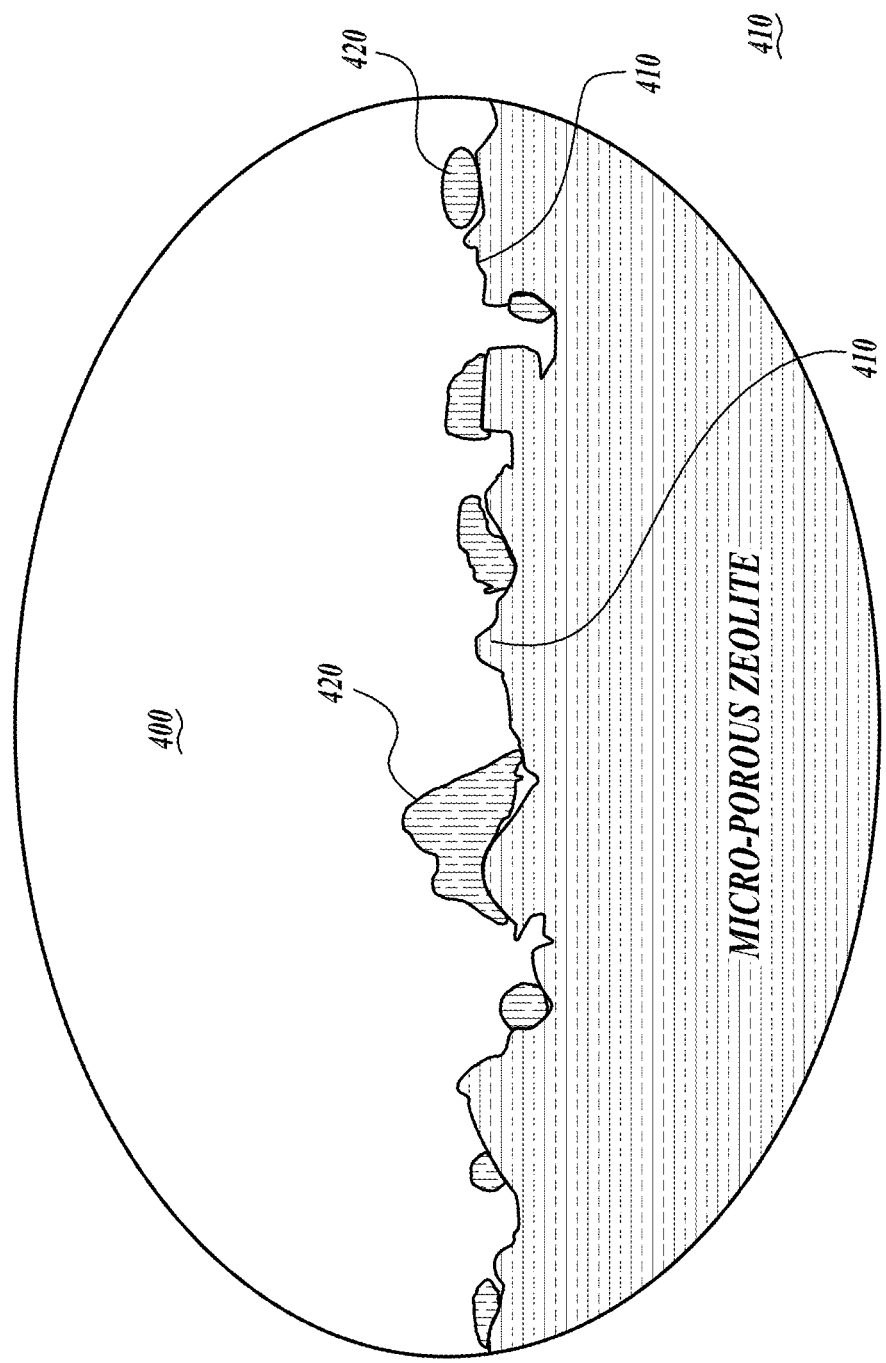
FIG. 3 is graphical representation of a mesoporous space within a hybrid binary catalyst (HBC) particle.

Without wishing to be bound by theory, it is believed that the HBC-based 4-way catalysts provide different types of active sites that are located in close proximity to one another within and/or on a HBC-based 4-way catalyst particle. For example, referring to FIG. 3, mesopores 400 can include primary catalyst active sites 410 in close proximity to hybridized secondary catalyst active sites 420. At the hybridized secondary catalyst active sites 420, the secondary catalyst is hybridized to the surface of the primary catalyst.

The different types of active sites can provide combined catalytic functionalities, faster reaction kinetics, synergy for high performance catalyst activity, and/or improved catalyst durability. In some embodiments, the different types of active sites can allow for rational catalyst design for SCR, DOC, or other catalysts in an EAS; and/or can allow for compact and lightweight EAS. Without wishing to be bound by theory, it is believed that faster reaction kinetics result from the increased number and close proximity of the catalyst active sites in HBC-based 4-way catalysts, such that multiple catalytic reactions can occur in close proximity to one another both in time and space. For example, a SCR catalyst and a selective catalytic oxidation (SCO) catalyst can be spaced apart in the angstrom range in a HBC-based 4-way catalyst, which is closer in distance by 2 to 3 orders of magnitude compared to physically mixed particles of a SCR and SCO catalyst, as described, for example, in U.S. patent application Ser. No. 14/935,199.

Without wishing to be bound by theory, it is also believed that improved catalyst durability can be achieved with a HBC-based 4-way catalyst due to combination of properties of the components of the HBC-based 4-way catalyst. For example, a highly oxidative secondary catalyst can be combined with a high temperature-tolerant primary catalyst in an appropriate ratio to achieve a HBC-based 4-way catalyst that has both high oxidative properties and temperature tolerance.

Figure 4:
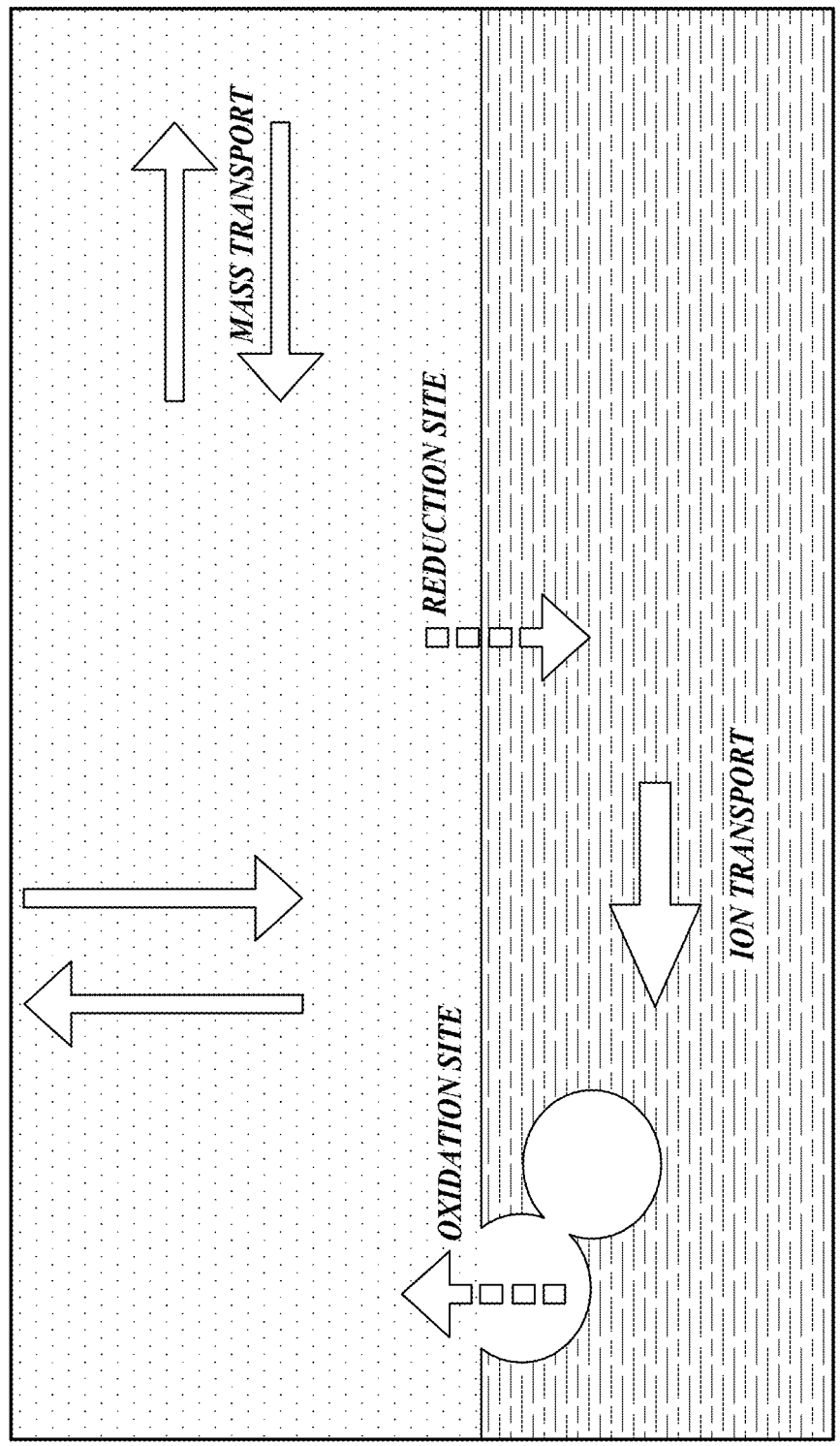
FIG. 4 is a schematic illustration of oxidation/reduction reaction on discrete sites within and/or on the surface of an HBC particle.

Without wishing to be bound by theory, it is believed that the primary and secondary catalysts can act in synergy with respect to one another when catalyzing the decomposition of exhaust gases, where the primary and secondary catalysts can both participate in a redox reaction as illustrated in FIG. 4, with one catalyst acting as a reducing agent (e.g., an anode) and the other catalyst acting as an oxidizing agent (e.g., a cathode). The redox reaction shown in FIG. 4 is a spontaneous and self-perpetuating process that occurs at adjacent active sites, where mass transfer limitations are minimal due to the close proximity of the active sites. The HBC-based 4-way catalyst components can be selected to possess ion exchange/binding properties to enable ion transport between sites both on the surface and in the bulk material. For example, doping of $ZrO_2$ with $Y^{3+}$ cationic dopant creates lattice vacancies that permit $O^{2-}$ transport through the bulk. On the other hand, dopants such as $Ba^{2+}$ can create lattice vacancies (e.g., in $BaZrO_3$) that permit cation binding, and hence transport of cations (e.g., $H_3O^+$) between reduction/oxidation sites in the bulk material.

In some embodiments, the HBC-based 4-way catalysts of the present disclosure have a primary catalyst that includes one or more metal zeolites. In some embodiments, the metal zeolite is aluminosilicate zeolites and/or silico-alumino-phosphate zeolites. For example, the metal zeolite can be an aluminosilicate zeolite. In certain embodiments, the metal zeolite is a silico-alumino-phosphate zeolite. In some embodiments, the one or more metal zeolites further include a cation such as $Pt^{2+}$, $Pd^{2+}$, $Rh^{2+}$, $Cu^{2+}$, $Ni^{2+}$, and/or $Fe^{3+}$ in the zeolite active sites. In certain embodiments, the metal zeolite also includes an alkali metal ion such as $Na^+$ and $K^+$ in the zeolite active sites to effectively neutralize (or cap) residual acid sites in the zeolite after doping with the desired catalytic metal ion. In certain embodiments, the one or more zeolite does not include any cations.

In some embodiments, the HBC-based 4-way catalysts can include from 0.5 wt % (e.g., from 1 wt %, from 10 wt %, from 20 wt %, from 30 wt %, from 40 wt %, from 50 wt %, from 60 wt %, from 70 wt %, from 80 wt %, or from 90 wt %) to 99.5 wt % (e.g., to 90 wt %, to 80 wt %, to 70 wt %, to 60 wt %, to 50 wt %, to 40 wt %, to 30 wt %, to 20 wt %, to 10 wt %, or to 1 wt %) of the one or more metal zeolites. In certain embodiments, the HBC-based 4-way catalysts can include from 10 wt % to 50 wt % (e.g., from 20 wt % to 40 wt %, from 30 wt % to 50 wt %, or about 30 wt %) of the one or more metal zeolites.

In some embodiments, the metal zeolite is a Fe-doped aluminosilicate zeolite, a Cu-doped aluminosilicate zeolite, a Fe- and Cu-doped aluminosilicate zeolite, a Fe-doped silico-alumino-phosphate zeolite, a Cu-doped silico-alumino-phosphate zeolite, and/or a Fe and Cu-doped silico-alumino-phosphate zeolite. In certain embodiments, the metal zeolite is a Fe-doped chabazite, a Cu-doped aluminosilicate chabazite, and/or a Fe and Cu-doped chabazite. In certain embodiments, the metal zeolite is a Fe and/or Cu-doped silico-alumino-phosphate zeolite, and Fe- and/or Cu-doped aluminosilicate zeolite in combination. In certain embodiments, the metal zeolite is ZSM-5 and/or β-zeolite. In certain embodiments, the metal zeolite is a chabazite. In certain embodiments, the metal zeolite is SSZ-13 or SAPO-34.

In some embodiments, the HBC-based 4-way catalysts of the present disclosure have a secondary catalyst that includes one or more metal oxides. The metal oxides can be in the form of nanoparticles, having a maximum dimension of from 0.1 nm (e.g., from 1 nm, from 5 nm, from 10 nm, from 20 nm, from 30 nm, or from 40 nm) to 50 nm (e.g., to 40 nm, to 30 nm, to 20 nm, to 10 nm, to 5 nm, or to 1 nm). In certain embodiments, the metal oxides in the form of nanoparticles have a maximum dimension of from 1 nm to 5 nm (e.g., from 1 nm to 4 nm, from 2 nm to 5 nm, from 3 nm to 5 nm; about 3 nm). The secondary catalyst can be imaged via electron microscopy, and can be discrete nanoparticles located on the primary catalyst or within mesopores of the primary catalyst.

The one or more metal oxides of the secondary catalyst of the HBC-based 4-way catalysts can include, for example, cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, iridium oxide, nickel oxide, barium oxide, yttrium oxide, scandium oxide, calcium oxide, barium oxide, manganese oxide, lanthanum oxide, strontium oxide, cobalt oxide, copper oxide, iron oxide, and/or any combination thereof. In some embodiments, the one or more metal oxides of the HBC-based 4-way catalysts are zirconium oxide, vanadium oxide, cerium oxide, manganese oxide, chromium oxide, cobalt oxide, titanium oxide, tungsten oxide, barium oxide, and/or any combination thereof. In certain embodiments, the one or more metal oxides of the HBC-based 4-way catalyst include zirconia, ceria, vanadia, chromium oxide, barium oxide and niobium oxide.

In some embodiments, the one or more metal oxides of the secondary catalysts of the HBC-based 4-way catalysts further include a cationic dopant. For example, the cationic dopant can include an oxide that includes $Mg^{2+}$, $Cu^{2+}Cu^+$, $Ni^{2+}$, $Ti^{4+}$, $V^{4+}$, $Nb^{4+}$, $Ta^{5+}$, $Cr^{3+}$, $Zr^{4+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, $Nb^{5+}$, $Sr^{2+}$, $Pt^{2+}$, $Pd^{2+}$, and/or $Rh^{2+}$. In certain embodiments, the cationic dopant is an oxide that includes $Pt^{2+}$, $Pd^{2+}$, and/or $Rh^{2+}$.

In certain embodiments, the one or more metal oxides of the secondary catalysts of the HBC-based 4-way catalysts include a cation of one or more of the following elements: Ca, Sr, Ba, Sc, Ti, V, Cr, Mn, Fe, Co, Ni, Cu, Zn, Y, Zr, Nb, Mo, W, Ce, and/or P, which, with the exception of P, can be in the form of an oxide, and/or in the form of dopants in a metal oxide of the secondary catalyst. In some embodiments, when in the form of dopants, the dopant cations is achieved by incipient wetness impregnation and is bound by the anion exchange characteristics of the metal oxide, as described, for example, in Example 4, below. In some embodiments, one or more metal oxides of the secondary catalysts of the HBC-based 4-way catalysts include a cation of one or more of Ba, Co, Zr, and/or P.

The HBC-based 4-way catalysts of the present disclosure provide flexibility in their compositions. For example, the composition can be changed by adjusting an oxidative power to address the tradeoff between $NO_x$ reduction performance and durability. In some embodiments, the optimal composition can be determined for each metal oxide system. The compositions presented herein illustrate the unique nature of this whole new class of catalyst material. In some embodiments, the one or more metal oxides of the secondary catalyst of the HBC-based 4-way catalysts are $CeO_2:ZrO_2$ (i.e., a mixture of $CeO_2$ and $ZrO_2$ having, for example, from 40 wt % to 60 wt % $CeO_2$, $Y_2O_3:CeO_2$ (i.e., a mixture of $Y_2O_3$ and $CeO_2$, where, in some embodiments, has about 10 wt % of $Y_2O_3$), $BaZrO_3$, $Zr_{0.8}Sr_{0.2}CoO_3$, $Zr_{0.9}Ca_{0.1}O_x$ where x is an amount of O that counterbalances the Zr and Ca cations of the composition, $Zr_{0.5}Ba_{0.5}Mn_3O_4$, $Ba_{0.3}Zr_{0.7}O_x$ ($Ba_{0.3}Zr_{0.7}$ oxide) where x is an amount of O that counterbalances the Ba and Zr cations of the composition, $Zr_{0.5}Ba_{0.5}CrO_3$, $Zr_{0.5}Ba_{0.5}CoO_x$ (including higher oxidation states of cobalt oxide) where x is an amount of O that counterbalances the Zr, Ba, and Co cations of the composition, Zr oxides, and/or $TiO_2:CeO_2$ (i.e., a mixture of $TiO_2$ and $CeO_2$), each optionally including a cationic dopant that is an oxide that includes $Ba^{2+}$, $Pt^{2+}$, $Pd^{2+}$, $Rh^{2+}$, $Ru^{2+}$, $Cu^{2+}$, $Ni^{2+}$, and $Fe^{3+}$. In some embodiments, the metal oxide of the secondary catalyst in the HBC-based 4-way catalysts is $ZrO_2$, $Y_2O_3:ZrO_2$, $ZrV_2O_7$, $Zr_{0.3}Ba_{0.1}V_{0.6}O_x$ where x is an amount of O that counterbalances the Zr, Ba, and V cations of the composition, $Zr_{0.7}Ti_{0.3}VO_x$ where x is an amount of O that counterbalances the Z, Ti, and V cations of the composition, $Zr_{0.7}Ba_{0.3}$ oxide, and/or $CeO_2:ZrO_2$. In certain embodiments, while $CeO_2$ has higher oxidative power, $ZrO_2$ is selected instead as the secondary catalyst based upon both durability consideration and its ability to be modified by doping with strong oxidizing species (such as $Mn_3O_4$, $CoO_3$, $V_2O_7$, $CrO_3$, $WO_2$, $MoO_2$, NiO, $Fe_3O_4$, $(HPO_4)^{2-}$, any combination thereof, and the like), in addition to modifiers such as BaO, which can enhance $NO_x$ storage.

In some embodiments, the HBC-based 4-way catalyst do not include a cationic dopant. In some embodiments, the HBC-based 4-way catalyst consists of a metal oxide including a cationic dopant. In certain embodiments, the HBC-based 4-way catalyst consists of a metal oxide. In some embodiments, the one or more metal oxides do not include a cationic dopant. In some embodiments, the secondary catalyst consists of a metal oxide including a cationic dopant. In certain embodiments, the secondary catalyst consists of a metal oxide.

In some embodiments, the HBC-based 4-way catalysts can have from 0.5 wt % (e.g., from 1 wt %, from 10 wt %, from 20 wt %, from 30 wt %, from 40 wt %, from 50 wt %, from 60 wt %, from 70 wt %, from 80 wt %, or from 90 wt %) to 99.5 wt % (e.g., to 90 wt %, to 80 wt %, to 70 wt %, to 60 wt %, to 50 wt %, to 40 wt %, to 30 wt %, to 20 wt %, to 10 wt %, or to 1 wt %) of the one or more metal oxide secondary catalysts.

The HBC-based 4-way catalysts of the present disclosure can have a variety of desirable properties. For example, the HBC-based 4-way catalysts can have a thermal resistance of up to 600° C. As used herein, "thermal resistance" refers to the ability of a catalyst to retain catalytic activity even with repeated exposure of up to 600° C. over extended periods of time (e.g., 100 hours).

The HBC-based 4-way catalysts can offer combinations of desirable catalytic properties. For example, a SCR catalyst including Cu and/or Fe-doped zeolite-based HBC-based 4-way catalysts having one crystalline metal oxide on an outer surface or within the zeolite mesopores can be additionally modified with a non-crystalline selective catalytic oxidation (SCO) catalyst by impregnation of an applied washcoat using an appropriate precursor solution (such as nickel sulfate heptahydrate), without the need to mix separate SCR and SCO particles. High SCR:SCO ratios can be achieved with equivalent or higher SCO surface area for enhanced $NH_3$ storage capacity with a lower mass of metal oxide, compared to that for a physical mixture of primary and secondary catalyst particles. The SCO phase can be tailored to obtain optimal oxidative power (e.g., with $CrO_3$) independently of storage capacity for reactants such as $NH_3$ or for $NO_x$ (e.g., with BaO). In some embodiments, the HBC-based 4-way catalysts of the present disclosure provides the ability to design and construct all major types of heavy duty diesel aftertreatment catalyst, such as a 4-way catalyst, described below.

The HBC-based 4-way catalysts of the present disclosure can have tailored cold start and cold FTP cycle performance. As used herein, cold start conditions refer to the first 400 seconds after key-on as the temperature of the aftertreatment increases to achieve the optimal 350-450° C. range for $NO_x$ reduction. As used herein, an "FTP cycle" refers to an EPA Federal Test Procedure, commonly known as FTP-75 for a city driving cycle. The HBC-based 4-way catalysts can provide $NO_x$ reduction catalyst compositions with effective performance in low or zero $NO_2$ conditions, such as when a close couple SCR is employed without a DOC upstream, or when a SCRF is used and soot oxidation reaction competes with the fast SCR reaction for the available $NO_2$. A DOC is used to produce sufficient $NO_2$ to optimally obtain a $NO_2/NO_x$ ratio of unity. As $NO_2/NO_x$ declines, so does the $NO_x$ reduction efficiency, due to the critical role played by $NO_2$ in the "fast" SCR reaction (see reaction (3), above).

In some embodiments, the HBC-based 4-way catalysts of the present disclosure have a BET surface area of at least 200 $m^2/g$ (e.g., at least 300 $m^2/g$, at least 400 $m^2/g$, or at least 500 $m^2/g$). Without wishing to be bound by theory, it is believed that HBC-based 4-way catalyst with a large BET surface area has greater catalytic activity compared to an HBC-based 4-way catalyst with a smaller BET surface area.

In some embodiments, the HBC-based 4-way catalyst has increased catalytic activity compared to a catalyst including metal oxide nanoparticles and a non-porous metal zeolite. As an example, a HBC-based 4-way catalyst including Cu-doped chabazite (CuSSZ-13) hybridized with nanocrystals of $Ba_{0.3}Zr_{0.7}O_x$ (where x is an amount of O that counterbalances the Zr and Ba cations of the composition) has a $T_{50}$ of 240° C. for $NO_x$ reduction efficiency with no $NO_2$ in the feed stream, which compares favorably with a reference 2013 commercial SCR control catalyst $T_{50}$ of 300°

C. (see Example 2, infra). The 60° C. lower lightoff temperature for $NO_x$ reduction for this HBC-based 4-way catalyst translates to the possibility of significant improvements over conventional SCR catalysts in cold start and cold FTP performance.

HBCs as Engine Aftertreatment Catalysts

The HBC-based 4-way catalysts of the present disclosure are highly versatile and can be used, for example, as a diesel oxidation catalyst (DOC), a diesel particulate filter (DPF) catalyst, a selective catalytic reduction (SCR) catalyst that can be used in a conventional SCR and/or in a SCRF configuration, a urea hydrolysis catalyst, and/or an ammonium oxidation (AMOX) catalyst.

As an example, a HBC-based DOC can have a zeolite primary catalyst of relatively high thermal resistance (e.g., small pore zeolites such as SSZ-13), while possessing good hydrocarbon (HC) and $NO_x$ storage capacities. As used herein, "storage capacity" refers to the ability of a catalyst to adsorb amounts of the reactant species on the surface as a first step in the heterogeneous catalysis process. Therefore, it is understood by a person of ordinary skill in the art that good storage capacities (i.e., good adsorptive properties) are desirable for good reaction rates.

Storage capacities can be modified by exchanging cations (e.g., $Pt^{2+}$, $Pd^{2+}$, $Rh^{2+}$, $Ru^{2+}$, $Cu^{2+}$, $Ni^{2+}$, and/or $Fe^{3+}$) into the active sites of the zeolite. The secondary catalyst in the HBC-based DOC can be a metal oxide that has relatively high oxidative power (e.g., $CeO_2$:$ZrO_2$, Y-doped $CeO_2$, $BaZrO_3$, $Zr_{0.8}Sr_{0.2}CoO_3$, $Zr_{0.8}Co_{0.2}O_4$, $CeO_2$—$Mn_3O_4$, Ce/Co/Zr, and/or $TiO_2$—$CeO_2$), modified with cations that can enhance $NO_x$ storage (e.g., $Ba^{2+}$), as well as enhance $NO_x$, CO, and HC oxidation compared to conventional Cu-zeolite-based SCR catalysts (e.g., $Pt^{2+}$, $Pd^{2+}$, $Rh^{2+}$, $Cu^{2+}$, $Ni^{2+}$, and/or $Fe^{3+}$).

In some embodiments, a HBC-based DOC includes a zeolite primary catalyst with a metal oxide secondary catalyst such as $ZrV_2O_7$; $Zr_{0.3}Ba_{0.1}V_{0.6}O_x$ where x is an amount of O that counterbalances the Zr, Ba, and V cations of the composition, and/or $Ce_{0.6}Zr_{0.4}$, which can be further modified with $Pt^{2+}$, $Pd^{2+}$, $Rh^{2+}$, $Ru^{2+}$, $Cu^{2+}$, $Ni^{2+}$, $Fe^{3+}$, and/or $Ba^{2+}$. In some embodiments, complex oxides can have non-stoichiometric amounts of oxygen to lattice oxygen vacancies due to doping of the foreign cation into the lattice structure. Relatively large pore size zeolite primary catalysts (e.g., β-zeolite) are preferred due to their enhanced HC storage ability compared with small pore zeolites (e.g., chabazite).

The HBC-based DOC can be located upstream of the SCR. An important variant of a DOC is a partial oxidation catalyst (POC), which is a DOC-like catalyst applied to a particle filter that enables the oxidation of volatile organic compound (VOC) components of particulate matter in the exhaust gas while allowing larger particles to pass through to the DPF. The POC can serve the normal function of the DOC, and may preferentially be located upstream of a SCRF, to reduce as much as 50% of the soot reaching the SCRF; thus almost doubling the ash cleaning interval for a SCRF, which is otherwise considerably less when compared to a conventional DPF.

In some embodiments, DPF catalysts are constructed from HBCs as described above for the DOC. A conventional DPF is located downstream of the DOC and upstream of the SCR, and is made of a particle filter substrate with a Pt/Pd-based catalyst coating that can oxidize $NO_x$ to generate $NO_2$; oxidize residual HC that can pass through the DOC; passively and/or actively oxidize soot in regenerating the DPF to form ash for storage; and provide a higher storage capacity, which results in a longer cleaning interval and a lower maintenance cost for the EAS. In some embodiments, as with DOC catalysts, the HBC-based DPF catalyst includes HBC catalysts having low or zero Pt/Pd content.

In some embodiments, an HBC-based SCR catalyst is composed of zeolites with relatively high thermal resistance (e.g., small micropores) zeolites such as SSZ-13 and SAPO-34), which has been doped with $Cu^{2+}$ and/or $Fe^{3+}$; with or without an alkali metal ions such as $Na^+$ or $K^+$, which can occupy residual Bronsted Lowry sites of the zeolite structure but serve no direct catalytic function. The secondary catalyst in the HBC-based SCR catalyst can be a metal oxide that has an oxidative power that can be tailored based upon the trade-off between $NO_x$ reduction performance and durability, such as $ZrO_2$ or Y-doped $ZrO_2$, $ZrV_2O_7$, $TiO_2$/$ZrV_2O_7$, $Zr_{0.3}Ba_{0.1}V_{0.6}O_x$ where x is an amount of O that counterbalances the Zr, Ba, and V cations of the composition, $TiO_2$:$ZrV_2O_7$ (e.g., $Zr_{0.7}Ti_{0.3}VO_x$ where x is an amount of O that counterbalances the Zr, Ti, and V cations of the composition), $Zr_{0.7}Ba_{0.3}$ oxide, and/or $CeO_2$:$ZrO_2$. The HBC-based SCR catalyst can be employed in a conventional SCR and/or in a SCRF configuration.

In certain embodiments, the HBC-based SCR catalyst includes a metal oxide secondary catalyst such as $CeO_2$:$ZrO_2$ (i.e., a mixture of $CeO_2$ and $ZrO_2$, such as from 40% to 60 wt % Ce in Zr), $Ce_{0.6}Zr_{0.4}O_x$ where x is an amount of O that counterbalances the Zr and Ce cations of the composition, $Y_2O_3$:$CeO_2$ (i.e., a mixture of $Y_2O_3$ and $CeO_2$), $BaZrO_3$, $Zr_{0.8}Sr_{0.2}CoO_3$, $Zr_{0.9}Ca_{0.1}O_x$ where x is an amount of O that counterbalances the Zr and Ca cations of the composition, $Zr_{0.5}Ba_{0.5}Mn_3O_4$, $Ba_{0.3}Zr_{0.7}O_x$ where x is an amount of O that counterbalances the Zr and Ba cations of the composition, $Zr_{0.5}Ba_{0.5}CrO_3$, $Zr_{0.5}Ba_{0.5}CoO_x$ where x is an amount of O that counterbalances the Zr, Ba, and Co cations of the composition (including higher oxidation states of cobalt oxide), Zr oxides and/or $TiO_2$:$CeO_2$, $ZrO_2$, $Y_2O_3$: $ZrO_2$, $ZrV_2O_7$, $Zr_{0.3}Ba_{0.1}V_{0.6}O_x$ where x is an amount of O that counterbalances the Zr, Ba, and V cations of the composition, and/or $TiO_2$:$ZrV_2O_7$ (e.g., $Zr_{0.7}Ti_{0.3}VO_x$ where x is an amount of O that counterbalances the Zr, Ti, and V cations of the composition).

Figure 1B:
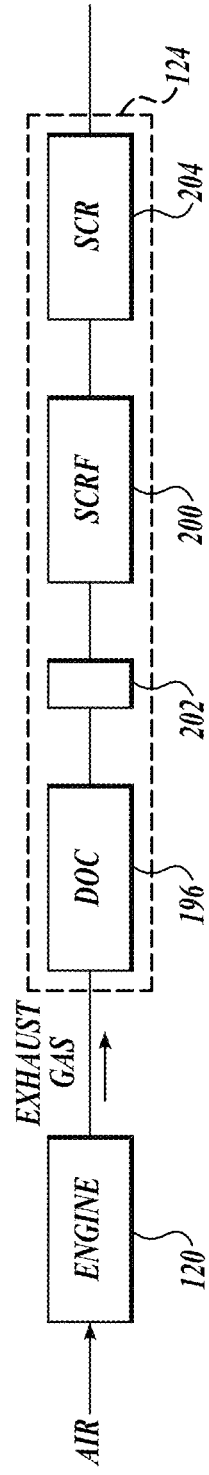
FIG. 1B is a block diagram of an example of an aftertreatment system coupled to an internal combustion engine.
Figure 1C:
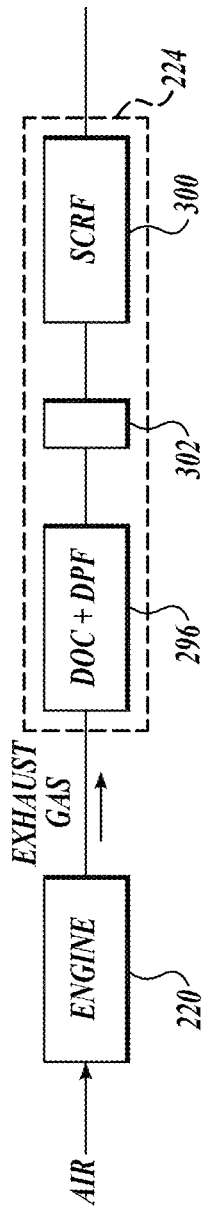
FIG. 1C is a block diagram of an example of an aftertreatment system coupled to an internal combustion engine.

In some embodiments, referring to FIG. 1A, the HBC-based SCR catalyst can be used in a diesel particulate filter in a SCR system 104, such as a wall-flow filter, and particularly the monolithic core of the wall-flow filter. In some embodiments, the HBC-based SCR catalyst can lead to more compact exhaust aftertreatment systems. For example, referring to FIG. 1B, an exhaust aftertreatment system 124 includes a diesel oxidation catalytic system 196 upstream of a diesel exhaust fluid doser 202. A selective catalytic reduction on-filter (SCRF) 200 is downstream of the diesel exhaust fluid doser 202, and SCRF 200 is followed by a selective catalytic reduction system 204. The SCRF includes a diesel particulate filter (DPF) with a catalytic substrate having an HBC-based SCR catalyst coated thereon, thereby providing a compact SCRF that combines the functions of both a DPF and a selective catalytic reduction system. In some embodiments, referring to FIG. 1C, an exhaust aftertreatment system 224 includes a combined diesel oxidation catalytic system ("DOC") and a diesel particulate filter 296 upstream of a diesel exhaust fluid doser 302. Downstream of the diesel exhaust fluid doser 302 is SCRF 300, which includes a DPF with a catalytic core having an HBC-based SCR catalyst loaded thereon. Exhaust aftertreatment system 224 has a DPF both upstream and downstream of the mixer and therefore increases the filter capacity. As shown in FIG. 1C, exhaust aftertreatment system 224 is more compact than the exhaust aftertreatment system 124 shown in FIG. 1B.

Figure 1D:
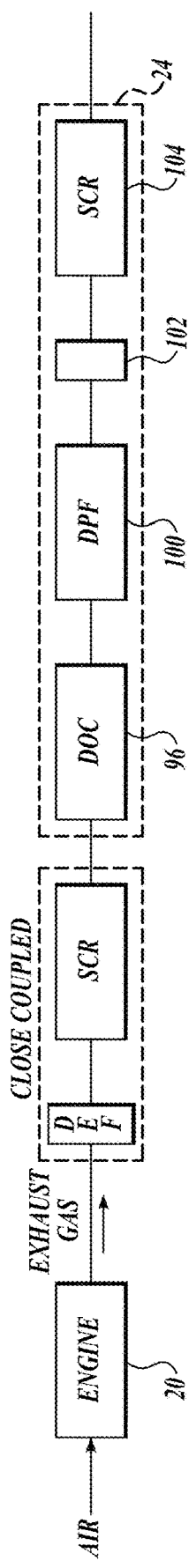
FIG. 1D is a block diagram of an example of an aftertreatment system coupled to an internal combustion engine.
Figure 1E:
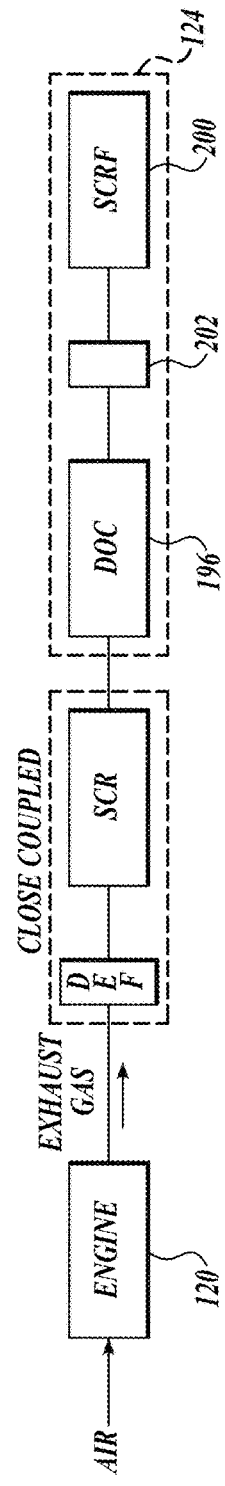
FIG. 1E is a block diagram of an example of an aftertreatment system coupled to an internal combustion engine.
Figure 1F:
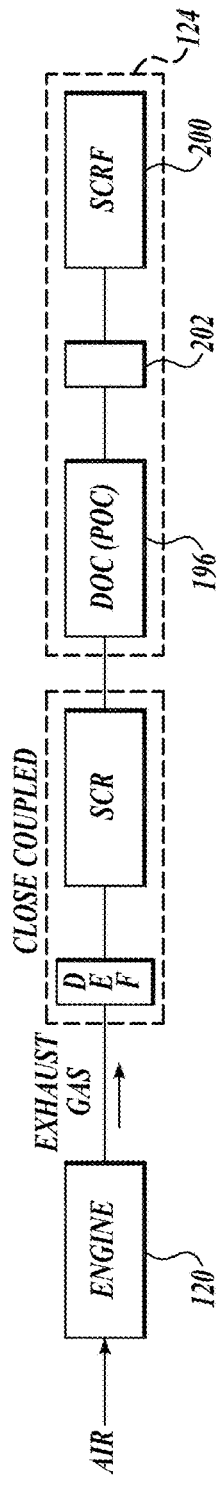
FIG. 1F is a block diagram of an example an aftertreatment system close coupled to an internal combustion engine with a DOC (POC) upstream of a SCRF.

In certain embodiments, a "close-coupled SCR" with DEF doser may be located as close to the engine as possible, to obtain optimal reaction temperature despite reduced exhaust temperatures due to the use of an EGR. Examples of close-coupled SCR configurations are shown in FIGS. 1D and 1E. These close-coupled SCR configurations employ dual DEF dosers, with a DEF doser upstream of each SCR in the EAS, forming a more complex system configuration compared to current EASs, which generally have one DEF doser. EAS including a close-coupled HBC-based POC upstream of a SCRF is shown in FIG. 1F.

In some embodiments, a HBC-based AMOX catalyst can replace conventional catalyst compositions, which typically include a Pt/Pd catalyst washcoat on a flow through substrate, covered by a second Cu or Fe zeolite SCR washcoat catalyst layer. The AMOX catalyst is configured to utilize ammonia slip from SCR for $NO_x$ reduction, while decreasing the likelihood of $NH_3$ slip into the environment. Preferred embodiment of the HBC-based AMOX catalyst include, for example, a Cu and/or Fe-doped zeolite primary catalyst with one or more metal oxide secondary catalysts including $CeO_2$:$ZrO_2$ (i.e., a mixture of $CeO_2$ and $ZrO_2$, preferably between 40 wt % to 60 wt % Ce, $Y_2O_3$:$CeO_2$ (i.e., a mixture of $Y_2O_3$ and $CeO_2$), $BaZrO_3$, $Zr_{0.9}Ca_{0.1}O_2$, $Zr_{0.8}Sr_{0.2}CoO_3$, $Zr_{0.5}Ba_{0.2}Mn_{0.3}O_4$, $Ba_{0.3}Zr_{0.7}O_x$ where x is an amount of O that counterbalances the Zr and Ba cations of the composition, $Zr_{0.5}Ba_{0.5}CrO_3$, $Zr_{0.5}Ba_{0.5}CoO_x$ (including higher oxidation states of cobalt oxide, where x is an amount of O that counterbalances Zr, Ba, and Co cations of the composition), Zr oxides and/or $TiO_2$:$CeO_2$ (i.e., a mixture of $TiO_2$ and $CeO_2$), $ZrO_2$, $Y_2O_3$:$ZrO_2$, $ZrV_2O_7$, $Zr_{0.3}Ba_{0.1}V_{0.6}O_x$ where x is an amount of O that counterbalances the Zr, Ba, and V cations of the composition, $TiO_2$:$ZrV_2O_7$, $Zr_{0.7}Ti_{0.3}VO_x$ where x is an amount of O that counterbalances the Zr, Ti, and V cations of the composition, and/or $Ce_{0.6}Zr_{0.4}O_4$. The HBC-based AMOX catalyst can be further modified with $Pt^{2+}$, $Pd^{2+}$, $Rh^{2+}$, $Ru^{2+}$, $Cu^{2+}$, $Ni^{2+}$, $Fe^{3+}$, and/or $Ba^{2+}$.

In certain embodiments, the HBC-based AMOX catalyst includes a first catalyst layer that includes a metal zeolite primary catalyst having mesopores and metal oxide secondary catalyst crystalline nanoparticles hybridized to the surface of the metal zeolite. The metal zeolite primary catalyst can include an aluminosilicate zeolite and/or a silico-alumino-phosphate zeolite. The aluminosilicate zeolite or silico-alumino-phosphate zeolite can includes a cation such as $Pt^{2+}$, $Pd^{2+}$, $Cu^{2+}$, $Ni^{2+}$, and/or $Fe^{3+}$, and wherein the aluminosilicate zeolite or silico-alumino-phosphate zeolite optionally includes an alkali metal ion selected from $Na^+$ and $K^+$. The metal oxide secondary catalyst can include $CeO_2$:$ZrO_2$, $Y_2O_3$:$CeO_2$, $BaZrO_3$, $Zr_{0.8}Sr_{0.2}CoO_3$, $CeO_2$—$Mn_3O_4$, Ce/Co/Zr oxides, $Zr_{0.9}Ca_{0.1}O_x$ where x is an amount of O that counterbalances the Zr and Ca cations of the composition, $Zr_{0.5}Ba_{0.5}Mn_3O_4$, $Ba_{0.3}Zr_{0.7}O_x$ where x is an amount of O that counterbalances Zr and Ba cations of the composition, $Zr_{0.5}Ba_{0.5}CrO_3$, $Zr_{0.5}Ba_{0.5}CoO_x$ (including higher oxidation states of cobalt oxide) where x is an amount of O that counterbalances the Zr, Ba, and Co cations of the composition, Zr oxides and/or $TiO_2$:$CeO_2$ (i.e., a mixture of $TiO_2$ and $CeO_2$), $ZrO_2$, $Y_2O_3$:$ZrO_2$, $ZrV_2O_7$, $Zr_{0.3}Ba_{0.1}V_{0.6}O_{4-7}$, $TiO_2$:$ZrV_2O_7$, $Zr_{0.7}Ti_{0.3}VO_x$ where x is an amount of O that counterbalances the Zr, Ti, and V cations of the composition, and/or $Ce_{0.6}Zr_{0.4}O_4$. The HBC-based AMOX catalyst can be further modified with $Ba^{2+}$, $Pt^{2+}$, $Pd^{2+}$, $Rh^{2+}$, $Ru^{2+}$, $Cu^{2+}$, $Ni^{2+}$, and/or $Fe^{3+}$.

The HBC-based ammonium oxidation catalyst can also include a second catalyst layer including a metal zeolite and metal oxide nanoparticles hybridized to the surface. The metal zeolite can include an aluminosilicate zeolite and a silico-alumino-phosphate zeolite. The aluminosilicate zeolite or silico-alumino-phosphate zeolite includes a cation selected from $Cu^{2+}$, $Ni^{2+}$, and $Fe^{3+}$, and wherein the aluminosilicate zeolite or silico-alumino-phosphate zeolite optionally includes an alkali metal ion selected from $Na^+$ and $K^+$. The metal oxide nanocrystalline particle is $ZrO_2$, $Y_2O_3$:$ZrO_2$, $ZrV_2O_7$, $Zr_{(1-x)}Ba_x$ oxide (where x is between 3 and 4), $BaZrO_3$, $Zr_{0.8}Sr_{0.2}CoO_3$, $CeO_2$—$Mn_3O_4$, Ce/Co/Zr oxides, $BaZrO_3$, $Zr_{0.9}Ca_{0.1}O_2$, $Zr_{0.5}Ba_{0.5}Mn_3O_4$, $Ba_{0.3}Zr_{0.7}O_x$ where x is an amount of O that counterbalances the Ba and Zr cations of the composition, $Zr_{0.5}Ba_{0.5}CrO_3$, $Zr_{0.5}Ba_{0.5}CoO_x$ (including higher oxidation states of cobalt oxide) where x is an amount of O that counterbalances the Zr, Ba, and Co cations of the composition, Zr oxides and/or $TiO_2$:$CeO_2$ (i.e., a mixture of $TiO_2$ and $CeO_2$), $ZrO_2$, $Y_2O_3$:$ZrO_2$, $ZrV_2O_7$, $Zr_{0.3}Ba_{0.1}V_{0.6}O_{3-7}$, $TiO_2$:$ZrV_2O_7$, $Zr_{0.7}Ti_{0.3}VO_x$ where x is an amount of O that counterbalances the Zr, Ti, and V cations of the composition, $CeO_2$:$ZrO_2$, and/or $Ce_{0.6}Zr_{0.4}O_4$.

In some embodiments, a HBC-based urea hydrolysis catalyst has the same composition as a HBC-based SCR catalyst, or has a dramatically reversed ratio of zeolite-to-metal oxide (i.e., with the metal oxide secondary catalyst as the majority species in the HBC). In some embodiments, the HBC includes metal oxide nanoparticles and a metal zeolite. The metal zeolite has metal oxide nanoparticles hybridized on the available surfaces.

In certain embodiments, the HBC-based urea hydrolysis catalyst is applied to the surface of an impact static mixer and has a $NO_x$ conversion efficiency of at least 10%.

Hydrolysis Catalyst Washcoat Procedure:

A washcoat slurry including the following can be used to coat a metallic mixer device, which can first be surface roughened by abrasion, degreased with isopropanol and washed with deionized water:HBC (Type B, see below), deionized water; optionally lactic acid; poly(ethylene glycol-ran-propylene glycol) (e.g., having a molecular weight $M_n$ of about 2,500); poly(ethylene oxide) (e.g., having a molecular weight $M_v$ of about 300,000). Following mixing or milling (such as milling using a roller mill apparatus), the washcoat slurry can be cooled to room temperature and applied to a substrate, such as a metallic mixer. After drying for a period of 8-12 hours in air, the coated mixer can be dried in an air oven at about 100-120° C. A second coating can be optionally applied and the coated mixer can be calcined (e.g., for 1 hr at about 450-650° C.). Relative durability of the coating can be determined by weighing before and after applying a blast of $N_2$ at 70 psig.

In some embodiments, a washcoat slurry including the following can be used to coat a metallic mixer device, which has been surface roughened by abrasion, degreased with isopropanol and washed with deionized water: 3.5 g HBC (Type-B) based upon CuZSM-5 zeolite with_35% hybridized $ZrO_2$; 12 g deionized water; 0.3 g lactic acid; 0.3 g poly(ethylene glycol-ran-propylene glycol) Mn ~2,500; 0.3 g poly(ethylene oxide) Mv 300,000 (all reagents obtained from Sigma-Aldrich). Following extensive mixing in a roller mill apparatus, the slurry was cooled to room temperature and applied to the metallic mixer. After drying for a period of 8-12 hours in air, the coated mixer was dried at 105° C. in an air oven. A second coating was then applied. The washcoat was calcined for 1 hr at 450° C. Relative durability of the coating was determined by weighing before and after applying a blast of N2 at 70 psig.

In some embodiments, the DEF is sprayed onto the coated mixer at a temperature of 150° C. to 500° C. for the $NO_x$ reduction of diesel engine exhaust. It is believed that the primary function of the urea hydrolysis catalyst is the hydrolytic breakdown of urea, HNCO and other urea byproducts as rapidly as possible to facilitate $NH_3$ production; and that $NO_x$ reduction is a secondary function that can contribute to addressing overall $NO_x$ reduction of the EAS. In some embodiments, the urea hydrolysis catalyst can bind and oxidize SCR catalyst poisons, such as hydrocarbons, sulfur, phosphorus, or a combination thereof. In some embodiments, the urea hydrolysis catalyst can be regenerated. In some embodiments, the urea hydrolysis catalyst is a sacrificial catalyst that can irreversibly bind SCR catalyst poisons.

4-Way Catalyst

In some embodiments, a given HBC-based 4-way catalyst of the present disclosure replaces the DOC, DPF catalyst, SCR catalyst, optionally used urea hydrolysis catalyst, and AMOX catalyst that are located in separate compartments in an EAS. Instead, referring to FIG. 5, the HBC-based 4-way catalysts of the present disclosure can be located in a single compartment 500 and perform the functions of the DOC, DPF, SCR, optionally used urea hydrolysis catalyst, and AMOX concurrently, as a 4-way catalyst. A 4-way catalyst is defined as a single catalyst packaging based upon an HBC, with the capability of addressing the four main functions of an EAS: i.e., the functions of the DOC, DPF, SCR, and AMOX catalysts. In some embodiments, the 4-way catalyst also performs the functions of the urea hydrolysis catalyst. The advantages associated with the 4-way catalyst include, for example, the 4-way catalyst can provide compact, lightweight and relatively low cost EAS; can streamline product offering for a global market; can lower manufacturing cost; and can lower cost of ownership for the customer.

In some embodiments, the EAS has one catalyst, a 4-way catalyst, which is based upon the HBC platform technology, with specific regions of the 4-way catalyst modified to emphasize the specific functionalities: DOC or POC, SCR on DPF filter (SCRF) with a hydrolysis catalyst coated DEF mixer, and optionally SCR with an AMOX, as required. The precise dimensions and relative proportions of the different functionalities in the 4-way catalyst can be tailored to the specific engine exhaust conditions (e.g., engine out $NO_x$ levels).

In some embodiments, the HBC-based 4-way catalyst is copper-doped chabazite containing zirconium vanadate and doped with $Pt^{2+}$ and $Pd^{2+}$; copper-doped β-zeolite containing barium vanadate and doped with $Co^{2+}$, $Pd^{2+}$, and $Rh^{2+}$; copper-doped ZSM-5 barium zirconate and doped with $Co^{2+}$, $Pd^{2+}$, and $Ru^{2+}$; copper-doped chabazite containing ceria zirconia and doped with $Pt^{2+}$ and $Pd^{2+}$; and/or copper-doped chabazite containing zirconium barium phosphate and doped with $Ni^{2+}$. In some embodiments, the HBC-based 4-way catalyst is copper-doped chabazite containing zirconium vanadate and doped with $Pt^{2+}$ and $Pd^{2+}$; copper-doped β-zeolite containing barium vanadate and doped with $Co^{2+}$, $Pd^{2+}$, and $Rh^{2+}$; copper-doped ZSM-5 barium zirconate and doped with $Co^{2+}$, $Pd^{2+}$, and $Ru^{2+}$, copper-doped chabazite containing ceria zirconia and doped with $Pt^{2+}$ and $Pd^{2+}$; and/or copper-doped chabazite containing zirconium barium phosphate and doped with $Ni^{2+}$.

As an example, a representative 4-way catalyst composition for heavy duty truck application is as follows:

(i) POC composed of HBC (Type-A), based upon Cuβ-zeolite hybridized with 10% $Zr_{(0.80)}Co_{(0.19)}Ba_{(0.01)}$, and applied to a 50% particle retention metallic filter substrate. After calcining, the washcoat is impregnated with Pd (0.1 g/L):Rh (0.5 g/L) catalyst;

(ii) Hydrolysis catalyst composition: HBC (Type-B) based upon Cuβ-zeolite with 35% hybridized $ZrO_2$, coated onto a metallic static mixer that is equipped for electrical heating;

(iii) SCRF with a HBC (Type-A) composition of Cu (0.6 wt %)-chabazite/3% $Zr_{(0.6)}Ba_{(0.2)}Co_{(0.2)}$ applied to a high porosity (65%) silicon carbide DPF filter with ≥90% particle retention;

(iv) Optionally Cu (0.6 wt %)-Chabazite/3% $Zr_{(0.6)}Ba_{(0.2)}Co_{(0.2)}$ SCR HBC (Type-A) catalyst can be applied to a flow-through substrate to serve as an extra $NO_x$ reduction step under very high engine-out $NO_x$ (e.g., ≥4 g/kW-hr) conditions;

(v) The AMOX can be either in a small portion of a flow-through substrate (downstream of a SCRF), or in a zone coated downstream portion of a SCR (as described in (iv) above). The catalyst in each of the two possibilities includes two distinct layers: a lower layer of HBC catalyst as described in (i) above; and an upper layer of Cu-chabazite.

In some embodiments, the 4-way catalyst includes CuHBC-SSZ13-ZV/≥0.1 g/L [Pt—Rh—Pd], CuHBC-β-ZB (AP)/≥0.1 g/L [Pt—Rh—Pd], and/or CuHBC-β-ZBCo(AP) ≥0.1 g/L [Pt—Rh—Pd] in a DOC (POC) zone; with a urea reductant; CuHBC-SSZ13-ZrO2(AP) in a urea hydrolysis zone; CuHBC-SSZ13-ZB(AP), CuHBC-SSZ13-ZBCo(AP), and/or a blend of CuSSZ-13/CuHBC-SSZ13-ZB(AP) in a SCR on DPF zone; and CuHBC-SSZ13-ZB(AP) in a SCR/AMOX zone.

In some embodiments, the 4-way catalyst includes CuHBC-SSZ13-ZV/≥0.1 g/L [Pt—Rh—Pd], CuHBC-β-ZB (AP)/≥0.1 g/L [Pt—Rh—Pd], and/or CuHBC-β-ZBCo(AP) ≥0.1 g/L [Pt—Rh—Pd] in a DOC (POC) zone; with a hydrogen reductant; CuHBC-SSZ13-ZB(AP), CuHBC-SSZ13-ZBCo(AP)≥0.01 g/L [Pt—Rh—Pd], CuHBC-SSZ13-ZBCo(AP)≥0.01 g/L Pd, and/or CuHBC-SSZ13-ZB-CoP(AP)≥0.01 g/L Ni in a SCR on DPF zone.

Hybrid Binary Catalyst Preparation

The HBC catalysts of the present disclosure, including HBC-based 4-way catalysts, can be synthesized using two different methods, Type-A and Type-B, as outlined below.

Type-A—hybridization between zeolite and metal oxide, followed by copper exchange of the hybrid zeolite/metal oxide material to allow copper to be loaded on both the zeolite and the metal oxide components of the hybridized material.

Type-B—copper exchange of the zeolite (only) provides Cu-zeolite crystals, followed by hybridization to covalently link precursor molecules that transform into metal oxide nanoparticles on the surfaces of Cu-zeolite crystals.

Two hybridization procedures can be employed under the Type-A HBC synthesis method, using metal oxide precursors:

Procedure A—metal oxide precursors were dissolved in acidic aqueous solution, and the resulting mixture was vigorously stirred to obtain slurry containing zeolite particles. The metal oxide precursors were then reacted with the zeolite by neutralizing at elevated temperature (typically with 65° C.), with dropwise addition of ammonium hydroxide solution.

Procedure B—two separate aqueous solutions of reactive precursor were prepared. The first solution contained the zirconium precursor (and potentially other precursors in acid solution), along with the zeolite powder. Upon adding the second solution to the slurry, the hybridization reaction occurred instantaneously.

Procedure A: Co-Precipitation of Precursors from Acid Solution

In general, procedure A includes mixing metal oxide precursor reagents in the appropriate stoichiometric proportions in deionized ("DI") water with urea (a chelating agent) to facilitate nucleation of the precipitating metal oxide(s) at active centers (e.g., Al, Si and P species) on the zeolite crystal surfaces. Examples of precursor reagents include zirconyl chloride octahydrate, ammonium cerium nitrate, potassium permanganate, cobalt nitrate hexahydrate, barium nitrate, ortho phosphoric acid, ammonium molybdate tetrahydrate, calcium nitrate tetrahydrate, chromium nitrate, nickel nitrate, potassium permanganate, titanium chloride, tungsten chloride. The selected zeolite can be added to the clear solution in the powder form, with vigorous stirring to obtain a thoroughly mixed slurry. Optionally, random copolymer poly(ethyleneglycol-ran-polypropyleneglycol) (i.e., PEO-PPO) can be added to obtain optimal uniformity of nanoparticles size and distribution. Heat can be applied (e.g., to about 65° C.) to the slurry and a $NH_4OH$ aqueous solution can be added. The endpoint of the site-directed hybridization reaction can be established when the sol-gel point has been surpassed, which is marked by a dramatic increase in viscosity. Vigorous stirring and continuous heating can allow the high viscosity to decrease, and additional $NH_4OH$ can be added to ensure that all of the available precursors or reactive moieties have been covalently bonded to the zeolite surfaces. Where cobalt precursor is employed, the endpoint is accompanied by a very distinctive color change from bright pink to "cobalt blue". The lack of color in the filtrate and bright cobalt blue color of the retrieved product can be used as a clear indication that most (or all) of the $Co^{2+}$ precursor has been preferentially hybridized to the zeolite surface.

The entire mixture can be either briefly quenched in an ice-bath or filtered while hot. Washing should be conducted with generous quantities of deionized water. The solids should be washed, air dried, oven dried at between 105° C.-120° C. (e.g., for 1 hr), and then calcined at 600° C. (e.g., for 1 hr).

Procedure B: Incipient Co-Reactive Precursor Precipitation

In general, for procedure B, two separate aqueous solutions of reactive precursor are prepared. A first solution contains zirconium and other precursors that only react when neutralized with $NH_4OH$, along with the zeolite powder to form a slurry. The second solution contained a metal oxide precursor, such as ortho phosphoric acid, sodium vanadate, titanium chloride, and/or ammonium molybdate. When the second solution is added to the first solution, the metal oxide precursors in the second solution reacted instantly with the zirconium precursor(s) in the first solution; at room temperature or cooled to below room temperature (e.g., to −15° C.) to regulate the kinetics of the hybridization reaction to form metal oxide nanoparticles on the zeolite surface. The final $NH_4OH$ neutralization step ensures complete hybridization of the precursors to the zeolite surface.

Copper sulfate solution in DI water can be used to treat protonated zeolite, with or without concentrated sulfuric acid adjustment to pH 3. The mixture can be heated at 80° C. for 1-3 hrs, with constant stirring. The copper-exchanged product should be filtered, washed with generous amounts of DI water, air dried, oven dried at between 105° C.-120° C. (e.g., for 1 hr), then calcined at 550° C. (e.g., for 1 hr).

In some embodiments, to make Type-B HBC, copper sulfate solution is first incubated with zeolite at 80° C. for 3 hours with vigorous stirring, and processed as described previously for Type-A hybrid binary catalysts to provide Cu-Zeolite powder, then the Cu-Zeolite powder and metal oxide precursors can be reacted as described in the copper exchange procedure for Type-A hybrid binary catalysts to achieve hybridization. The obtained product can be further treated as described above for Type-A hybrid binary catalysts.

In some embodiments, the HBCs of the present disclosure are made by providing an aqueous solution including a chelating agent (e.g., urea) and a metal oxide precursor such as $ZrOCl_2.8H_2O$, $NaVO_3$, $BaCl_2$, $(NH_4)_6Ce^{IV}NO_3)_4$, $KMnO_4$, $Co(NO_3)_2$ (e.g., cobalt nitrate hexahydrate), $Cr(NO_3)_3$, $CaCl_2$, barium nitrate, ortho phosphoric acid, ammonium molybdate tetrahydrate, calcium nitrate tetrahydrate, nickel nitrate, titanium chloride, tungsten chloride; mixing the aqueous solution including the chelating agent and the metal oxide precursor with a zeolite catalyst to provide a metal oxide precursor-coated zeolite; and calcining the metal oxide precursor-coated metal zeolite to provide the HBC. The HBC include metal oxide nanoparticles bound to the metal zeolite.

While synthetic and naturally occurring zeolites can be employed in the synthesis of a metal oxide-coated zeolite, mesoporous zeolites are especially advantageous as they can provide sustained reactivity and enhanced catalytic properties, as previously discussed.

The HBCs can be used and synthesized as catalyst washcoat compositions. In washcoat compositions, the HBCs can have a primary zeolite catalyst having a maximum particle dimension of less than 1,000 nm. When the primary zeolite catalyst is a mesoporous particle, very high internal surfaces areas (e.g., up to about 700 m$^2$/g) are accessible to reactant species for synthesizing the metal oxide secondary catalyst directly on the internal and/or external surfaces to form a HBC in situ. By utilizing aqueous chemistry, the fully expanded and open pore structure of the highly hydrophilic zeolite can be accessed by the secondary catalyst precursors throughout the hybridization reaction.

Analysis of the HBCs can be carried out using a variety of techniques, such as inductively coupled plasma (ICP) spectroscopy, which provides accurate elemental compositions; X-Ray diffraction, which provides information on the structural properties (e.g., crystallinity) that relates to both composition and durability; BET surface area analysis, which provides both available surface area for catalyst reaction and porosity information, which in turn correlates to access of reactants to the activity sites; synthetic gas bench (SGB) performance testing provides emissions control testing information when the catalyst is applied to a monolith substrate in the form of a washcoat, and where conditions simulating on-engine test conditions are employed in this test so that realistic conclusions related to diesel emissions control can be drawn from the results; electron energy loss spectroscopy (EELS), which complements ICP by conducting elemental analysis in situ, without having to digest the sample in concentrated acid; scanning electron microscopy (SEM) and scanning transmission electron microscopy (STEM) provide in situ microstructural and elemental analysis, depicting the catalyst in its actual functional state; and/or thermogravimetric analysis (TGA) and Fourier transform infrared (FTIR) spectroscopy, which in combination permit analysis of urea thermolysis kinetics.

Method of Using the HBC-Based 4-Way Catalysts

In some embodiments, the HBC-based 4-way catalysts are used for reducing $NO_x$ in diesel engine exhaust in a selective catalytic reduction system. During use, an HBC-based 4-way catalyst of the present disclosure is exposed to a $NO_x$-containing diesel engine exhaust, where the HBC-based 4-way catalyst is disposed on or within a catalyst support structure. In some embodiments, the catalyst support structure is a ceramic monolith and/or a metallic substrate.

In some embodiments, the HBC-based 4-way catalyst is capable of decomposing urea deposits. The HBC-based 4-way catalyst can increase $NO_x$ reduction under cold start conditions, where a close coupled SCR is heated to greater than 200° C. within 400 seconds and functions without a DOC upstream.

In some embodiments, the HBC-based 4-way catalyst assists in making $NO_2$ in situ without significantly oxidizing $NH_3$ (i.e., by selective catalytic oxidation), while also catalyzing the reduction of $NO_x$ (i.e., by selective catalytic reduction), such that the HBC-based 4-way catalyst simultaneously exhibits selective catalytic oxidation and selective catalytic reduction properties. The HBC-based 4-way catalyst can be provided in an internal surface areas of the wall-flow filter in a manner such that the distribution or loading of the catalyst is generally symmetrical across the wall. The catalyst can increase the thermal resistance of its individual components, such that the components can synergistically interact to provide a more robust catalyst composition.

EXAMPLES

Nomenclature

Zeolites
  SSZ-13, or SSZ13: Chabazite
  SAPO-34
  ZSM-5
  β: beta zeolite
Metal Oxides
  Z: Zirconium dioxide ($ZrO_2$)
  ZB: Barium zirconate
  ZV: Zirconium vanadate (or related compounds)
  ZP: Zirconium phosphate; or oxides of phosphorus, which serves as a dopant for $ZrO_2$
  B: Barium oxide
  Co: Cobalt (oxide)
  Mn: Manganese (oxide)
  CZ: Ceria-zirconia (also shown as ZCe)
  Cr: Chromium (oxide)
  Ca: Calcium
  AP: "A" refers to the relative amount of metal oxide precursor(s) employed (see for example Table 5), and "P" indicates the use of random copolymer poly(ethyleneglycol-ran-polypropyleneglycol) (i.e., PEO-PPO)]

The following examples are provided to illustrate, not limit, the disclosure.

Example 1 describes the synthesis and characterization of the HBCs of the present disclosure. Example 2 describes the selective catalytic reduction (SCR) performance of exemplary HBCs. Example 3 describes diesel oxidation catalyst (DOC) properties of HBCs. Example 4 describes Urea Hydrolysis Catalyst Properties of Hybrid Binary Catalysts. Example 5 describes embodiments of HBC-based 4-way catalyst compositions.

EXAMPLES

Example 1. Hybrid Binary Catalyst Synthesis

The Examples below describe two types of hybrid binary catalysts (HBCs):
  Type-A—hybridization between zeolite and metal oxide, followed by copper exchange of the hybrid zeolite/metal oxide material to allow copper to be loaded on both the zeolite and the metal oxide components of the hybridized material.
  Type-B—copper exchange of the zeolite (only) provides Cu-zeolite crystals, followed by hybridization to covalently link nanoparticles of metal oxides to the surfaces of Cu-zeolite crystals.

Type-A Hybrid Binary Catalyst Synthesis
  Step 1: Zeolite/Metal Oxide Hybridization There are two hybridization procedures employed, using metal oxide precursors:
  Procedure A—metal oxide precursors were dissolved in acidic aqueous solution, and the resulting mixture was vigorously stirred to obtain a slurry containing zeolite particles. The metal oxide precursors were then reacted with the zeolite by neutralizing at elevated temperature (typically with 65° C.), with dropwise addition of ammonium hydroxide solution.
  Procedure B—two separate aqueous solutions of reactive precursor were prepared. The first solution contained the zirconium precursor (and potentially other precursors in acid solution), along with the zeolite powder. Upon adding the second solution to the slurry, the hybridization reaction occurred instantaneously.

Procedure A: Co-Precipitation of Precursors from Acid Solution

The following zeolites were used: nano-ZSM-5 zeolite (ACS), beta-zeolite (Tosoh USA), as well as custom synthesized SAPO-34, and SSZ-13.

Metal oxide precursor reagents in the appropriate stoichiometric proportions were mixed in deionized ("DI") water with urea (a chelating agent) to facilitate nucleation of the precipitating metal oxide(s) at active centers (e.g., Al, Si and P species) on the zeolite crystal surfaces. Examples of precursor reagents include zirconyl chloride octahydrate, ammonium cerium nitrate, potassium permanganate, cobalt nitrate hexahydrate, barium nitrate, ortho phosphoric acid, ammonium molybdate tetrahydrate, calcium nitrate tetrahydrate, chromium nitrate, nickel nitrate, potassium permanganate, titanium chloride, tungsten chloride. This reagent mixture was a clear solution at room temperature. The selected zeolite was added to the clear solution in the powder form, with vigorous stirring to obtain a thoroughly mixed slurry. Optionally, random copolymer poly(ethyleneglycol-ran-polypropyleneglycol) (i.e., PEO-PPO) may be added to serve as a surfactant to obtain optimal uniformity of nanoparticles size and distribution. Heat was applied to the slurry and 28% $NH_4OH$ solution was added dropwise (1 drop/sec), when 65° C. was attained. The endpoint was established when the sol-gel point was surpassed, which was marked by a dramatic increase in viscosity. Vigorous stirring and continuous heating enabled the high viscosity to decrease, and additional $NH_4OH$ was added to ensure that all of the available precursors or reactive moieties were hybridized to the zeolite surfaces. Where cobalt precursor was employed, the endpoint was accompanied by a very distinctive color change from bright pink to "cobalt blue". The lack of color in the filtrate and bright cobalt blue color of the retrieved product was a clear indication that the $Co^{2+}$ precursor (and other reacting precursors) was almost completely hydrolyzed to the zeolite surface.

The entire mixture was either briefly quenched in an ice-bath or filtered while hot. Washing was conducted with generous quantities of deionized water. The solids were washed, air dried, oven dried at between 105° C.-120° C. (1 hr), and then calcined at 600° C. (1 hr).

Procedure B: Incipient Co-Reactive Precursor Precipitation

Step 1: Hybridization of Metal Oxide Nanoparticles on Zeolite

Two separate aqueous solutions of reactive precursor were prepared. A first solution contained the zirconium and other precursors that only react when neutralized with $NH_4OH$, along with the zeolite powder to form a slurry. The second solution contained a metal oxide precursor, such as ortho phosphoric acid, sodium vanadate, titanium chloride, and/or ammonium molybdate. When the second solution is added to the first solution, the metal oxide precursors in the second solution reacted instantly with the zirconium precursor(s) in the first solution; at room temperature or cooled to (−15° C.) to regulate the kinetics of the hybridization reaction to form metal oxide nanoparticles on the zeolite surface.

Step 2: Copper Exchange Procedure

Copper sulfate solution was prepared in DI water at various concentrations (0.1, 0.25, 0.5, or 1.0M) and used to treat protonated zeolite in a proportion of 500 mL copper sulfate solution to 100 g of zeolite. 0.1M copper sulfate solution was used with and without concentrated sulfuric acid adjustment to pH 3. The mixture was heated at 80° C. for either 1 hr or 3 hr, with constant stirring. The copper-exchanged product was filtered, washed with generous amounts of DI water, air dried, oven dried at between 105° C.-120° C. (1 hr), then calcined at 550° C. (1 hr).

Type-B Hybrid Binary Catalyst

Step 1: Copper Exchange Procedure 1M copper sulfate solution was incubated with zeolite at 80° C. for 3 hours with vigorous stirring, and processed as described previously for Type-A hybrid binary catalysts.

Step 2: Hybridization of Zeolite and Metal Oxide

Cu-Zeolite powder from Step 1 and metal oxide precursors were reacted as described in the copper exchange procedure for Type-A hybrid binary catalysts to achieve hybridization. The obtained product was further treated as described above for Type-A hybrid binary catalysts.

Characterization of Hybrid Binary Catalyst Materials

The following characterization techniques were used to study the HBCs synthesized above.

(a) Inductively Coupled Plasma (ICP) Spectroscopy, which provides accurate elemental compositions.

(b) X-Ray Diffraction, which provides information on the structural properties (e.g., crystallinity) that relates to both composition and durability.

(c) BET Surface Area Analysis, which provides both available surface area for catalyst reaction and porosity information, which in turn correlates to access of reactants to the activity sites.

(d) Synthetic Gas Bench (SGB) performance testing provides emissions control testing information when the catalyst is applied to a (1"×3") monolith substrate in the form of a washcoat. Conditions simulating on-engine test conditions are employed in this test so that realistic conclusions related to diesel emissions control can be drawn from the results.

(e) Electron energy loss spectroscopy (EELS), which complements ICP by conducting elemental analysis in situ, without having to digest the sample in concentrated acid.

(f) Scanning electron microscopy (SEM) and scanning transmission electron microscopy (STEM) provide in situ microstructural and elemental analysis, depicting the catalyst in its actual functional state.

(g) Thermogravimetric analysis (TGA) and Fourier Transform Infrared (FTIR) spectroscopy permit analysis of urea thermolysis kinetics, and the potential impact of Type-B Hybrid Binary Catalyst compositions.

Results

A summary of the copper loading results achieved with four different zeolites and their zirconium/barium Type-A HBC derivatives, using 1M $CuSO_4$ at 80° C. for 3 hrs are shown in Table 2. These zeolites represent the very broad range of zeolite types (including pore sizes). The cation (e.g., copper) loading ratio (CLR) for each zeolite type is defined as wt % $Cu^{2+}$ in Cu-Zeolite/wt % copper in HBC.

CLR for the four zeolites presented in Table 2A are ranked in the order: β-Zeolite>SAPO-34>SSZ-13>ZSM-5, which is inversely related to the total barium-doped zirconia metal oxide loading for the given zeolite.

The relatively high CLR value for β-Zeolite provides evidence that the cation exchange capacity power of the barium-doped zirconia metal oxide phase at about 3% of the HBC content, does not facilitate additional copper loading beyond that of the zeolite phase to the extent that was expected based on the ion exchange capacity for the metal oxide only (see Table 2B). On the other end of the spectrum, a relatively low CLR value for ZSM-5 correspond to the highest metal oxide loading of about 5.5% content of the HBC. This data, in combination with that in Table 2B, suggest that the copper loading by the metal oxide phase of HBC is dependent on both the amount of metal oxide phase present, as well as the composition of the metal oxide phase. Furthermore, the cation loading capacity can play an important role in platinum group metal (PGM) binding to obtain highly distributed, high activity catalytic centers, which can translate into lower PGM loadings, reduced tendency for deactivation by sintering, and reduced overall cost.

The relatively large pore zeolites (such as β-zeolite and ZSM-5) are desirable for HBC use in DOC applications, due to their ability to store relatively large quantities of hydrocarbons.

FIG. 2A. Cation (Cu²⁺) Loading Ratio for Different Zeolites in Type-A HBC Based on Zr and Ba.

| Item # | Catalyst ID | Zeolite Composition Al | Si | P | Zeolite Pore Size | Copper Loading | Cation ($Cu^{2+}$) Loading Ratio | $ZrO_2$-based Mixed Metal Oxide (wt % ±10) Zr | Ba |
|---|---|---|---|---|---|---|---|---|---|
| 1 | ZSM-5 | 2.2 | 37.3 | | 5 Å | | | | |
| 2 | CuZSM5 #1 | 2.4 | 34.8 | | 5 Å | 0.2 | | | |
| 3 | CuZSM5 #2 | 2.6 | 38.3 | | 5 Å | 0.2 | 0.13 | | |
| 4 | CuHBC-ZSM5-ZB | 2.1 | 35.6 | | 5 Å | 1.5 | | 3.2 | 2.5 |
| 5 | βZeolite | 2.2 | 37.5 | | 5.5-7 Å | | | | |
| 6 | Cuβ | 2.8 | 37.5 | | 5.5-7 Å | 2.3 | | | |
| 7 | CuHBC-β-ZB(A) | 2.4 | 35.5 | | 5.5-7 Å | 2 | 1 | 2.8 | 2 |
| 8 | CuHBC-β-ZB(AP) | 2.5 | 36.1 | | 5.5-7 Å | 1.9 | | 2.7 | 1.7 |
| 9 | SSZ-13 | 2.6 | 36.6 | | 3.8 Å | | | | |
| 10 | CuSSZ-13 | 2.7 | 40.6 | | 3.8 Å | 1.2 | 0.41 | | |
| 11 | CuHBC-SSZ13--ZB | 2.4 | 36.7 | | 3.8 Å | 2.9 | | 3.3 | 1.4 |
| 12 | SAPO-34 | 17.2 | 3 | 17.2 | 3.8 Å | | | | |
| 13 | CuSAPO-34 | 20.2 | 4.2 | 18.2 | 3.8 Å | 1.8 | 0.72 | | |
| 14 | CuHBC-SAPO34-ZB | 18.1 | 3.3 | 16.2 | 3.8 Å | 2.5 | | 3.9 | 0.6 |

In Table 2A, the cation loading ratio (CLR) is CuZeolite/Hybrid Binary Catalyst. The CLR ranking is β-Zeolite>[SAPO-34]>Chabazite>ZSM-5

TABLE 2B

Copper Loading for Metal Oxides Under Equivalent Conditions Used for HPC Preparation (Note that solubilization of cerium was incomplete in ICP procedure)

| Item # | Metal Oxide | Composition (wt %) Zr | Ba | Co | V | Ca | Ce | P | Cu Loading |
|---|---|---|---|---|---|---|---|---|---|
| 1 | CuZ | 57.8 | | | | | | | 0.3 |
| 2 | CuZB | 41.5 | 19 | | | | | | 2.2 |
| 3 | CuZBCo | 51.6 | 0.2 | 11.6 | | | | | 1.6 |
| 5 | CuZBCoP | 17.9 | 26.7 | 1.7 | | | | 8.9 | 8.2 |
| 5 | CuZV | 34.2 | | | 26.8 | | | | 1.7 |
| 6 | CuZVCa | 11.8 | | | 47.3 | 0.6 | | | 0.8 |
| 7 | CuZCe | 46.4 | | | | | 6.9 (+) | | 0.2 |

Additional data describing the physical properties of the catalyst compositions shown on line item 5-8 in Table 2A (for β-zeolite), are presented in Table 2C.

TABLE 2C

Figure 6B:
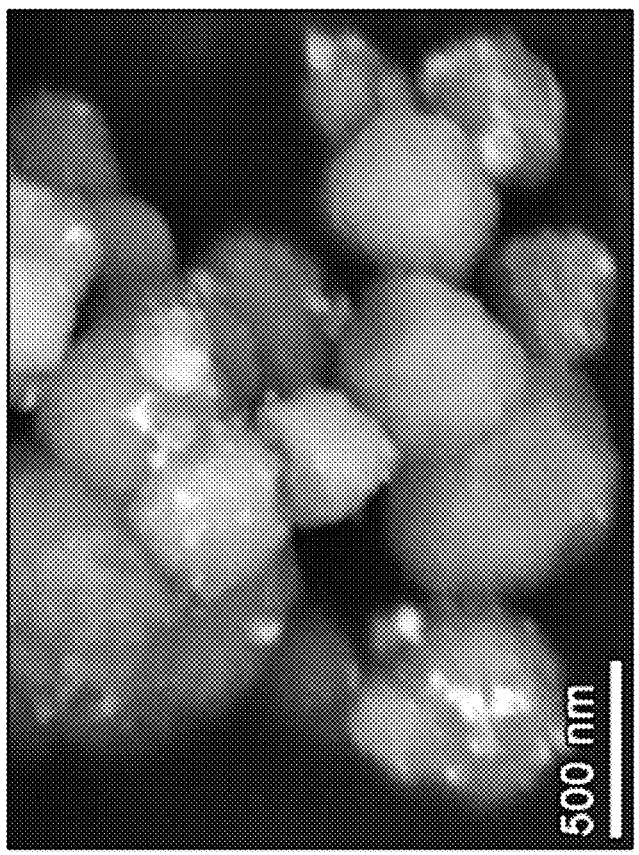
FIG. 6B is a scanning electron micrograph of an embodiment β-Zeolite after hybridization with $Ba_{(0.4)}Zr_{(0.6)}O_3$ nanoparticles. Relatively uniform distribution of nanoparticles was facilitated by the use of surfactant poly(ethyleneglycol-ran-polypropyleneglycol) in the hybridization of the Zr and Ba precursors to the β-zeolite particles. See also Table 2, item 8, below.
Figure 6A:
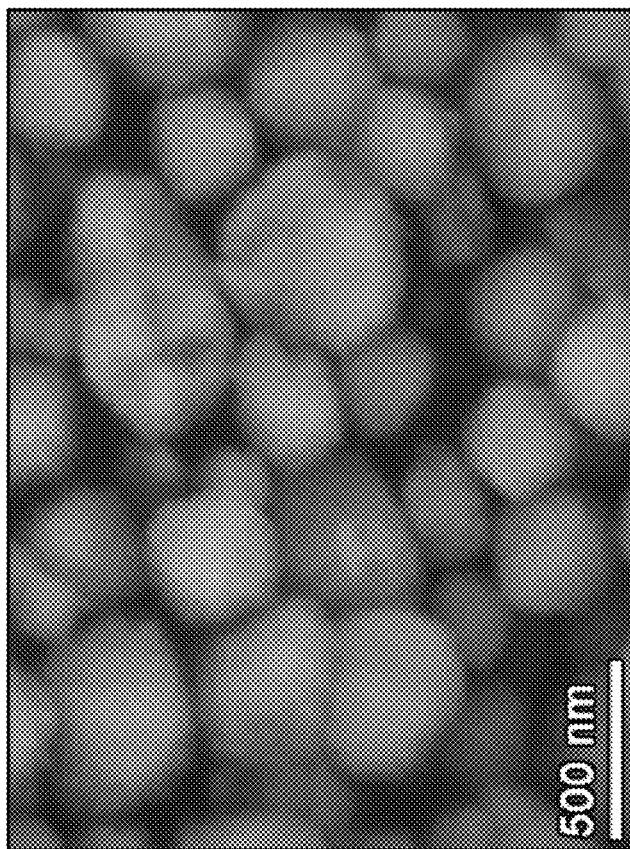
FIG. 6A is a scanning electron micrograph of an embodiment β-Zeolite before hybridization with $Ba_{(0.4)}Zr_{(0.6)}O_3$ nanoparticles.
Figure 7:
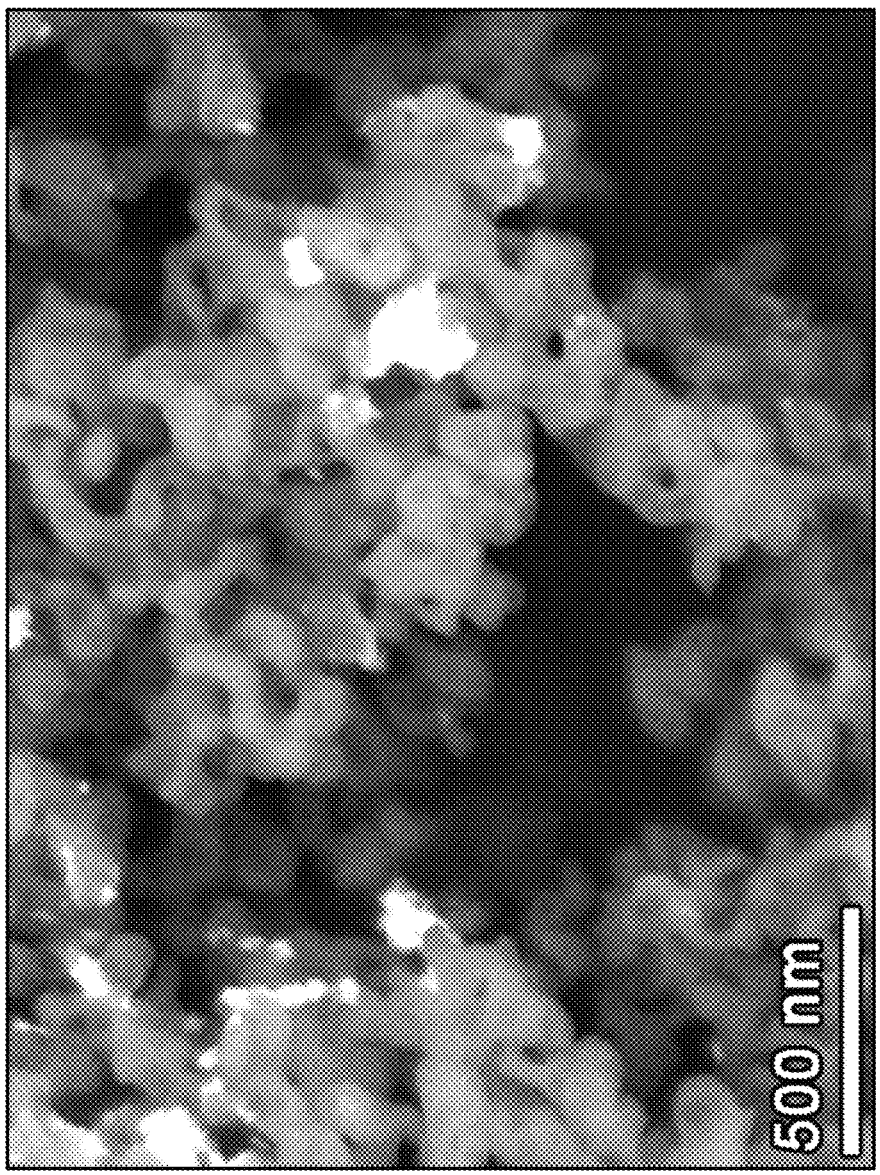
FIG. 7 is a scanning electron micrograph of an embodiment of a Type-A HBC based on mesoporous chabazite SSZ-13 (Si/Al=12), with $ZrO_2$ nanoparticles.
Figure 8:
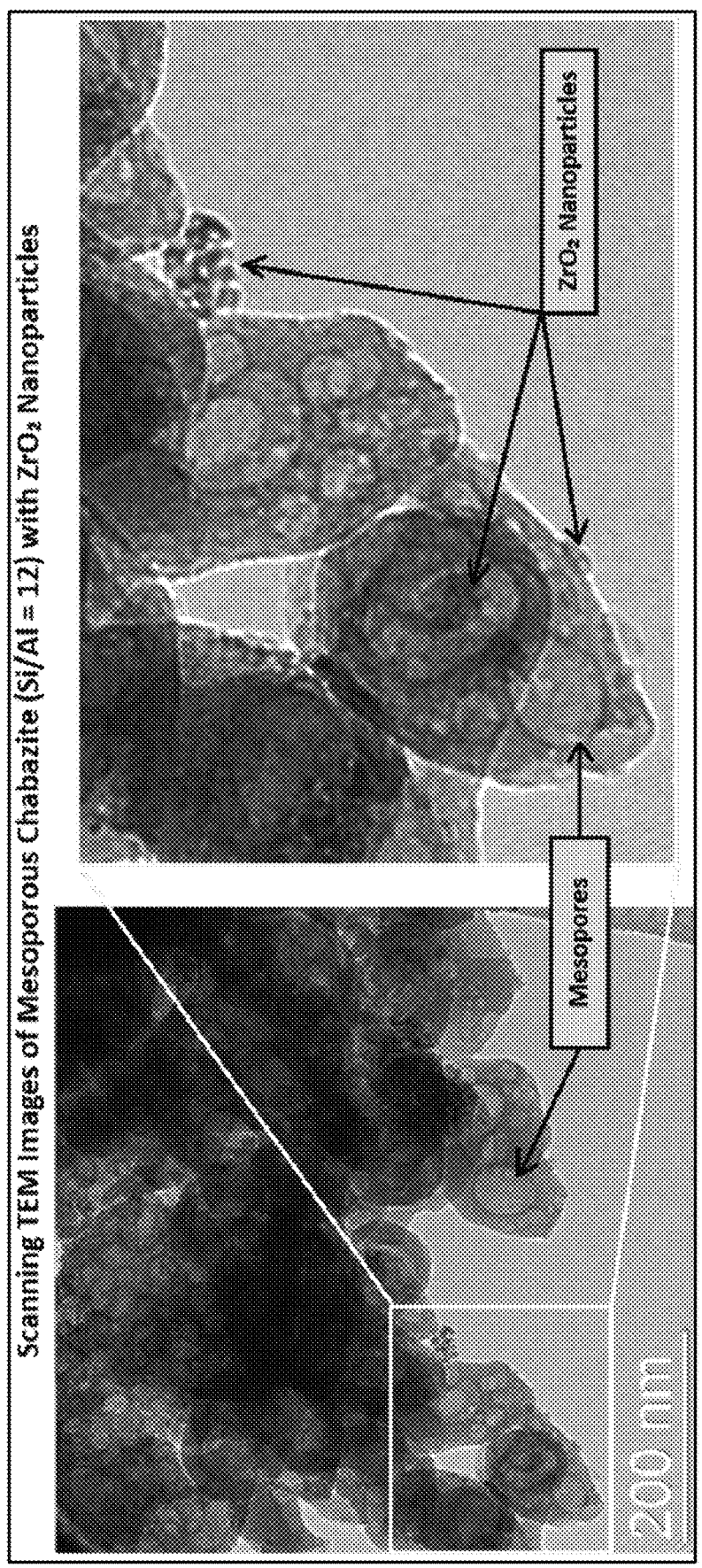
FIG. 8 is a scanning transmission electron micrograph of an embodiment of a Type-A HBC based on mesoporous SSZ-13 (Si/Ai=12)/$ZrO_2$. Elemental mapping of the Type-A mesoporous SSZ-13 (Si/Ai=12) Hybrid binary catalyst with $ZrO_2$ nanoparticles (2-5 nm diameter) revealed the presence of the elements silicon (Si) and aluminum (Al) in the metal oxide phase (as well as in the zeolite phase). This presents clear evidence of the covalent reaction between the precursors with zeolite surface groups during the hybridization process. In addition, this has been verified by electron energy loss spectroscopy (EELS) analysis. The 2-5 nm diameter crystalline metal oxide (SCO phase) particles are arranged in a discontinuous network across the entire internal and external surfaces of the zeolite crystal.
Figure 9:
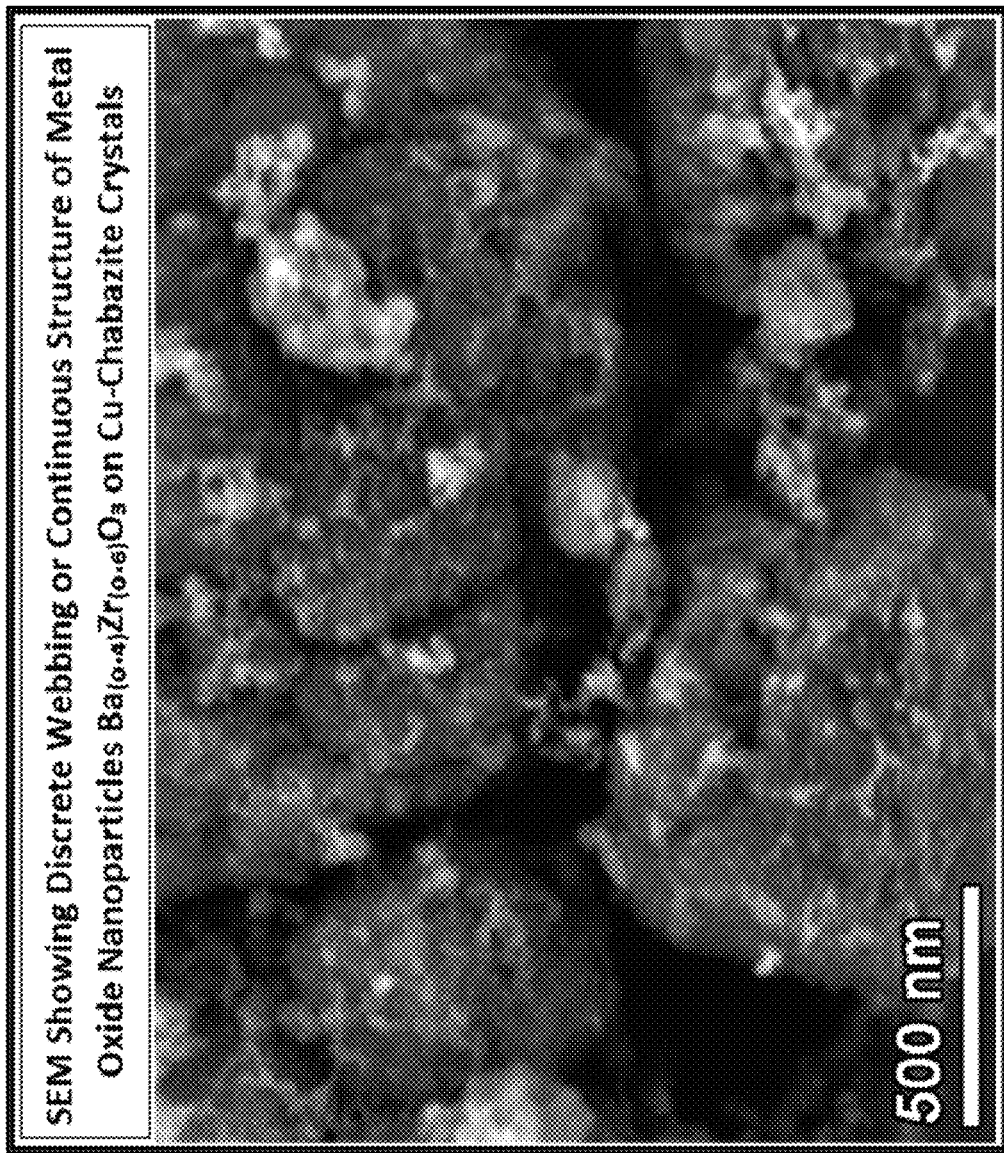
FIG. 9 is a scanning electron micrograph of structural characteristics of an embodiment of a HBC of the present disclosure, SSZ-13 chabazite HBC with zirconium-barium mixed metal oxide showing the 2-5 diameter crystalline metal oxide (SCO phase) particles arranged in a discontinuous network across the entire zeolite surface.

Effect of PEO/PPO on BET Surface Area and Porosity for β-Zeolite Based HBC (See also FIGS. 6A and 6B)

| Item # from Table 2A | Catalyst ID | BET Surface Area (m²/g) | HK Median Pore Width (Å) | HK Maximum Pore Volume (cm³/g) |
|---|---|---|---|---|
| 5 | β-Zeolite | 618 | 6.47 | 0.2436 |
| 6 | Cuβ | 642 | 5.71 | 0.2496 |
| 7 | CuHBC-β-ZB(A) | 595 | 6.62 | 0.2345 |
| 8 | CuHBC-β-ZB(AP) | 803 | 7.83 | 0.3274 |

The BET data presented in Table 2C depicts the very dramatic increase in both surface area and porosity that can be achieved when PEO/PPO is employed in the hybridization process (item 8, Table 2A). This unique, high surface area and high porosity catalyst structure is an important feature of the catalyst compositions of the present disclosure. A scanning electron micrograph image of this unique structure is shown in FIG. 6B. Furthermore, enhanced surface area and mesoporosity translates into improved emissions control performance under the highest space velocity conditions (e.g., >100,000 hr⁻¹) that can be encountered in a heavy duty diesel aftertreatment system. Comparing item 8 with item 7, the 34% higher catalytic surface area and 18% increase in HK median diameter available for the CuHBC-β-ZB (AP), makes it possible to use lower catalyst washcoat loading; with a potentially lower contribution to system AP (i.e., the backpressure on the engine that impacts fuel consumption).

Evidence of the intimate chemical bond between the metal oxide phase and the zeolite phase created in the hybridization process (involving Al and Si incorporation in the resulting metal oxide composition), is presented in Table 3, where ICP, XRD and BET surface area data are presented for SSZ-13 and SAPO-34 Type-A HBC samples.

TABLE 3

Physical Properties of HBC Based on SSZ-13 and SAPO-34.

| Item # | Catalyst | Metal Oxide Composition | Metal Oxide Ionic Conductivity | Cu Loading (wt ± 10%) | Cu Loading Increase | XRD % Crystallinity | BET Surface Area ($m^2/g$) |
|---|---|---|---|---|---|---|---|
| | | CuSSZ-13 Based Hybrid Binary Catalyst | | | | | |
| 1 | CuSSZ-13 | n/a | n/a | 1.2 | n/a | 80-90 | 760 |
| 2 | CuHBC-SSZ13-Z | Zr = 6.4 | Anion | 1.2 | 0 | 80-90 | 620 |
| 3 | CuHBC-SSZ13-ZB | Br = 1.4, Zr = 3.3 | Cation | 3 | 150 | 80-90 | 590 |
| 4 | CuHBC-SSZ13-ZV | Zr = 3.9, V = 8.1 | Cation | 1.4 | 17 | 80-90 | 513 |
| | | CuSAPO-34 Based Hybrid Binary Catalyst | | | | | |
| 5 | CuSAPO-34 | n/a | n/a | 1.8 | n/a | 80-90 | 648 |
| 6 | CuHBC-SAPO34-Z | Zr = 7.3 | Anion | 1.9 | 6 | 15 | 294 |
| 7 | CuHBC-SAPO34-ZB | Ba = 0.6, Zr = 3.9 | Cation | 2.5 | 39 | 14 | N/A |
| 8 | CuHBC-SAPO34-ZV | Zr = 5.2, V = 5.1 | Cation | 2.8 | 56 | 8 | 91 |
| 9 | CuHBC-SAPO34-ZC | Ce = 2.6, Zr = 3.1 | Anion | 4 | 122 | 6 | 195 |

In Table 3, the metal oxide component of the HBC compositions were determined by ICP. By way of reference, pure metal oxides have BET surface areas of <100 $m^2/g$.

There are four important conclusions that can be drawn from the data in Table 3, with reference made to Table 2B showing $Cu^{2+}$ loading capacity of various metal oxides prepared under equivalent conditions as the HBC Type-A in the absence of zeolite particles.

1. Item 2 contains SSZ-13 HBC Type-A containing $ZrO_2$ (a known anionic metal oxide), which exhibits relatively low cationic (i.e., $Cu^{2+}$) binding capacity.

2. Metal oxide hybridized with SSZ-13 listed in Items 3 and 4 have strong cation ion exchange properties, similar to or greater than that of zeolites, and are thus able to bind $Cu^{2+}$.

3. The SSZ-13 based catalyst compositions shown as Items 3 and 4 contain 150% and 17% more $Cu^{2+}$ (respectively), when compared with the amount of $Cu^{2+}$ loaded onto the zeolite component.

4. A zeolite for HBC that is particularly advantageous is one that exhibits good durability, as measured by retention of crystallinity (via XRD) and high surface area (via BET), such as SSZ-13, in contrast to SAPO-34 zeolite. Table 3 shows that SAPO-34 and potentially other zeolites containing heteroatoms (such as phosphorous that potentially introduce added strain into the zeolite lattice structure), are less suited for HBC application due to the dramatic loss of crystallinity and surface area. It is evident from these data that the intimate interaction between structural components of the SAPO-34 zeolite during hybridization with a broad range of different metal oxide compositions effectively destabilized the crystal structure, causing it to collapse and form an amorphous (glassy) relatively low porosity material. Item 9 contains a very dramatic illustration of impact of the hybridization phenomenon on the structural integrity of SAPO-34., In this case, ceria-doped $ZrO_2$ is a well-known anionic metal oxide with minimal cation binding capacity (see Table 2B, Item 7), but when hybridized to SAPO-34 Type-A this mixed metal oxide shows an extremely high $Cu^{2+}$ binding capacity. The inference drawn from this very surprising result is that the effect of "incidental doping" of the Zr:Ce mixed metal oxide by elements from the deconstruction of the zeolite result in an undefined, high $Cu^{2+}$ binding end product. This inference is supported in a less dramatic way by the data on Item 6 for $ZrO_2$ metal oxide, which is also a well-known anionic material and would not be expected to bind significant amounts of $Cu^{2+}$ ions (see, Table 2B, line 1).

Presented in Table 4 are the composition data for CuSSZ13 and various HBC derivatives prepared under different process conditions, where copper exchange was conducted with various $CuSO_4$ concentrations (and incubated at 80° C. for 3 hrs). The compositions were determined by ICP analysis. Items 1-4 in the table illustrates the effect of $CuSO_4$ concentration on copper loading; which leads to the conclusion that 0.1M (or less) would be optimal for minimizing excessive copper loading for best NOx reduction performance, as demonstrated by U.S. patent application Ser. No. 14/486,858. Likewise, the pH 3 conditions used for item 8 suggest that copper loading under such conditions should produce high performance NOx reduction SCR catalysts, with less undesirable CuO formation (and corresponding $N_2O$-make). Items 10-14 pertain to Type-A HBC compositions, while items 15-19 are Type-B HBC compositions. The most important distinction between the Type-A and Type-B compositions is that the latter show distinctly lower copper loading, which result in lower NOx reduction, as measured by the Standard Reaction (in the absence of $NO_2$), not shown here.

TABLE 4

Composition of CuSSZ13 and Hybrid Binary Catalyst Prepared Under Various Conditions

| Item # | Catalyst | SSZ-13 Zeolite (wt %) Al | SSZ-13 Zeolite (wt %) Si | Copper Loading | ZrO$_2$-based Mixed Metal Oxide (wt % ± 10) Zr | Ba | Co | V |
|---|---|---|---|---|---|---|---|---|
| 1 | CuSSZ13 (0.1M) | 2.8 | 40.2 | 0.6 | | | | |
| 2 | CuSSZ13 (0.25M) | 2.8 | 39.2 | 0.6 | | | | |
| 3 | CuSSZ13 (0.5M) | 2.7 | 39 | 0.8 | | | | |
| 4.1 | CuSSZ-13 [A] | 2.3 | 34.7 | 1 | | | | |
| 4.2 | CuSSZ13 A' | 2.7 | 40.6 | 1.2 | | | | |
| 5.1 | CuSSZ13 [B] | 2.4 | 35.9 | 0.9 | | | | |
| 5.2 | CuSSZ13 B' | 2.8 | 41.5 | 1 | | | | |
| 6.1 | CuSSZ13 [C] | 2.3 | 35.5 | 1 | | | | |
| 6.2 | CuSSZ13 C' | 2.6 | 40.9 | 1.2 | | | | |
| 7.1 | CuSSZ-13 [D], 18 hr @ 80° C. | 2.2 | 33.7 | 1.1 | | | | |
| 7.2 | CuSSZ13 D', 18 hr @ 80° C. | 2.7 | 42 | 1.3 | | | | |
| 8 | CuSSZ-13 [G], pH = 3 | 2.3 | 35 | 0.8 | | | | |
| 9 | SSZ-13 (protonated) | 2.6 | 36.6 | — | | | | |
| 10 | SSZ13-ZV Hybrid | 2.4 | 33.9 | | 3.9 | | | 8.5 |
| 11 | CuHBC-SSZ13-ZV (Type-A) | 2.5 | 33.4 | 1.4 | 3.9 | | | 8.1 |
| 12 | CuHBC-SSZ13-Z (Type-A) | 2.4 | 33.1 | 1.2 | 6.5 | | | |
| 13 | SSZ13-ZB Hybrid (Type-A) | 2.4 | 34 | | 3.3 | 5.3 | | |
| 14 | CuHBC-SSZ13-ZB (Type-A) | 2.4 | 36.7 | 2.9 | 3.3 | 1.4 | | |
| 15 | (Type-B) CuHBC-SSZ13-Z(A) | 2.5 | 35.7 | 0.9 | 3.1 | | | |
| 16 | (Type-B) CuHBC-SSZ13-Z(B) | 2.3 | 35.4 | 0.8 | 5.5 | | | |
| 17 | (Type-B) CuHBC-SSZ13-Z(C) | 2 | 28.8 | 0.9 | 15.2 | | | |
| 18 | (Type-B) CuHBC-SSZ13-ZB | 2.4 | 35.2 | 1.1 | 2.9 | 1.9 | | |
| 19 | (Type-B) CuHHBC-SSZ13-ZV | 2.3 | 33.4 | 0.4 | 2.6 | | | 8.4 |

The effect of the selected Hybrid Binary Catalyst Synthesis Procedure on copper loading is illustrated in Table 5, where ZSM-5 zeolite is used to compare and contrast Type-A vs Type-B Hybrid Binary Catalyst (where the metal oxide form the SCO phase). The most significant inferences from this data are:

1. Type-A HBC binds significantly more $Cu^{2+}$ under identical incubation conditions, compared with Type-B.
2. Beneficial effect of copper loading might be expected to be greater for Type-A HBC compared with Type-B.
3. Increased metal oxide content of the Type-B HBC had no influence on the copper loading, relative to that of pure CuZSM-5. However, increased diffusion limitation with increased metal oxide coverage of the copper zeolite can result in lower catalytic activity for NOx reduction.
4. Higher copper loading of Hybrid Binary Catalyst materials should be advantageous, provided that this does not facilitate formation of CuO and other species that catalyze $N_2O$ formation and other aging effects.

TABLE 5

Effect of Hybrid Binary Catalyst Synthesis Procedure on Copper Loading

| Item # | Catalyst ID | ZSM-5 Zeolite Al | ZSM-5 Zeolite Si | Copper Loading | ZrO$_2$-based mixed Metal oxide Zr | Ba | Ce |
|---|---|---|---|---|---|---|---|
| 1 | CuZSM-5 | 2.4 | 34.8 | 0.2 | | | |
| 2 | CuHBC-ZSM-5-Z(A) Type B | 2.3 | 36.9 | 0.2 | 3.4 | | |
| 3 | CuHBC-ZSM-5-Z(A) Type A | 2.2 | 37.7 | 1.1 | 3.3 | | |
| 4 | CuHBC-ZSM-5-Z(2B) Type B | 2 | 31.9 | 0.2 | 11.3 | | |

TABLE 5-continued

Effect of Hybrid Binary Catalyst Synthesis Procedure on Copper Loading

| Item # | Catalyst ID | ZSM-5 Zeolite Al | Si | Copper Loading | ZrO$_2$-based mixed Metal oxide Zr | Ba | Ce |
|---|---|---|---|---|---|---|---|
| 5 | CuHBC-ZSM-5-Z(C) Type B | 1.8 | 29.4 | 0.2 | 16.7 | | |
| 6 | HBCZSM-5-Z(C) | 1.8 | 29.2 | | 17.5 | | |
| 7 | CuHBC-ZSM-5-Z(D) Type B | 1.6 | 23.4 | 0.2 | 25.3 | | |

ZSM-5 zeolite was used as the model for screening a range of elements (referred to in Table 1), which convey desirable properties to the Hybrid Binary Catalysts of this invention. Table 6 presents the IPC results for Type-A HBC preparations that illustrate the versatility and breadth of the catalyst compositions possible from the present disclosure. Line items 3, 5, 7, 9, 11, 13, 16, 20 represent ICP data for metal oxide compositions that have not been copper loaded. The results demonstrate that a wide range of mixed oxides and related stoichiometric compositions may be readily engineered to meet the requisite emission, durability and cost targets.

TABLE 6

Elemental Composition of ZSM-5 Based HBC Containing Various Elements in the SCO Phase

| Item # | Elements in the SCO Phase of HBC | ZSM-5 Zeolite Al | Si | Copper Loading (g) | ZrO$_2$-based Mixed Metal Oxide Composition (wt % ± 10%) | | | | | | | | |
|---|---|---|---|---|---|---|---|---|---|---|---|---|---|
| | | | | | Zr | Ba | Ce | Co | Mn | P | W | Mo | Ni | Ti |
| 1 | Nil | 2.4 | 34.8 | 0.2 | | | | | | | | | | |
| 2 | Nil | 2.6 | 38.3 | 0.2 | | | | | | | | | | |
| 3 | Zr | 2.3 | 36.5 | | 3.3 | | | | | | | | | |
| 4 | Zr | 2.2 | 37.7 | 1.1 | 3.3 | | | | | | | | | |
| 5 | Zr, Mo | 2.2 | 36.4 | | 2.9 | | | | | | | 0.1 | | |
| 6 | Zr, Mo | 2.1 | 36.3 | 1.2 | 2.8 | | | | | | | 0.1 | | |
| 7 | Zr, Mn | 2.1 | 36.1 | | 2.8 | | | | 0.8 | | | | | |
| 8 | Zr, Mn | 2 | 35.5 | 1.2 | 2.8 | | | | 0.5 | | | | | |
| 9 | Zr Ba, P | 2.1 | 30.5 | | 3.2 | 0.4 | | | | 1.2 | | | | |
| 10 | Zr, Ba, P | 2 | 35.7 | 1.4 | 3.3 | 0.4 | | | | 1.1 | | | | |
| 11 | Zr W | 2.1 | 35.2 | | 2.7 | | | | | | 4.5 | | | |
| 12 | Zr, W | 1.9 | 35.4 | 1 | 2.7 | | | | | | 3.8 | | | |
| 13 | Zr, W, Mo | 2.1 | 36 | | 2.8 | | | | | | 2.3 | 1 | | |
| 14 | Zr, W, Mo | 2.1 | 36 | 0.9 | 2.8 | | | | | | 1.8 | 0.4 | | |
| 15 | Zr, Co | 2 | 35.1 | 1.2 | 3.3 | | | 2.8 | | | | | | |
| 16 | Zr, Ba | 2.3 | 36.4 | | 3.5 | 2.6 | | | | | | | | |
| 17 | Zr, Ba | 2.1 | 35.6 | 1.5 | 3.2 | 2.5 | | | | | | | | |
| 18 | Zr, Ba, Co | 2.2 | 34.6 | 1.5 | 2.1 | 1.1 | | 0.8 | | | | | | |
| 19 | Zr, Ba, Co | 2.4 | 37.5 | 1.2 | 2.4 | 0.9 | | 1.1 | | | | | | |
| 20 | Zr, Ce | 2.2 | 35.1 | | 2.9 | | 3.8 | | | | | | | |
| 21 | Zr, Ce | 2.1 | 35.9 | 1.3 | 2.9 | | 3.9 | | | | | | | |
| 22 | Zr, Ce, Co | 2.2 | 36 | 1.3 | 2.2 | | 1.9 | 1.1 | | | | | | |
| 23 | Zr, Ni, Co | 2.2 | 36.4 | 14 | 2.2 | | | 0.8 | | | | | 0.8 | |
| 24 | Zr, P | 2.1 | 36.1 | 1.2 | 3 | | | | | 1 | | | | |
| 25 | Zr, Ti | 2.1 | 36.6 | 1.2 | 3.4 | | | | | | | | | 1.4 |

FIGS. 6A, 6B, 7, 8, and 9 illustrate the unique physical characteristics of HBC on both standard (i.e., microporous) and mesoporous zeolites. Two of the four different types of zeolites used in this study are depicted (i.e., β-zeolite and SSZ-13).

A combination of scanning transmission electron microscopy (STEM) and elemental analysis has demonstrated that nanoparticles of metal oxides (2-5 nm diameter) can be clearly seen both on the outer surfaces and within mesopores of the zeolite crystals formed by the Type-A HBC procedure. Furthermore, copper was located in both the zeolite and metal oxide when copper exchange was carried out after hybridization of metal oxide to zeolite. However, this was not the case for Type-B HBC hybridization, where copper was primarily associated with the zeolite phase. In addition, Si and Al from the zeolite were also detected in the metal oxide particles. This indicated that the hybridization process involves a direct reaction with surface species in the zeolite. Therefore, metal oxide nanoparticle formation starts with nucleation at the zeolite surface (potentially with the aid of the chelating agent), rather than with metal oxides forming in the bulk solution.

Example 2. Selective Catalytic Reduction (SCR) Performance of Hybrid Binary Catalyst The following procedure was used to prepare and test HBC washcoats for NO$_x$ reduction in a SCRF (1"×3") core sample format.

Washcoat Procedure: 21% Cu-Zeolite or HBC catalyst, 73% DI water, 2% lactic acid, 2% poly(ethylene glycol-ran-propylene glycol) ~2,500 Mn, 2% poly(ethylene oxide) ~300,000 Mv. This washcoat composition was applied to a (1"×3") HiSiC 300 cpsi (Dinex) DPF substrate. The coated substrate was dried in air, then at 105° C. (1 hr), and finally calcined at 450° C. (1 hr). Typical catalyst washcoat loading on the substrate by this procedure was in the range of 80-94 g/L.

The obtained catalysts were evaluated for $NO_x$ reduction by a dynamic reverse lightoff $NO_x$ reduction test and/or a high space velocity equilibrium reverse lightoff $NO_x$ reduction test Dynamic Reverse Lightoff $NO_x$ Reduction Testing: Each core sample was preconditioned at 500° C. in the gas mixture until equilibrium was reached. Then a reverse lightoff test was performed; by allowing the temperature to slowly decrease and monitoring the SCR performance as a function of temperature. The space velocity was 60,000 $hr^{-1}$, and the following gas mixture was employed: 600 ppm NO; 600 ppm $NH_3$; 75 ppm ethylene; 300 ppm CO; 10% $O_2$; 5.6% $CO_2$; 6% water; and the balance $N_2$.

High Space Velocity Equilibrium Reverse Lightoff $NO_x$ Reduction Testing: Each core was equilibrated at 450° C. for 30 minutes prior to conducting the test, which is based upon realistic conditions encountered in a heavy duty diesel truck aftertreatment system. A series of equilibrated temperature increments were used, starting from as high as 600° C. The feed gas contained 500 ppm $NO_x$; and 600 ppm $NH_3$; with $NO_2/NO_x$=0, 0.5 and 0.75. Ammonia oxidation was measured with 500 ppm $NH_3$ only, in order to determine $N_2O$-make and $N_2$ selectivity. Also included in the feed stream were 8.7% oxygen and 7.8% water. A total flow of 5,000 NL/min (normal liters per minute) was established through the core, at a space velocity of 100,000 $hr^{-1}$. These conditions were used as a stress test to determine catalytic activity under realistic conditions, and also to ascertain the adequacy of the catalyst loading on the substrate.

Results are shown in Table 7, and compare three $ZrO_2$-based HBC catalyst SCRF core samples with a commercial reference (used to calibrate the synthetic gas test bench equipment). Comparing the $NO_x$ reduction at low temperatures (i.e., ≤250° C.), it is clear that low temperature performance can be dramatically improved with the HBC. Hence, cold start and close coupled SCR application of such HBC compositions (with no DOC upstream) should afford superior performance than current aftertreatment systems. This is illustrated by CuHBC-SSZ13-ZB, where the metal oxide dramatically increases the $NO_x$ reduction at 250° C. relative to the commercial reference SCR catalyst. However, at higher temperatures there is no further increase in the $NO_x$ reduction. In addition, this catalyst was shown to produce 10 ppm $NO_2$ at 500° C. And when tested with $NH_3$ this catalyst exhibited $NH_3$ oxidation that resulted in ≥90% $N_2$ selectivity, which means that this catalyst functions as a very effective AMOX; conducting $NO_x$ reduction while preventing $NH_3$ slip.

It is reasonable to conclude that the hybridization conditions used (with no PEO/PPO employed in the procedure), resulted in considerable blockage of zeolite active sites for the CuHBC-SSZ13 catalyst preparation; resulting in diffusion limitation of reactants getting to the active sites. This diffusion limitation can be overcome in one of three ways:

1. Reduce the metal oxide loading, while increasing the oxidative power of the SCO phase.
2. Maintain the same metal oxide loading while improving the uniformity of the distribution for nanoparticles (in the 2-5 nm diameter range), by inclusion of a surfactant like PEO/PPO in the hybridization step.
3. Blend the given HBC with an unmodified Cu-zeolite to provide additional $NO_x$ reduction active sites that are unimpeded by the presence of metal oxide nanoparticles, while the SCO phase is supported on adjacent copper zeolite particles in the same washcoat.

The option described in (3) above is illustrated in Table 7 by the 50% CuSAPO34/50% CuHBC-SSZ13-ZB catalyst, where there was a marked increase in both low and high temperature $NO_x$ reduction by blending. This is a very advantageous feature of the disclosure, where relatively inexpensive zeolites may be employed for the HBC component in the blend, while the major component can be selected for its $NO_x$ reduction and durability properties

TABLE 7

Dynamic Reverse Lightoff Standard SCR Results for Selected CuSSZ-13 Based HBC

| Catalyst ID | Washcoat Loading (g/L) | NOx Conversion Efficiency (%) at Specific Temperatures | | | | | | | | Comments |
| --- | --- | --- | --- | --- | --- | --- | --- | --- | --- | --- |
| | | 150° C. | 200° C. | 250° C. | 300° C. | 350° C. | 400° C. | 450° C. | 500° C. | |
| Commercial Reference (2013) | N/A | 3 | 7 | 20 | 47 | 76 | 82 | 82 | | Internal Control for test procedure |
| CuHBC-SSZ13-ZB | 90 | 13 | 40 | 51 | 53 | 53 | 53 | 53 | 48 | 1. $NO_2$-make = 10 ppm @ 500° C. 2. $NH_3$ oxidation ≥ 90% $N_2$ selective 3. Improved low temp. deNOx |
| 50:50 Blend of CuSAPO-34 and CuHBC-SSZ13-ZB | 81 | 8 | 45 | 62 | 62 | 66 | 72 | 73 | 68 | Improved low temp. deNOx |
| CuHBC-SSZ13-ZV | 92 | 3 | 7 | 18 | 31 | 38 | 29 | 0 | −28 | $NO_2$-make up to 22 ppm @ 50 0° C. |

In the case of CuHBC-SSZ13-ZV a unique combination of SRC and DOC (i.e., SCO-like) properties were exhibited over different temperature ranges in Table 7; where $NO_x$ reduction peaked at 38% (@ 350° C.), then declined to zero (@450° C.) and declined to −28 (@500° C.). The latter corresponds to the production of 20 ppm $NO_2$-make and only 10 ppm $N_2O$-make at 500° C. The DOC-like behavior of the CuHBC-SSZ13-ZV SCRF core sample was verified in DOC testing (not shown here), and suggests that zirconium-vanadium containing HBC would be a good catalyst for PGM impregnation to create a DOC, or even to form the basis of a 4-way catalyst system.

The result of the high space velocity equilibrium reverse lightoff SCR performance stress test for a CuHBC-β-ZBCoP is presented in Table 8. The highlighted ($NO_2/NO_x$=0.5) test conditions depict test results that are directly equivalent to those obtained by J. H. Kwak et al., "The Effect of Hydrothermal Aging on a Commercial Cu SCR Catalyst", Directions in Engine-Efficiency and Emissions Research, MI, Oct. 5, 2011, incorporated herein by reference in its entirety, for β-zeolite (fresh, where the space velocity was only 30,000 $hr^{-1}$. This result is of important for the following reasons:

1. 50% lower catalyst washcoat loading on the substrate can be employed to meet the performance requirement of SCR under realistic operating conditions; with only 84 g/L, compared with about 160 g/L or more for commercial catalysts.

2. This is made possible due to the enhanced BET surface area and mesoporosity imparted to the catalyst as a result of the hybridization process. In this process the surfactant (PEP/PPO) is utilized to achieve optimal nanoparticle size (i.e., 2-5 nm diameter) and uniformity of distribution on the surface of the zeolite particles. The structure described here is illustrated in FIG. 6B for a similar catalyst composition, and the enhanced BET surface area and mesoporosity are likewise illustrated in Table 2B line item 8.

TABLE 8

Equilibrium Reverse Lightoff $NO_x$ Reduction for CuHBC-β-zeolite-ZBCoP (AP)

| Key Parameters | Reaction | Equilibrium Temperature Profile (° C.) | | | | | |
|---|---|---|---|---|---|---|---|
| | | 180° C. | 220° C. | 300° C. | 400° C. | 500° C. | 600° C. |
| $NO_2/NO_x = 0$ | Standard SCR (%) | 9.9 | 26 | 38.6 | 46.7 | 65.1 | 76.3 |
| | $N_2O$-make (ppm) | 1 | 2.4 | 1.2 | 1.2 | 4.4 | 7.4 |
| $NO_2/NO_x = 0.5$ | Fast SCR (%) | 45.5 | 69.4 | 88.1 | 90.1 | 89.4 | |
| | $N_2O$-make (ppm) | 55.4 | 74.1 | 46.7 | 31.1 | 30 | |
| $NO_2/NO_x = 0.75$ | Fast SCR (%) | | | 95.3 | 95.8 | 91.6 | |
| | $N_2O$-make (ppm) | | | 94.6 | 70.3 | 58.3 | |
| $NH_3$ only | Oxidation to form $N_2O$ (ppm) | | | | | 0.1 | 0.7 |

Example 3. Diesel Oxidation Catalyst (DOC) Properties of Hybrid Binary Catalysts Washcoat Procedure Washcoats were applied to (1"×3") HiSiC 300 cpsi (Dinex) DPF substrate as described in Example 3. Platinum group metal (PGM) catalyst was applied by an incipient wetness impregnation method, with nitrate precursor compounds dissolved in 10 mL ID water. The solution containing precursors was applied and a very low vacuum was used to ensure a uniform distribution of PGM throughout the core. A dynamic reverse lightoff protocol for DOC performance was used for testing, starting by first equilibrating at 600° C. The following feed gas mixture was used at at space velocity 60,000 $hr^{-1}$: 600 ppm NO; 75 ppm ethylene; 25 ppm propylene; 7.5 ppm propane; 300 ppm CO; 10% $O_2$; 5.6% $CO_2$; 6% water; and the balance $N_2$. The use of propane and propylene served as a more realistic model for determining the ability of the catalyst to effectively handle volatile organic compounds (VOC), which are a serious challenge in diesel engine emissions control.

Low PGM DOC compositions of Hybrid Binary Catalysts are presented in Table 9, where zirconium-vanadium and zirconium-barium metal oxides are hybridized to β-zeolite. The following are the main conclusions from these data:

1. Hybrid Binary Catalysts that do not contain PGM are highly capable of hydrocarbon oxidation. Particularly noteworthy is the oxidative ability for unsaturated, relatively long chain hydrocarbons (illustrated by the propylene data). In the case of CuHBC-β-ZB (AP), line item 3 in Table 9, propylene lightoff temperature is lower and the percent conversion is higher than that for carbon monoxide. Conventional wisdom believes that exothermic lightoff of CO is required to facilitate the lightoff of other species such as HC and NO. Here, the earlier lightoff and extremely high level of conversion of unsaturated hydrocarbons was unexpected and surprising in the absence of PGM. This feature has been engineered into the catalyst by employing zirconium as the primary metal oxide component, which when doped with other elements create oxygen vacancies (thus active oxidation sites) at the surfaces. Furthermore, by employing barium as the dopant, a degree of $NO_x$ storage behavior is also afforded to the resulting mixed metal oxides. The result is a rudimentary ability to lightoff NO at the moderately low temperature of 350° C., and percent conversion efficiency 2. Impregnating such HBC with relatively low quantities of PGM dramatically improves lightoff and percent conversion for all species tested (see item 4, Table 9). Indeed, 1-2 orders of magnitude lower PGM containing HBC catalysts have exhibited competitive DOC performance to the commercial DOC reference used in this study.

3. Both zirconium-vanadium and zirconium-barium based HBC compositions have been demonstrated to be very effective substrates for low PGM loading DOC; and are particularly suited for HC oxidation. This makes these DOC catalysts ideal candidates for partial oxidation catalysts (POC), hence volatile organic compound (VOC) removal; and for 4-way catalyst applications.

4. The oxidative power of zirconium-barium based HBC can be systematically modulated (both the magnitude and selectivity) by careful selection of co-dopants. This is illustrated by comparing the DOC behavior of the catalysts compositions in line item 6, 8 and 9 at the same level of PGM loading, but different metal oxide phase composition. The most dramatic impact of starting with CuHBC-β-ZB (line 6) and including cobalt dopant to the zirconium-barium mixed oxide (line 8) is evident, and the further inclusion of phosphorous as yet another dopant to make a 4-component mixed metal oxide is illustrated in the CO, propane and $NO_x$ lightoff and % conversion.

a. In the case of adding cobalt as an additional dopant to the zirconium-barium mixed metal oxide, the lightoff temperature for the saturated hydrocarbon (propane) was dramatically reduced. But for NO there is no significant change.

b. Likewise, where phosphorus was added to the zirconium-barium-cobalt mixed metal oxide, there was a dramatic reduction in the CO lightoff temperature (by over 40° C.) accompanied by a dramatic increase in NO lightoff (by 40° C.), along with a large decreasing in NO conversion. This selectivity is clearly related to changes in the metal oxide properties and not PGM catalyst poisoning.

Thus, these data illustrate the ability of the catalysts of the present disclosure to systematically engineer the properties of the metal oxide (SCO) phase for hybrid binary catalysts in terms of both oxidative power and resistance to poisons such as phosphorous and even sulfur.

TABLE 9

Low PGM Diesel Oxidation Catalyst (DOC) Performance of Hybrid Binary Catalyst

| Item # | Catalyst ID | PGM Content (g/L) | | | DOC Reverse Lightoff Temp (C °) | | | | | Max Conversion Efficiency (%) | | | | |
|---|---|---|---|---|---|---|---|---|---|---|---|---|---|---|
| | | Pd | Rh | Pt | CO | $C_3H_6$ | $C_2H_6$ | NO | $C_3H_8$ | CO | $C_3H_6$ | $C_2H_6$ | NO | $C_3H_8$ |
| 1 | CuHBC-β-ZBV | 0.1 | nil | 0.05 | 150 | 125 | 175 | nil | 250 | 83 | 95 | 69 | nil | 21 |
| 2 | CuHBC-β-ZBV | 0.1 | 0.05 | nil | 125 | 125 | 160 | 310 | 250 | 99 | 100 | 98 | 18 | 90 |
| 3 | CuHBC-β-ZB(AP) | nil | nil | nil | 175 | 150 | 220 | 350 | 360 | 56 | 100 | 60 | 2 | 19 |
| 4 | CuHBC-β-ZB(AP) | 0.01 | 0.025 | 0.05 | 150 | 150 | 185 | 235 | 175 | 100 | 100 | 100 | 34 | 99 |
| 5 | CuHBC-β-ZB(AP) | 0.05 | nil | 0.05 | 170 | <125 | 180 | 185 | <125 | 75 | 86 | 49 | 9 | ~40 |
| 6 | CuHBC-β-ZB(AP) | 0.1 | nil | 0.1 | 150 | <125 | 180 | 185 | 460 | 92 | 97 | 80 | 19 | ~10 |
| 7 | CuHBC-β-ZB(AP) | 0.5 | nil | 0.5 | 125 | <125 | 170 | 175 | 420 | 86 | 96 | 76 | 29 | ~25 |
| 8 | CuHBC-β-ZBCo(AP) | 0.1 | nil | 0.1 | 165 | 125 | 180 | 190 | <150 | 97 | 100 | 86 | 20 | ~40 |
| 9 | CuHBC-β-ZBCoP(AP) | 0.1 | nil | 0.1 | <125 | 170 | 190 | 230 | ~150 | 97 | 100 | 86 | 8 | ~30 |
| 10 | Commercial DOC | Zone Coated (>1 g/L Pt & Pd) | | | <<150 | 170 | 170 | 170 | 320 | 100 | 100 | 100 | 52 | 93 |

1. By increasing the PGM content to 0.5 g/L for both Pt and Pd, it was possible to achieve legitimate DOC catalytic performance for NO conversion and dramatically lower propylene lightoff (by >45° C.); comparing line items 7 and 19.

2. Experimental evidence in item 2 and 4 suggest that even better DOC performance can be achieved by incorporating Rh (along with Pt and Pd) in low PGM DOC compositions. This is potentially due to the enhancement of the already significant contribution of the following oxidative reactions due to the formation of palladium hydride (and rhodium hydride) intermediates:

(i) Steam-Hydrocarbon Reforming Reaction

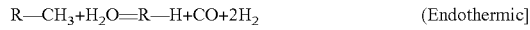

$$R-CH_3 + H_2O = R-H + CO + 2H_2 \quad \text{(Endothermic)}$$

(ii) Water-Gas Reaction

$$CO + H_2O = CO_2 + H_2 \quad \text{[Exothermic]}$$

Example 4. Urea Hydrolysis Catalyst Properties of Hybrid Binary Catalysts

Thermogravimetric analysis (TGA) was used to analyze HBC Type-B samples, using 50% urea solution, $N_2$ purge gas and 10° C./min thermal ramp from room temperature to 600° C. The study involved placing 14 (±1) mg of catalyst into an alumina TGA pan, followed by 40 (±1) mg of a 50% urea solution. Thermal transitions from several replicate profiles were obtained and analyzed to determine the temperature at which total decomposition of the urea solution was achieved (i.e., $T_d$).

The results show that the HBC composition (CuHBC-ZSM5-Z (A) Type-B) was more effective in urea decomposing urea to produce ammonia by lowering $T_d$ by 38.3° C. (±0.3), relative to the conventional hydrolysis catalyst ($TiO_2$). This catalyst composition was 8% $ZrO_2$ hybridized onto CuZSM-5 (after copper exchange and annealing of the zeolite). Therefore, this catalyst was also found to be an effective $NO_x$ reduction catalyst. $ZrO_2$-based hydrolysis catalysts were described, for example, in U.S. patent application Ser. No. 14/486,858, herein incorporated by reference in its entirety.

TABLE 10

Urea Hydrolysis and $NO_x$ Reduction Catalyst Performance of Zirconia-based HBC

| Test Conditions | Wt % $ZrO_2$ Hybridized | Copper Loading | Td | ΔT vs $TiO_2$ | Peak $NO_x$ Reduction ($NO_2$-free) |
|---|---|---|---|---|---|
| 50% Urea | n/a | n/a | 393.1° C. | n/a | n/a |
| 50% Urea/$TiO_2$ | n/a | n/a | 392.1° C. | n/a | n/a |
| 50% Urea/CuHBC- | 8 | 0.2 wt % | 353.8° C. | 38.3 (±0.3)° C. | 28% |

TABLE 10-continued

Urea Hydrolysis and NO$_x$ Reduction Catalyst
Performance of Zirconia-based HBC

| Test Conditions | Wt % ZrO$_2$ Hybridized | Copper Loading | Td | ΔT vs TiO$_2$ | Peak NO$_x$ Reduction (NO$_2$-free) |
|---|---|---|---|---|---|
| ZSM5-Z(A) 50% Urea/CuHBC-ZSM5-Z(C) | 35 | 0.2 wt % | 379.1° C. | 13.0 (±0.3)° C. | 45% |
| 50% Urea/CuHBC-ZSM5-Z(D) | 50 | 0.2 wt % | 399.2° C. | −7.1 (±0.3)° C. | — |

Examples 5. 4-Way Catalyst Compositions

Examples of 4-way catalyst compositions in Table 11 are based upon specific data presented in Examples 2-4.

TABLE 11

4-Way Catalyst Configurations Based on data from Example 2-4

| DOC (POC) Zone | REDUCTANT Zone | Urea Hydrolysis Zone | SCR on DPF Zone | AMOX Zone |
|---|---|---|---|---|
| 1. CuHBC-SSZ13-ZV/ ≥0.1 g/L [Pt—Rh—Pd] 2. CuHBC-β-ZB(AP)/≥0.1 g/L [Pt—Rh—Pd] 3. CuHBC-β-ZBCo(AP) ≥0.1 g/L [Pt—Rh—Pd] | UREA | CuHBC-SSZ13-ZrO2(AP) | 1. CuHBC-SSZ13-ZB(AP) 2. CuHBC-SSZ13-ZBCo(AP) 3. Blend: CuSSZ-13/ CuHBC-SSZ13-ZB(AP) 4. CuHBC-SSZ13-ZBCoP(AP) | CuHBC-SSZ13-ZB(AP) |
| 1. CuHBC-SSZ13-ZV/ ≥0.1 g/L [Pt—Rh—Pd] 2. CuHBC-β-ZB(AP)/ ≥0.1 g/L [Pt—Rh—Pd] 3. CuHBC-β-ZBCo(AP) ≥0.1 g/L [Pt—Rh—Pd] | Hydrogen | Not Applicable | 1. CuHBC-SSZ13-ZB(AP) 2. CuHBC-SSZ13-ZBCo(AP) ≥0.01 g/L [Pt—Rh—Pd] 3. CuHBC-SSZ13-ZBCo(AP) ≥0.01 g/L Pd 4. CuHBC-SSZ13-ZBCoP(AP) ≥0.01 g/L Ni | Not Applicable |

Two exemplary 4-Way Catalyst scenarios are provided below:

1. Urea Reductant Scenario

The urea hydrolysis zone can be required when urea reductant upstream of the SCRF or SCR zone. This catalyst is selected to both enhance urea hydrolysis kinetics and can simultaneously contribute to NO$_x$ reduction.

The DOC or POC (i.e., partial oxidation catalyst) zone facilitates NO lightoff for NO$_2$-make and provides effective HC oxidation for VOC (important soot components in the exhaust stream). As such, the POC is coated onto a substrate with up to about 50% retention for particulates, so that the catalyst may oxidize the retained component. This provides a major benefit by reducing the amount of soot entering the SCR on DPF zone of the filter. Note also that the HBC compositions are selected to contribute to NO$_x$ reduction, by virtue of the SCR/SOC nature of the binary catalyst.

The SCR on DPF (i.e., SCRF) zone conducts the majority of the NO$_x$ reduction; in addition to passively oxidizing soot to form ash. This zone further serves as a storage chamber for the ash, until an "ash-cleaning" event is required. The intervals between ash-cleaning are markedly prolonged by the inclusion of the POC zone, thus reducing maintenance costs.

The AMOX zone provides a level of insurance against ammonia slip from the tailpipe, while carrying out NO$_x$ reduction. Optionally, the use of relatively small amounts of PGM (e.g., in the 0.01 g/L range) may also be employed to provide an addition level of safety against ammonia slip.

2. Hydrogen Reductant Scenario

It is evident from Table 11 that with hydrogen reductant the 4-way catalyst is dramatically reduced in size, complexity and cost. The increased space can be used in a myriad of ways, such as to house an onboard H$_2$ generator.

While illustrative embodiments have been described above, it will be appreciated that various changes can be made therein without departing from the spirit and scope of the invention.

Illustrative, non-exclusive examples of descriptions of some methods and compositions in accordance with the scope of the present disclosure are presented in the following numbered paragraphs. The following paragraphs are not intended to be an exhaustive set of descriptions, and are not intended to define minimum or maximum scopes, or required elements or steps, of the present disclosure. Rather, they are provided as illustrative examples of selected methods and compositions that are within the scope of the present disclosure, with other descriptions of broader or narrower scopes, or combinations thereof, not specifically listed herein still being within the scope of the present disclosure.

A1. A 4-way catalyst composition, including:
a plurality of metal oxide nanoparticles hybridized to a metal zeolite,
wherein the metal oxide nanoparticle has a maximum dimension of from 0.1 to 50 nm.

A2. The 4-way catalyst composition of Paragraph A1, wherein the 4-way catalyst is simultaneously a diesel oxidation catalyst, a diesel particulate filter catalyst, a selective catalytic reduction catalyst, a urea hydrolysis catalyst, and an ammonia oxidation catalyst.

A3. The 4-way catalyst composition of Paragraph A1 of Paragraph A2, wherein the metal oxide is hybridized to atoms located on a portion of an exterior surface of the metal zeolite.

A4. The 4-way catalyst composition of any one of Paragraphs A1 to A3, wherein the metal oxide nanoparticle has a maximum dimension of from 0.1 to 30 nm.

A5. The 4-way catalyst composition of any one of Paragraphs A1 to A4, wherein the engine aftertreatment catalyst composition has from 0.5 to 30 wt % of a plurality of metal oxide nanoparticles.

A6. The 4-way catalyst composition of any one of Paragraphs A1 to A5, wherein the metal oxide nanoparticle is selected from cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, iridium oxide, nickel oxide, barium oxide, yttrium oxide, scandium oxide, calcium oxide, barium oxide, manganese oxide, lanthanum oxide, strontium oxide, cobalt oxide, and any combination thereof.

A7. The 4-way catalyst of any one of Paragraphs A1 to A5, wherein the metal oxide nanoparticle is selected from the group consisting of zirconium oxide, vanadium oxide, cerium oxide, manganese oxide, chromium oxide, cobalt oxide, titanium oxide, tungsten oxide, barium oxide and any combination thereof.

A8. The 4-way catalyst composition of any one of Paragraphs A1 to A7, wherein the metal oxide nanoparticle further comprises a cationic dopant.

A9. The 4-way catalyst composition of Paragraph A8, wherein the cationic dopant is an oxide comprising $Mg^{2+}$, $Cu^{2+}Cu^+$, $Ni^{2+}$, $Ti^{4+}$, $V^{4+}$, $Nb^{4+}Ta^{5+}$, $Cr^{3+}$, $Zr^{4+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, $Nb^{5+}$, $Sr^{2+}$, $Pt^{2+}$, $Pd^{2+}$, $Rh^{2+}$, and any combination thereof.

A10. The 4-way catalyst composition of Paragraph A8 or Paragraph A9, wherein the cationic dopant is an oxide comprising $Pt^{2+}$, $Pd^{2+}$, and $Rh^{2+}$.

A11. The 4-way catalyst composition of any one of Paragraphs A1 to A10, wherein the metal oxide nanoparticle is selected from $CeO_2:ZrO_2$, $Y_2O_3:CeO_2$, $BaZrO_3$, $Zr_{0.8}Sr_{0.2}CoO_3$, $Zr_{0.9}Ca_{0.1}O_x$ where x is an amount that counterbalances Zr and Ca, $Zr_{0.5}Ba_{0.5}Mn_3O_4$, $Ba_{0.3}Zr_{0.7}O_x$ where x is an amount of O that counterbalances Ba and Zr, $Zr_{0.5}Ba_{0.5}CrO_3$, $Zr_{0.5}Ba_{0.5}CoO_x$ where x is an amount of O that counterbalances Zr, Ba, and Co, $TiO_2:CeO_2$, $ZrO_2$, $Y_2O_3:ZrO_2$, $ZrV_2O_7$, $Zr_{0.3}Ba_{0.1}V_{0.6}O_x$ where x is an amount of O that counterbalances Zr, Ba, and V, $TiO_2:ZrV_2O_7$, each optionally comprising a cationic dopant comprising an oxide of $Ba^{2+}$, $Pt^{2+}$, $Pd^{2+}$, $Rh^{2+}$, $Ru^{2+}$, $Cu^{2+}$, $Ni^{2+}$, $Fe^{3+}$, and any combination thereof.

A12. The 4-way catalyst composition of any one of Paragraphs A1 to A10, wherein the metal oxide nanoparticle is selected from $ZrO_2$, $Y_2O_3:ZrO_2$, $ZrV_2O_7$, $TiO_2:ZrV_2O_7$, $Ba_{0.3}Zr_{0.7}O_x$ where x is an amount of O that counterbalances Ba and Zr, $Zr_{0.5}Ba_{0.5}CoO_x$ where x is an amount of O that counterbalances Ba, Zr, and Co, and $CeO_2:ZrO_2$.

A13. The engine aftertreatment catalyst composition of any one of Paragraphs A1 to A12, wherein the metal oxide nanoparticle further comprises phosphorous.

A14. The 4-way catalyst composition of any one of Paragraphs A1 to A13, wherein the 4-way catalyst composition has from 70 wt % to 99.5 wt % of a plurality of the metal zeolite.

A15. The 4-way catalyst composition of any one of Paragraphs A1 to A14, wherein the metal zeolite is selected from aluminosilicate zeolites and silico-alumino-phosphate zeolites.

A16. The 4-way catalyst composition of any one of Paragraphs A1 to A15, wherein the metal zeolite further comprises a cation selected from $Pt^{2+}$, $Pd^{2+}$, $Rh^{2+}$, $Cu^{2+}$, $Ni^{2+}$, and $Fe^{3+}$, and wherein the metal zeolite optionally comprises an alkali metal ion selected from $Na^+$ and $K^+$.

A17. The 4-way catalyst composition of any one of Paragraphs A1 to A16, wherein the metal zeolite is selected from Fe-doped aluminosilicate zeolites, Cu-doped aluminosilicate zeolites, Fe- and Cu-doped aluminosilicate zeolites, Fe-doped silico-alumino-phosphate zeolites, Cu-doped silico-alumino-phosphate zeolites, and Fe and Cu-doped silico-alumino-phosphate zeolites.

A18. The 4-way catalyst composition of any one of Paragraphs A1 to A17, wherein the metal zeolite is selected from Fe-doped aluminosilicate chabazite, Cu-doped aluminosilicate chabazite, and Fe and Cu-doped aluminosilicate chabazite.

A19. The 4-way catalyst composition of any one of Paragraphs A1 to A17, wherein the metal zeolite is Fe and/or Cu-doped silico-alumino-phosphate zeolite, and Fe- and/or Cu-doped aluminosilicate zeolite, in combination.

A20. The 4-way catalyst composition of any one of Paragraphs A1 to A17, wherein the metal zeolite is selected from ZSM-5 and β-zeolite.

A21. The 4-way catalyst of any one of Paragraphs A1 to A20, selected from copper-doped chabazite containing zirconium vanadate and doped with $Pt^{2+}$ and $Pd^{2+}$; copper-doped β-ZSM-5 containing barium vanadate and doped with $Co^{2+}$, $Pd^{2+}$, and $Rh^{2+}$; copper-doped β-ZSM-5 barium zirconate and doped with $Co^{2+}$, $Pd^{2+}$, and $Ru^{2+}$, copper-doped chabazite containing ceria zirconia and doped with $Pt^{2+}$ and $Pd^{2+}$; and copper-doped chabazite containing zirconium barium phosphate and doped with $Ni^{2+}$.

A22. The 4-way catalyst composition of any one of Paragraphs A1 to A21, wherein the catalyst composition has a thermal resistance of up to 600° C.

A23. The 4-way catalyst composition of any one of Paragraphs A1 to A22, wherein the catalyst composition has a BET surface area of at least 200 m$^2$/g.

A24. A method of treating diesel engine exhaust in an engine aftertreatment system, comprising:
exposing a diesel engine exhaust to a catalyst composition of any one of Paragraphs A1 to A23 and hydrogen gas,
wherein the catalyst composition is disposed on or within a catalyst support structure in a close-coupled partial oxidation catalyst system, wherein the close-coupled partial oxidation catalyst system is located within the engine aftertreatment system.

A25. The method of Paragraph A24, wherein the hydrogen gas is a byproduct of fuel combustion in an engine, or is generated using an onboard hydrogen generating electrolytic device.

A26. The method of Paragraph A24 or A25, wherein the catalyst support structure is selected from a ceramic monolith and a metallic substrate with between 40-60% particle retention.

A27. The method of any one of Paragraphs A24 to A26, wherein the catalyst composition is capable of decomposing urea and urea byproducts.

A28. The method of any one of Paragraphs A24 to A27, wherein the catalyst composition increases NOx reduction under cold start conditions.

A29. An engine aftertreatment system, comprising a close-coupled partial oxidation catalyst upstream of a selective catalytic reduction catalyst on a diesel particulate filter with 40-60% particle retention, wherein the partial oxidation system comprises a 4-way catalyst of any one of Paragraphs A1 to A23.

A30. The engine aftertreatment system of Paragraph A29, wherein the selective catalytic reduction catalyst on the diesel particulate filter further comprises a 4-way catalyst of any one of Paragraphs A1 to A23.

A31. The engine aftertreatment system of Paragraph A29 or Paragraph A30, wherein the selective catalytic reduction catalyst on a diesel particulate filter is further immediately downstream of a second diesel exhaust fluid doser.

A32. The engine aftertreatment system of any one of Paragraphs A29 to A31 to A32, wherein the 4-way catalyst is selected from copper-doped chabazite containing zirconium vanadate and doped with $Pt^{2+}$ and $Pd^{2+}$; copper-doped β-zeolite containing barium vanadate and doped with $Co^{2+}$, $Pd^{2+}$, and $Rh^{2+}$; copper-doped ZSM-5 barium zirconate and doped with $Co^{2+}$, $Pd^{2+}$, and $Ru^{2+}$; copper-doped chabazite containing ceria zirconia and doped with $Pt^{2+}$ and $Pd^{2+}$; and copper-doped chabazite containing zirconium barium phosphate and doped with $Ni^{2+}$.

The embodiments of the invention in which an exclusive property or privilege is claimed are defined as follows:

1. A 4-way catalyst composition, comprising:
   a plurality of metal oxide nanoparticles formed in situ within a metal zeolite and hybridized to the metal zeolite via covalent bonds between a metal element of a metal oxide nanoparticle precursor and an element of the metal zeolite, the metal zeolite selected from Fe-doped aluminosilicate chabazite, Cu-doped aluminosilicate chabazite, and Fe and Cu-doped aluminosilicate chabazite;
   wherein the metal oxide nanoparticles have a maximum dimension of from 0.1 to 50 nm,
   wherein the metal zeolite is deconstructed at the surface, and
   wherein Si, Al, or any combination thereof from the metal zeolite surface is incorporated into the metal oxide nanoparticles.

2. The 4-way catalyst composition of claim 1, wherein the 4-way catalyst is simultaneously a diesel oxidation catalyst, a diesel particulate filter catalyst, a selective catalytic reduction catalyst, a urea hydrolysis catalyst, and an ammonia oxidation catalyst.

3. The 4-way catalyst composition of claim 1, wherein the metal oxide nanoparticles are hybridized to atoms located on a portion of an exterior surface of the metal zeolite.

4. The 4-way catalyst composition of claim 1, wherein the metal oxide nanoparticles have a maximum dimension of from 0.1 to 30 nm.

5. The 4-way catalyst composition of claim 1, wherein the plurality of metal oxide nanoparticles comprise from 0.5 to 30 wt % of the 4-way catalyst composition.

6. The 4-way catalyst composition of claim 1, wherein the plurality of metal oxide nanoparticles are selected from cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, iridium oxide, nickel oxide, barium oxide, yttrium oxide, scandium oxide, calcium oxide, barium oxide, manganese oxide, lanthanum oxide, strontium oxide, cobalt oxide, and any combination thereof.

7. The 4-way catalyst of claim 1, wherein the plurality of metal oxide nanoparticles are selected from the group consisting of zirconium oxide, vanadium oxide, cerium oxide, manganese oxide, chromium oxide, cobalt oxide, titanium oxide, tungsten oxide, barium oxide and any combination thereof.

8. The 4-way catalyst composition of claim 1, wherein the plurality of metal oxide nanoparticles further comprises a cationic dopant.

9. The 4-way catalyst composition of claim 8, wherein the cationic dopant is an oxide comprising $Mg^{2+}$, $Cu^{2+}Cu^{+}$, $Ni^{2+}$, $Ti^{4+}$, $V^{4+}$, $Nb^{4+}$, $Ta^{5+}$, $Cr^{3+}$, $Zr^{4+}$, $Mo^{3+}$, $W6^{+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{4+}$, $Ni^{2+}$, $Ba^{2+}$, $La^{3+}$, $Ce^{4+}$, $Nb^{5+}$, $Sr^{2+}$, $Pt^{2+}$, $Pd^{2+}$, $Rh^{2+}$, and any combination thereof.

10. The 4-way catalyst composition of claim 8, wherein the cationic dopant is an oxide comprising $Pt^{2+}$, $Pd^{2+}$, and $Rh^{2+}$.

11. The 4-way catalyst composition of claim 1, wherein the plurality of metal oxide nanoparticles is selected from $CeO2:ZrO2$, $Y_2O_3:CeO_2$, $BaZrO_3$, $Zr_{0.8}Sr_{0.2}CoO_3$, $Zr_{0.9}Ca_{0.1}O_x$ where x is an amount that counterbalances Zr and Ca, $Zr_{0.5}Ba_{0.5}Mn_3O_4$, $Ba_{0.3}Zr_{0.7}O_x$ where x is an amount of O that counterbalances Ba and Zr, $Zr_{0.5}Ba_{0.5}CrO_3$, $Zr_{0.5}Ba_{0.5}CoO_x$ where x is an amount of O that counterbalances Zr, Ba, and Co, $TiO_2:CeO_2$, $ZrO_2$, $Y_2O_3:ZrO_2$, $ZrV_2O_7$, $Zr_{0.3}Ba_{0.1}V_{0.6}O_x$ where x is an amount of O that counterbalances Zr, Ba, and V, $TiO_2:ZrV_2O_7$, each optionally comprising a cationic dopant comprising an oxide of $Ba^{2+}$, $Pt^{2+}$, $Pd^{2+}$, $Rh^{2+}$, $Ru^{2+}$, $Cu^{2+}$, $Ni^{2+}$, $Fe^{3+}$, and any combination thereof.

12. The 4-way catalyst composition of claim 1, wherein the plurality of metal oxide nanoparticles is selected from $ZrO_2$, $Y_2O_3:ZrO_2$, $ZrV_2O_7$, $TiO_2:ZrV_2O_7$, $Ba_{0.3}Zr_{0.7}O_x$ where x is an amount of O that counterbalances Ba and Zr, $Zr_{0.5}Ba_{0.5}CoO_x$ where x is an amount of O that counterbalances Ba, Zr, and Co, and $CeO_2:ZrO_2$.

13. The 4-way catalyst composition of claim 1, wherein the plurality of metal oxide nanoparticles further comprises phosphorous.

14. The 4-way catalyst composition of claim 1, wherein the 4-way catalyst composition includes from 70 wt % to 99.5 wt % of the metal zeolite.

15. A 4-way catalyst composition, comprising:
   a plurality of metal oxide nanoparticles formed in situ within a metal zeolite and hybridized to the metal zeolite via covalent bonds between a metal element of a metal oxide nanoparticle precursor and an element of the metal zeolite, the metal zeolite selected from copper-doped chabazite containing zirconium vanadate and doped with $Pt^{2+}$ and $Pd^{2+}$; copper-doped β-ZSM-5 containing barium vanadate and doped with $Co^{2+}$, $Pd^{2+}$, and $Rh^{2+}$; copper-doped β-ZSM-5 containing barium zirconate and doped with $Co^{2+}$, $Pd^{2+}$, and $Ru^{2+}$, copper-doped chabazite containing ceria zirconia and doped with $Pt^{2+}$ and $Pd^{2+}$; and copper-doped chabazite containing zirconium barium phosphate and doped with $Ni^{2+}$;
wherein the metal oxide nanoparticles have a maximum dimension of from 0.1 to 50 nm, and wherein the metal zeolite is deconstructed at the surface, and
wherein Si, Al, or any combination thereof from the metal zeolite surface is incorporated into the metal oxide nanoparticles.

16. The 4-way catalyst composition of claim 1, wherein the catalyst composition has a thermal resistance of up to 600° C.

17. The 4-way catalyst composition of claim 1, wherein the catalyst composition has a BET surface area of at least 200 m²/g.

* * * * *

UNITED STATES PATENT AND TRADEMARK OFFICE
CERTIFICATE OF CORRECTION

PATENT NO.        : 10,835,866 B2                                                    Page 1 of 1
APPLICATION NO.   : 15/612833
DATED             : November 17, 2020
INVENTOR(S)       : Randal A. Goffe It is certified that error appears in the above-identified patent and that said Letters Patent is hereby corrected as shown below:

On the Title Page

Page 3, Item (56) References Cited/Other Publications, Column 1:
Insert --Office Action mailed January 19, 2017, from U.S. Patent Application No. 14/935,199, filed November 6, 2015, 8 pages.--.

In the Claims

Column 46, Claim 11, Line 40:
"where xis" should read: --where x is--.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*